US011138207B2

(12) United States Patent
McIntosh et al.

(10) Patent No.: US 11,138,207 B2
(45) Date of Patent: Oct. 5, 2021

(54) INTEGRATED DYNAMIC INTERFACE FOR EXPRESSION-BASED RETRIEVAL OF EXPRESSIVE MEDIA CONTENT

(71) Applicant: Google LLC, Mountain View, CA (US)

(72) Inventors: David McIntosh, Del Mar, CA (US); Erick Hachenburg, Menlo Park, CA (US); Bryan Hart, Palm Beach Gardens, FL (US); Kyler Blue, Kirkland, WA (US); Jeff Sinckler, San Mateo, CA (US); Steven Dobek, San Francisco, CA (US)

(73) Assignee: Google LLC, Mountain View, CA (US)

( * ) Notice: Subject to any disclaimer, the term of this patent is extended or adjusted under 35 U.S.C. 154(b) by 773 days.

(21) Appl. No.: 15/043,612

(22) Filed: Feb. 14, 2016

(65) Prior Publication Data
US 2017/0083586 A1    Mar. 23, 2017

Related U.S. Application Data

(63) Continuation-in-part of application No. 14/862,095, filed on Sep. 22, 2015.

(51) Int. Cl.
*G06F 16/2457* (2019.01)
*G06F 3/0484* (2013.01)
(Continued)

(52) U.S. Cl.
CPC ........ *G06F 16/24575* (2019.01); *G06F 3/013* (2013.01); *G06F 3/04842* (2013.01);
(Continued)

(58) Field of Classification Search
CPC ........... G06F 17/30528; G06F 3/04842; G06F 3/04847; G06F 17/2785; G06F 16/24575;
(Continued)

(56) References Cited

U.S. PATENT DOCUMENTS 7,529,848 B2    5/2009    Miller et al.
8,073,203 B2   12/2011    Tang et al.
(Continued)

FOREIGN PATENT DOCUMENTS

CN          102054033 A      5/2015
EP            2426902        3/2012
WO     WO 2009/047674 A2    4/2009

OTHER PUBLICATIONS

Kerry Flynn, (https://web.archive.org/web/20151026155951/http://www.ibtimes.com/facebook-messenger-update-adds-gif-searching-keyboard-without-third-party-download-2011775), Date : Oct. 26, 2015 (Year: 2015).*

(Continued)

*Primary Examiner* — Mark D Featherstone
*Assistant Examiner* — Faezeh Forouharnejad
(74) *Attorney, Agent, or Firm* — Dority & Manning, P.A.

(57) ABSTRACT

Various embodiments relate generally to a system, a device and a method for expression-based retrieval of expressive media content. A request may be received to search for content items in a media content management system. Media content items may be procured from different content sources through application programming interfaces, user devices, and/or web servers. Media content items may be analyzed to determine one or more metadata attributes, including an expressions. Metadata attributes may be stored as one or more content associations. The media content items may be stored and categorized based on the content associations. A search router rules engine may determine search intent based on the search query, which may include a pictorial representation of an expression, such as an emoji. A dynamic interface may be integrated in a device operating system through various access points, including a button, a trigger key, a keyword trigger, and an overlay button.

18 Claims, 40 Drawing Sheets

(51) Int. Cl.
*G06F 16/248* (2019.01)
*G06F 16/435* (2019.01)
*G06F 16/532* (2019.01)
*G06F 3/0488* (2013.01)
*G06F 3/01* (2006.01)
*G06F 40/30* (2020.01)

(52) U.S. Cl.
CPC ........ *G06F 3/04886* (2013.01); *G06F 16/248* (2019.01); *G06F 16/435* (2019.01); *G06F 16/532* (2019.01); *G06F 40/30* (2020.01)

(58) Field of Classification Search
CPC .... G06F 16/435; G06F 16/532; G06F 16/248; G06F 3/04886; G06F 3/013; G06F 40/30
See application file for complete search history.

(56) References Cited

U.S. PATENT DOCUMENTS

| | | | |
|---|---|---|---|
| 8,189,685 | B1 | 5/2012 | Choudhry et al. |
| 8,458,457 | B2 | 6/2013 | Parkinson |
| 9,063,935 | B2 | 6/2015 | Fitzsimmons et al. |
| 9,519,723 | B2 | 12/2016 | Lorenz et al. |
| 9,596,206 | B2 | 3/2017 | Bueno et al. |
| 9,721,394 | B2 | 8/2017 | Rosenthal et al. |
| 9,858,598 | B1 | 1/2018 | Sivertson |
| 9,870,798 | B2 | 1/2018 | Pribula |
| 2002/0156743 | A1 | 10/2002 | DeTreville |
| 2004/0059918 | A1 | 3/2004 | Xu |
| 2005/0060643 | A1 | 3/2005 | Glass et al. |
| 2005/0143108 | A1 | 6/2005 | Seo et al. |
| 2005/0257240 | A1 | 11/2005 | Faulkner et al. |
| 2007/0050810 | A1 | 3/2007 | Imaizumi |
| 2007/0188502 | A1 | 8/2007 | Bishop |
| 2007/0260984 | A1 | 11/2007 | Marks et al. |
| 2007/0268312 | A1 | 11/2007 | Marks et al. |
| 2008/0013916 | A1 | 1/2008 | Sharpe et al. |
| 2010/0123724 | A1* | 5/2010 | Moore ............... G06F 3/04817 345/473 |
| 2010/0171712 | A1 | 7/2010 | Cieplinski et al. |
| 2010/0202750 | A1 | 8/2010 | Senftner et al. |
| 2011/0018695 | A1 | 1/2011 | Bells et al. |
| 2011/0144801 | A1 | 6/2011 | Selker et al. |
| 2011/0304629 | A1 | 12/2011 | Winchester |
| 2012/0092357 | A1 | 4/2012 | Wang et al. |
| 2012/0170667 | A1 | 7/2012 | Girardeau, Jr. et al. |
| 2012/0254804 | A1* | 10/2012 | Sheha .................... G06Q 30/02 715/834 |
| 2013/0050747 | A1 | 2/2013 | Cok et al. |
| 2013/0141361 | A1 | 6/2013 | Endo et al. |
| 2013/0208984 | A1 | 8/2013 | Mase |
| 2014/0184841 | A1 | 7/2014 | Woo et al. |
| 2014/0219634 | A1 | 8/2014 | McIntosh et al. |
| 2014/0244621 | A1 | 8/2014 | Lindsay |
| 2014/0280113 | A1 | 9/2014 | Hohwald |
| 2014/0282099 | A1 | 9/2014 | Bronder et al. |
| 2015/0100537 | A1 | 4/2015 | Grieves et al. |
| 2015/0127453 | A1* | 5/2015 | Tew .................. G06Q 30/0251 705/14.49 |
| 2015/0268780 | A1 | 9/2015 | Kim et al. |
| 2015/0277686 | A1* | 10/2015 | LaForge .................. H04L 67/10 715/723 |
| 2015/0348302 | A1 | 12/2015 | Shimamura et al. |
| 2016/0057576 | A1 | 2/2016 | Kessler et al. |
| 2016/0073166 | A1 | 3/2016 | Hu et al. |
| 2016/0098851 | A1 | 4/2016 | Wu et al. |
| 2016/0241617 | A1 | 8/2016 | Jelley et al. |
| 2016/0259464 | A1 | 9/2016 | Chan et al. |
| 2016/0315995 | A1 | 10/2016 | Hausler et al. |
| 2016/0323507 | A1 | 11/2016 | Chong et al. |
| 2017/0031548 | A1 | 2/2017 | Dellinger et al. |
| 2017/0046065 | A1 | 2/2017 | Zeng et al. |
| 2017/0064034 | A1 | 3/2017 | Vasthimal et al. |
| 2017/0083519 | A1 | 3/2017 | McIntosh et al. |
| 2017/0083520 | A1 | 3/2017 | McIntosh et al. |
| 2017/0083524 | A1 | 3/2017 | McIntosh et al. |
| 2017/0083586 | A1 | 3/2017 | Huang et al. |
| 2017/0193280 | A1 | 7/2017 | Huang et al. |
| 2017/0212892 | A1 | 7/2017 | McIntosh et al. |
| 2017/0359702 | A1 | 12/2017 | Peterson et al. |
| 2018/0068475 | A1 | 3/2018 | Blue et al. |
| 2018/0129748 | A1 | 5/2018 | Bosarge et al. |
| 2018/0262452 | A1 | 9/2018 | Cuthery et al. |
| 2018/0303397 | A1 | 10/2018 | Krupat et al. |
| 2019/0014063 | A1 | 1/2019 | Melenboim et al. |

OTHER PUBLICATIONS

Popkey, (https://web.archive.org/web/20150925034643/http://popkey.co/ios?ref=footer_section), Date:Sep. 25, 2015 (Year: 2015).*

"How to send GIFs via AWESOME Texting App Kanvas Keyboard", "https://www.youtube.com/watch?v=HytZGP99LTA", Published on May 6, 2015 (Year: 2015).*

"Giffage: The best GIF app on the market.", (https://www.youtube.com/watch?v=L0iwDPRLgkE), Published on Apr. 13, 2015 (Year: 2015).*

Giphy, (https://web.archive.org/web/20140813065113/http://giphy.com/search/happy), Date: Aug. 13, 2014; https://web.archive.org/web20141231135329/https://giphy.com/upload, Date: Dec. 31, 2014; https://web.archive.org/web/20150919214012/http://giphy.com/create/upload, Date: Sep. 19, 2015.

Jou et al., "Predicting Viewer Perceived Emotions in Animated GIFs", Nov. 3-7, 2014 (4 pages).

Emojipedia, (https://web.archive.org/web/20150915110235/https://emojipedia.org/fisted-hand-sign/), Date: Sep. 15, 2015; (https://web.archive.org/web/20150823012626/https://emojipedia.org/clapping-hands-sign/), Date: Aug. 23, 2015; (https://web.archive.org/web/20150829090848/https://emojipedia.org/smiling-face-with-sunglasses/), Date: Aug. 29, 2015.

Forouharnejad, Faezeh, Office Action for U.S. Appl. No. 14/862,095 dated Jan. 9, 2018.

Forouharnejad, Faezeh, Office Action for U.S. Appl. No. 14/862,111 dated Jan. 9, 2018.

Forouharnejad, Faezeh, Office Action for U.S. Appl. No. 14/862,114 dated Dec. 29, 2017.

Le, Sarah, Office Action for U.S. Appl. No. 15/260,296 dated Feb. 22, 2018.

Anonymous, "Popkey + GIF Keyboard", https://www.youtube.com/watch?v=1g47CgiAYvl, published on Sep. 16, 2015.

Mohr, Carolyn Nicander, "PopKey: The Most Fun You Can Have with a Keyboard", Aug. 29, 2015, https://web.archive.org/web/20150829083452/https://www.wonderoftech.com/popkey/, retrieved Dec. 14, 2018, 23 pages.

JoseGTV1 "How to Get Animated Moving Emojis on iPhone 6 Plus—Mogee—YouTube", posted Jul. 26, 2015, https://www.youtube.com/watch?v=bNR8tixh8vo, 2015.

OSXDaily "Lose the Cartoon Yellow People Emoji! How to Access Diverse Emoji Icons in iOS", posted Apr. 11, 2015, http://osxdaily.com/2015/04/11/how-access-diverse-emoji-icons-ios , retrieved on May 30, 2019, 10 pages.

Tweedie, "This iPhone App Lets You Send GIFs Right From Your Keyboard", posted on Oct. 2, 2014, https://www.businessinsider.com.au/how-to-send-gifs-in-imessage-with-iphone-2014-10, retrieved on Sep. 21, 2018, 11 pages.

Wouterse "Crop/Cut Image", posted on Apr. 10, 2013, https://web.archive.org/web/20130410001005/http://www.online-image-editor.com/help/crop_frame; retrieved Sep. 21, 2018, 1 page.

* cited by examiner

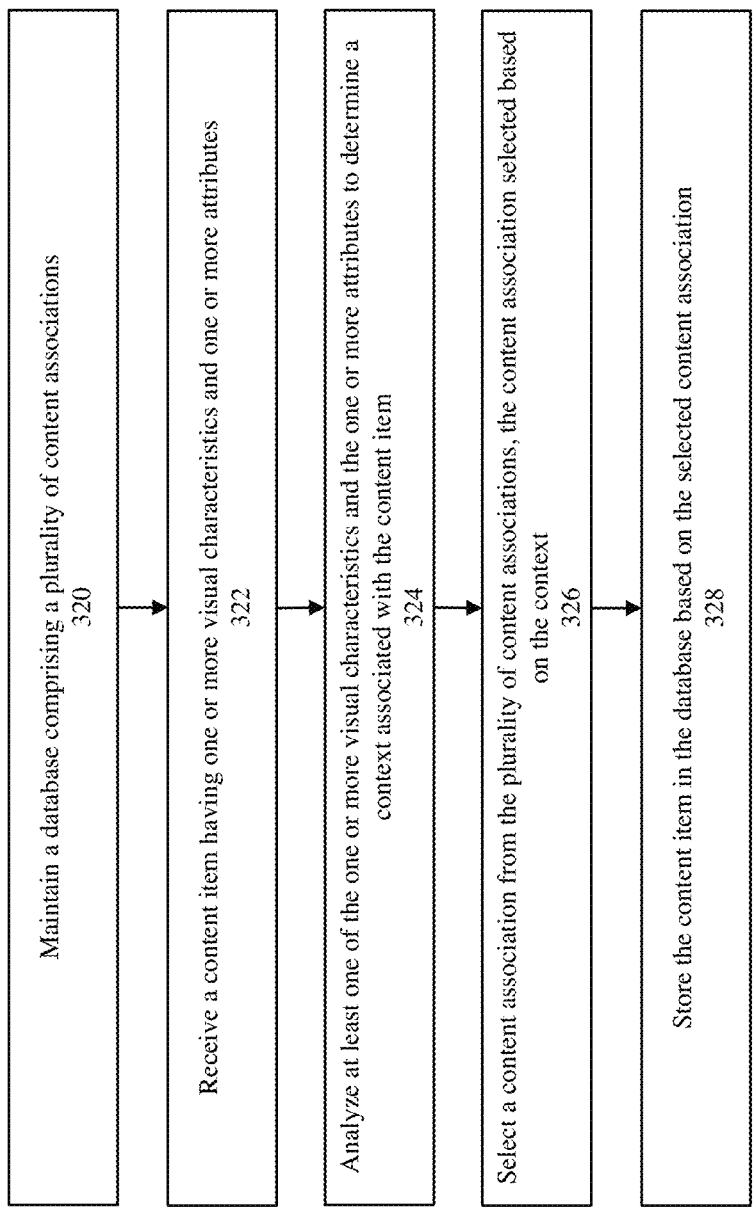

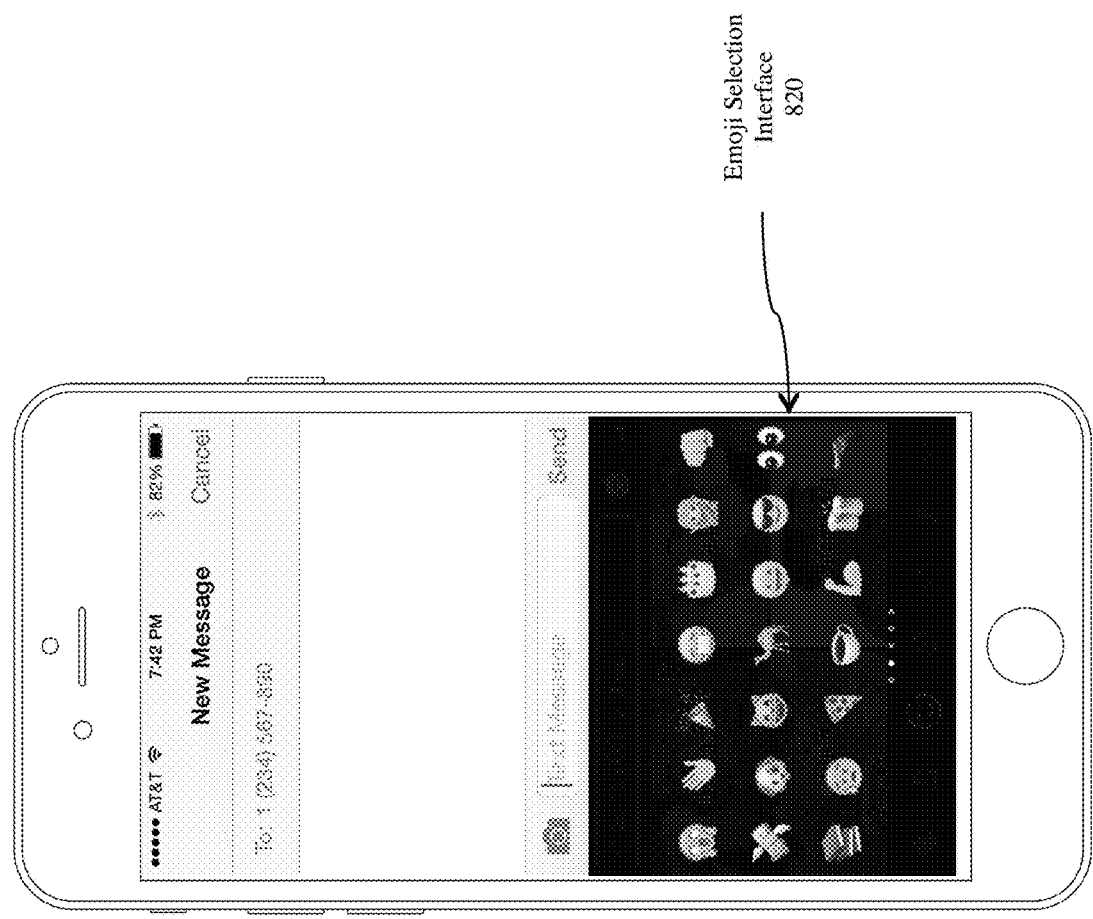

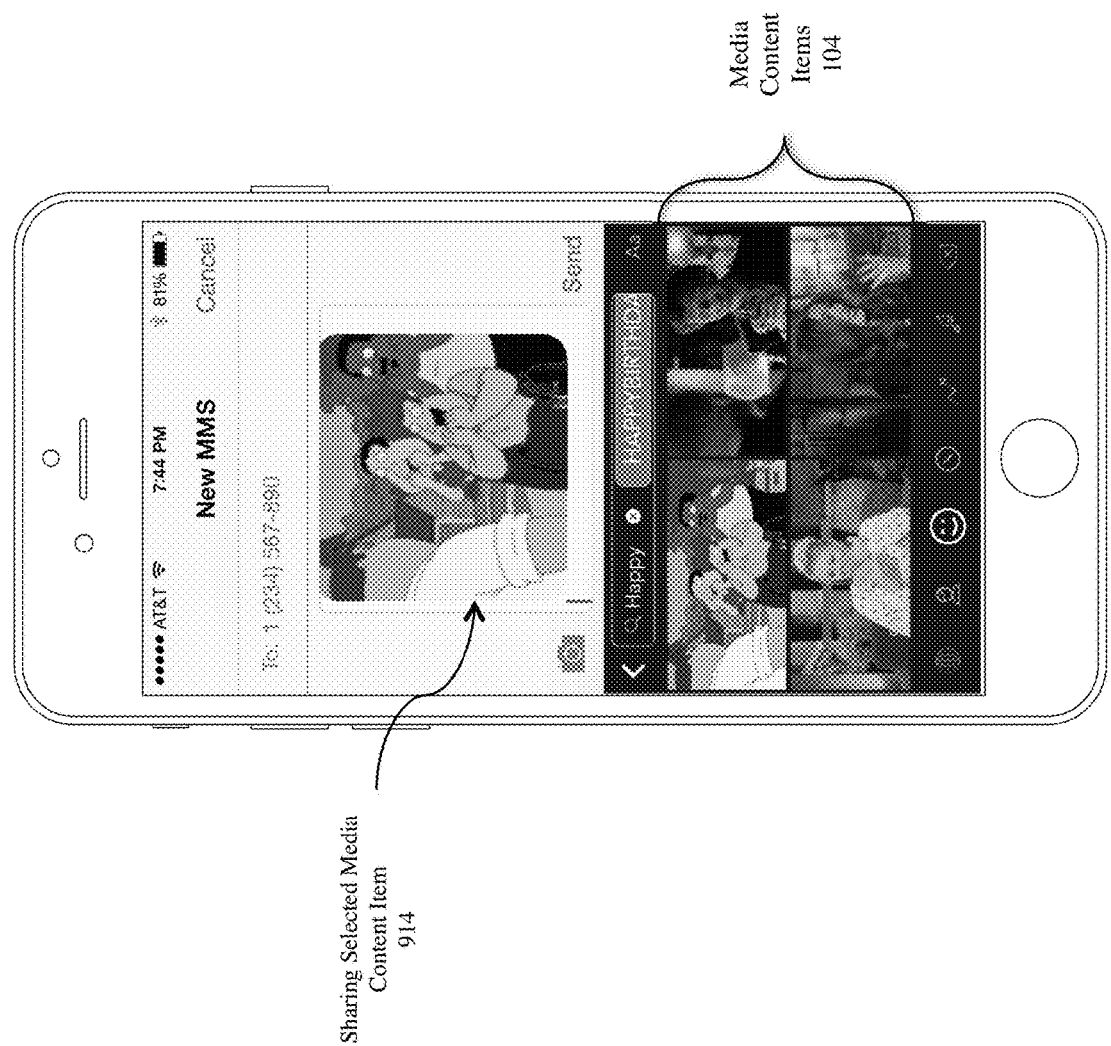

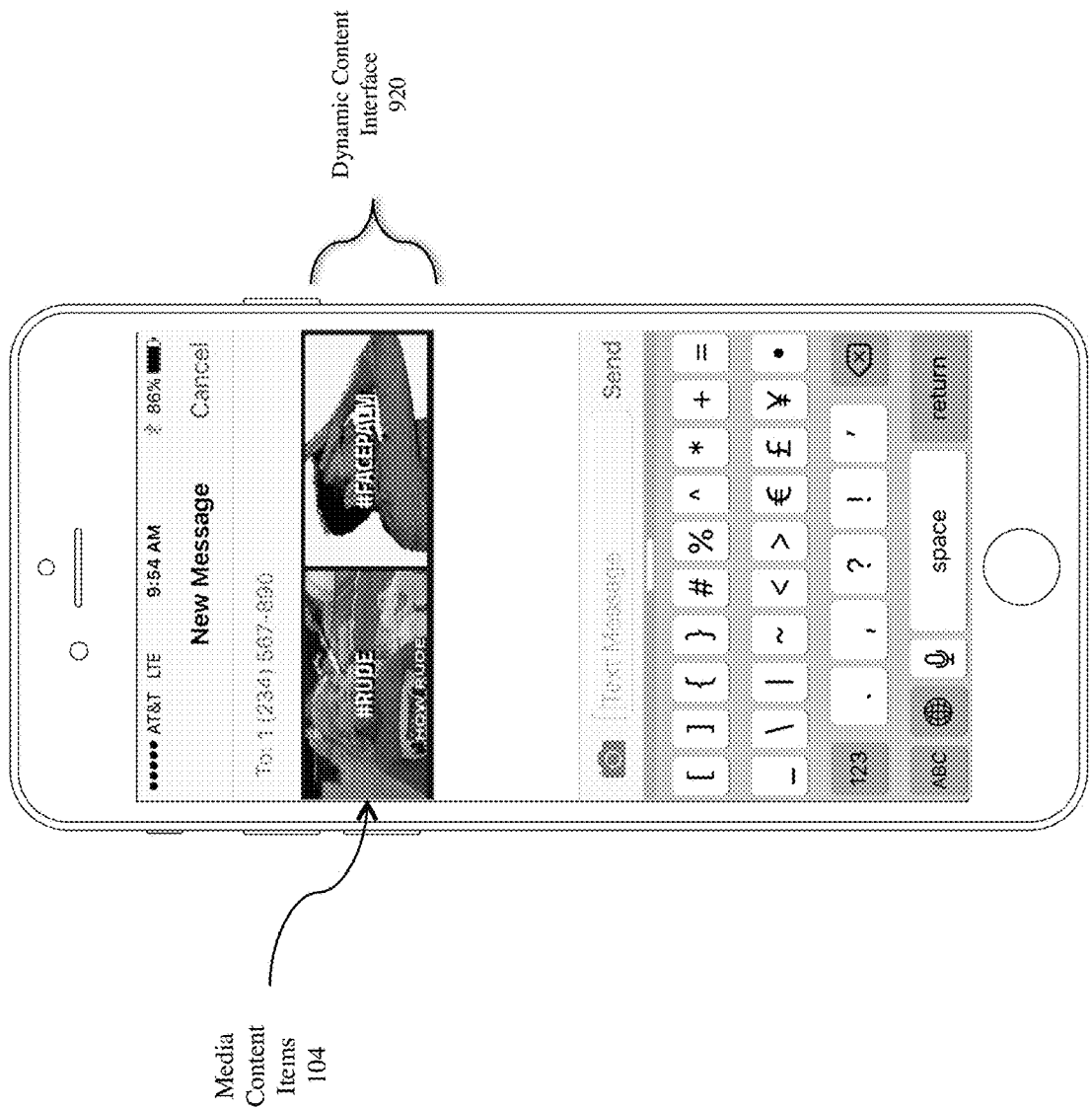

INTEGRATED DYNAMIC INTERFACE FOR EXPRESSION-BASED RETRIEVAL OF EXPRESSIVE MEDIA CONTENT

CROSS-REFERENCE TO RELATED APPLICATIONS

This application is a continuation-in-part U.S. non-provisional patent application of U.S. patent application Ser. No. 14/862,095, filed Sep. 22, 2015, entitled "Platform and Dynamic Interface for Procuring, Organizing, and Retrieving Expressive Media Content"; this application is also related to co-pending U.S. non-provisional patent application of U.S. patent application Ser. No. 14/862,111, filed Sep. 22, 2015, entitled "Selectively Procuring and Organizing Expressive Media Content" and this application is also related to co-pending U.S. non-provisional patent application of U.S. patent application Ser. No. 14/862,114, filed Sep. 22, 2015, entitled "Platform and Dynamic Interface for Expression-Based Retrieval of Expressive Media Content," all of which are herein incorporated by reference for all purposes.

FIELD

Various embodiments relate generally to electrical and electronic hardware, computer software, wired and wireless network communications, and distributed software applications for enabling users to communicate with each other through graphical, or pictorial, content. More specifically, a system and a method provide for categorizing procured content for performing search to implement, for example, animated inputs in a dynamic interface.

BACKGROUND

Conventional techniques for communicating among people have evolved away from mere pen-and-paper implementations as complex and creative messaging have increasingly relied on technological solutions. With the advent of computing devices, people communicate on the Internet in a multitude of ways through a multitude of platforms using a multitude of devices.

For example, some conventional approaches for communicating between users of mobile devices may simply rely on SMS, messaging through a social networking application, or "texting." Internet or mobile device users may exchange messages through these various mediums, for example. However, occasionally, users may wish to communicate via media content, such as GIFs (Graphics Interchange Format), or image files that include a static or animated set of images. Users may search the Internet for GIFs, copy them through an operating system's native web browser, and paste the GIFs in various messaging applications. These conventional systems are not well-suited to providing categorized content within a dynamic interface without expending resources or requiring manual intervention.

While conventional approaches are functional, the usual structures and/or functionalities for discovering and sharing media content are not suited to the increasing technological demands required to optimally share expressive content.

Thus, what is needed is a solution for effectively identifying content that matches a user's expressive intent without the limitations of conventional techniques.

BRIEF DESCRIPTION OF THE DRAWINGS

Various embodiments or examples ("examples") of the invention are disclosed in the following detailed description and the accompanying drawings:

FIGS. 3A-E are example flowcharts of a process for categorizing procured content in a media content management system, according to an embodiment;

FIGS. 8A-I are example screenshots of a dynamic keyboard interface provided to interact with content in a media content management system, according to some examples;

FIGS. 9A-E are example screenshots of a dynamic keyboard interface provided to perform search operations in a media content management system, according to some examples;

FIGS. 9G-L are example screenshots of accessing a dynamic content interface provided to perform search operations in a media content management system, according to some examples.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Communicating with other people in the Internet age has never been easier. People may communicate through various messaging platforms, including, but not limited to, SMS, iMessage, social networking systems such as FACEBOOK and TWITTER, as well as other messaging applications like SNAPCHAT, WECHAT, LINE, and so forth. While text messaging remains the predominate method of communication, more and more pictorial messaging has emerged. Pictorial messaging, or sending messages that include pictorial content, is just emerging as a method of conveying information from one person to another. However, traditional methods of finding a pictorial content item that captures the expressive intent of a communicating person are lacking One method includes opening a web browser on a user device, such as a mobile phone and searching, via an Internet search engine, for a pictorial content item, such as an animated GIF (Graphical Interchange Format) content item. After browsing through the search results, the communicating user must then copy and paste the content item into the desired messaging platform on the user device. This process is burdensome and not optimized for the user to efficiently locate and identify content items that match the user's expressive intent.

Other methods of procuring content involve highly manual procedures, such as copying and storing content in a user's personal mobile device or computer. These methods also do not facilitate searching for content based on the expressive intent of the searching user. Further, existing systems and methods do not provide content in a dynamic interface as animated inputs on a user device.

Figure 1A:
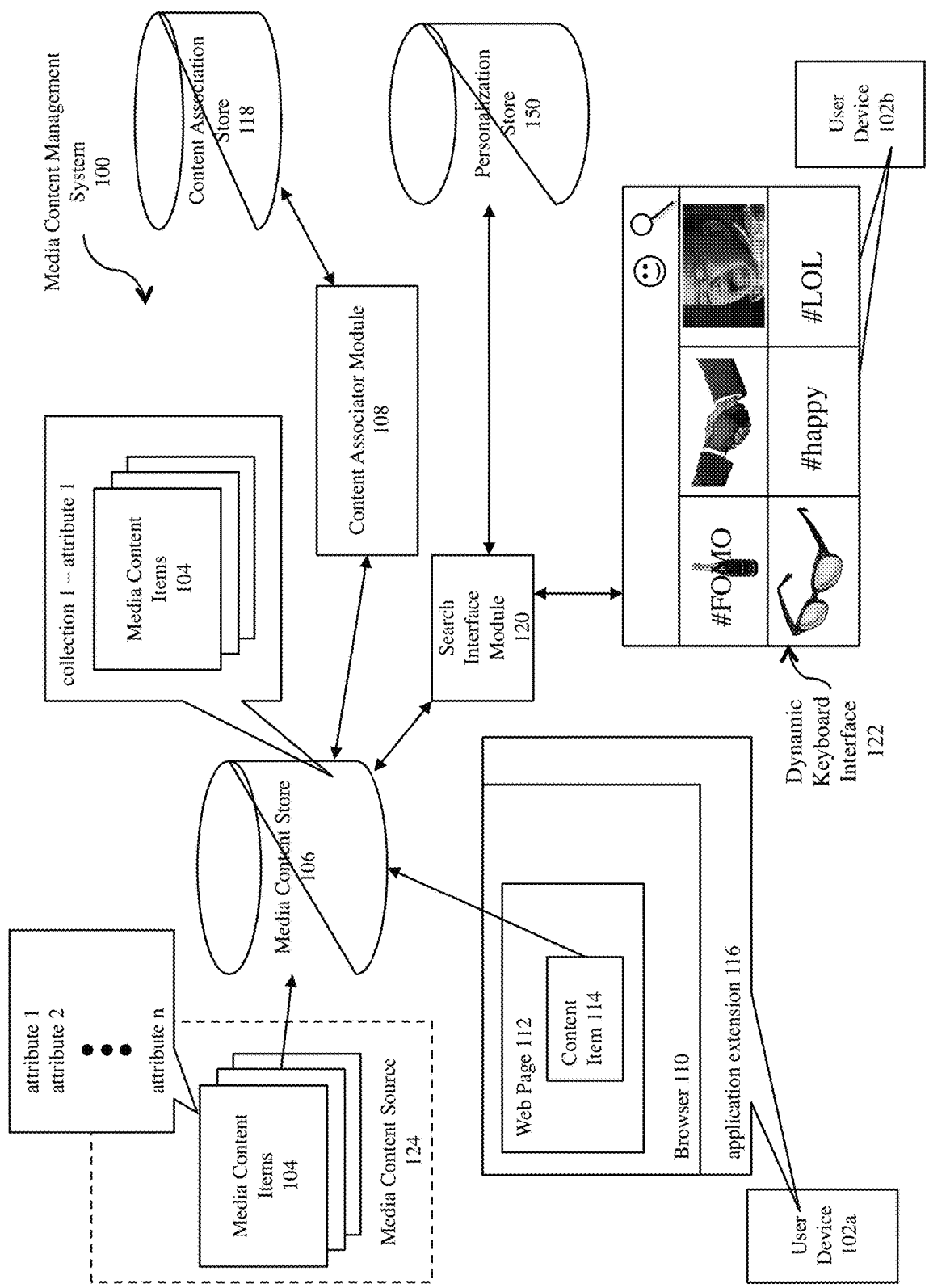
FIG. 1A is a high-level block diagram depicting a media content management system, according to an embodiment.

FIG. 1A is a high-level block diagram depicting a media content management system 100, according to some embodiments. The media content management system 100 may receive media content items 104 from media content sources 124 that are stored in a media content store 106. FIG. 1A and the other figures use like reference numerals to identify like elements. A letter after a reference numeral, such as "102a," indicates that the text refers specifically to the element having that particular reference numeral. A reference numeral in the text without a following letter, such as "102," refers to any or all of the elements in the figures bearing that reference numeral (e.g., "102" in the text refers to reference numerals "102a" and/or "102b" in the figures). Only two user devices 102 are illustrated in FIG. 1A in order to simplify and clarify the description. Administrators may access the media content management system 100 through a user device 102 (e.g., user devices 102a and 102b) through a separate login process, in one embodiment.

As mentioned above, media content items 104 may include various types of content, such as animated GIFs (a series of images), a static image, an audiovisual content item/video, as well as composite content items, such as multiple animated GIFs and/or image content. Media content items 104 are received to the media content management system 100 and stored into the media content store 106. A media content item 104 may have one or more attributes, such as content source, dimensions, content branding (e.g., Paramount Pictures, NBC Universal, etc.), characters included in the content, text strings included in the content, and so forth. Attributes may include metadata attributes, in one embodiment.

In the media content store 106, a media content item 104 may be stored in associated with a collection, or a grouping of media content items 104. Collections may be generated by administrators of the media content management system 100, in one embodiment. A collection may be automatically generated, in one embodiment, based on one or more attributes shared by the media content items 104 in the collection. In an embodiment, a content association, or a unique identifier, may be used to denote a collection in the media content management system 100. For example, a media content item 104 may be "content associated" as part of the "#happy" collection in the media content management system 100. In one embodiment, a user or an administrator may content association the media content item 104 as part of the "#happy" collection. In another embodiment, the media content item 104 may be automatically content associated, or have an automatically generated content association associated with the media content item 104 by a content associator module 108 using content associations stored in a content association store 118. In this way, content may be procured and categorized using content associations, such as "#happy," in the media content management system 100. Individual collections, or set of files, may each be labeled with a content association in the media content management system 100. A particular file may be associated with one or more content associations, in one embodiment.

In one embodiment, a user of the media content management system 100 may, through a user device 102a, add content to a media content management system 100. For example, a user may have installed an application extension 116 onto the user device 102a such that the user can "save" a content item 114 found through browsing a web page 112 using a browser 110 on the user device 102a. By saving the content item 114 using the application extension 116, the URL (Uniform Resource Locator) may be stored in association with the content item 114 as an attribute of the content item, in one embodiment. The application extension 116 may, in one embodiment, include a downloadable application that enables a user to browse to a web page and collect media content items presented on the web page. As an example, a web page for a blog may post a particularly interesting content item that may or may not be available on the media content management system 100. Using the application extension 116, the user may browse to the web page 112, access a menu through the browser 110, and select an option to save one or more content items 114 that have been presented on the web page 112. In one embodiment, the application extension 116 is a mobile application that enables mobile browsers 110 to perform this functionality. In other embodiments, the application extension 116 may be a browser extension application or applet that may be downloaded through the browser 110 on a mobile device or desktop computer. In a further embodiment, the application extension 116 may enable users to directly upload content items 114 to the media content store 106 in the media content management system 100.

In another embodiment, a copy of the content item 114 is stored in the media content store 106 as part of a user operating the application extension 116 described above. In a further embodiment, a link or a URL of the content item 114 is stored in the media content store 106. In yet another embodiment, a copy of the content item 114 is stored onto the user device 102*a* as part of a "saved" collection, or a user-generated collection on the user device 102*a*. A user may sign into his or her account on various user devices 102 such that the collections may be synchronized between the user devices 102, including user-generated collections such as the "saved" collection.

Content items 114, presented on web pages 112 or otherwise accessible through web servers, may be procured by administrators of the media content management system 100 in other ways, in an embodiment. For example, content owners, such as movie studios, television studios, brand owners, and other content generators, may partner with administrators of the media content management system 100 such that licensed content may be delivered and stored in the media content store 106. In such a procurement process, content owners may provide media content items 104 having pre-populated attributes, as mentioned above. A media content source 124, such as a content owner, may include content stores or databases on servers maintained and operated by the third-party sources or websites, for example. As part of the procurement process, content items 104 may be categorized into one or more collections by storing them in association with one or more content associations from the content association store 118. In one embodiment, content associations may be automatically generated by the content associator module 108 based on attributes of the content items 104. In another embodiment, content associations may be selected through one or more user interfaces or through an application programming interface (API). In a further embodiment, media content items 104 may be content associated by users of the media content management system 100 after being stored in the media content store 106 through one or more user interfaces on user devices 102.

As further illustrated in FIG. 1A, a dynamic keyboard interface 122 may be provided on a user device 102*b*, for example. A dynamic keyboard interface 122 may include media content items 104 as well as collections of media content items 104. For example, the dynamic keyboard interface 122 may include a collection of media content items 104 content associated as "#FOMO." "#FOMO" is an expression in Internet slang, meaning "fear of missing out." Thus, media content items 104 included in the "#FOMO" collection may be about or include expressive statements about the specific expression "fear of missing out." One or more expressive statements may, in one embodiment, be extracted and/or otherwise interpreted from a media content item 104. For example, a curating user may content association a media content item 104 as "#FOMO" based on images in the media content item 104 being related to the expression "fear of missing out," such as a blinking text of "FOMO" in the images, captioned dialog from a movie or television show indicating the character in the images is lonely, has no friends, or otherwise has a fear of missing out on cool events. Through the procurement process, expressive statements may be mapped to content associations in the media content management system 100. These expressive statements may correlate to a user's searching intent in performing a search via animated inputs in the dynamic interface, in one embodiment.

As illustrated in FIG. 1A, the dynamic keyboard interface 122 may also include other animated keys, or regions of the dynamic keyboard that implement animated inputs. Animated keys of two hands clasped in a handshake, a baby crying, a pair of glasses, a "#happy" content association, and a "#LOL" content association are illustrated as example animated keys, in addition to the "#FOMO" animated key further including a champagne bottle. Though not illustrated, the animated keys may include media content items 104 that are rendered in the dynamic keyboard interface 122 as animations, meaning the content may be moving in a constant loop within the keys. Media content items 104 may be preprocessed to enable the animated inputs in the dynamic interface, in one embodiment.

Upon selecting one of the animated keys in the dynamic keyboard interface 122, the user device 102*b* may communicate with the media content management system 100 through a search interface module 120. In one embodiment, a user's search history and/or a user's sharing history may be stored as personalized information in a personalization store 150 for each user of the dynamic keyboard interface 122. Other personalized information may be captured about a user device 102, such as location (via GPS and/or IP Address), language keyboards installed, default language selection, phone information, contact information, messaging applications installed, and so forth. The data included in the personalization store 150 may be used as one or more factors by the search interface module 120 in determining the search intent of the user, for example. As further illustrated in FIG. 1B, the dynamic keyboard interface 122 may be rendered on the user device 102*b* through a dynamic keyboard application 130 installed on the user device 102*b*. The dynamic keyboard application 130 may install a dynamic keyboard user interface 132 that enables the dynamic keyboard interface 122 to be accessed throughout the user device 102*b* as a third-party keyboard. In this way, a messaging user using a messaging application 140, such as the APPLE IMESSAGE, SMS, texting, or other messaging platform such as FACEBOOK MESSENGER, TWITTER, EMAIL, and the like, may access the dynamic keyboard interface 122 from within the messaging application 140.

Figure 1B:
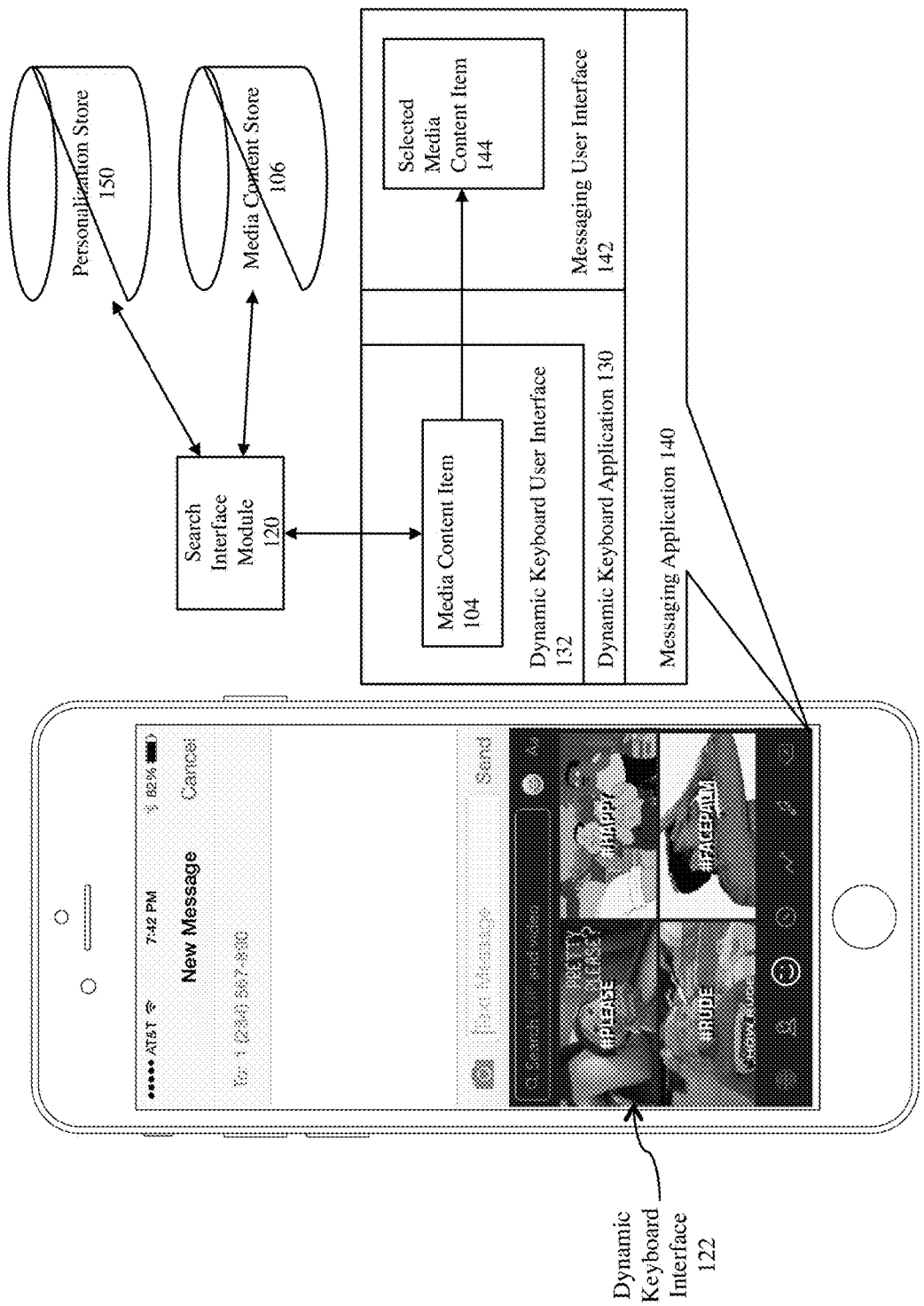
FIG. 1B is a high-level block diagram depicting a process of performing a search to implement animated inputs in a dynamic interface, according to an embodiment.

FIG. 1B is a high-level block diagram depicting a process of performing search to implement animated inputs in a dynamic interface, in an embodiment. As further illustrated in FIG. 1B, media content items 104 are rendered in the dynamic keyboard interface 122 through the dynamic keyboard user interface 132 communicating with the search interface module 120. In one embodiment, a set of collections may be selected for display on the dynamic keyboard interface 122. As illustrated in FIG. 1B, the dynamic keyboard interface 122 includes "#PLEASE," "#HAPPY," "#RUDE," and a "#FACEPALM" collections. Although the hashtag symbol ('#') is used in the examples included here, content associations do not necessarily need to start with a hashtag. By selecting an animated key on the dynamic keyboard interface 122, the collection of media content items 104 may be retrieved from the media content store 106 by the search interface module 120 and then rendered by the dynamic keyboard user interface 132 in the dynamic keyboard interface 122. In this way, the searching user is searching the media content management system 100 by using the selected content association, such as "#HAPPY." The retrieved collection of media content items 104 may be rendered within the dynamic keyboard interface 122. Because the "#HAPPY" collection may be updated and added to in real-time, a searching user may be presented with different media content items 104 as new items are added to the collection. As mentioned above, media content items 104 may be preprocessed to reduce the file size of the content, thus enabling the media content items 104 to be quickly rendered on the dynamic keyboard interface 122.

A searching user may then select a media content item from the dynamic keyboard interface 122 by touching or otherwise interacting with the dynamic keyboard user interface 132. The selected media content item 144 may then be transmitted or pasted into the messaging user interface 142 of the messaging application 140. In one embodiment, a selected media content item 144 is selected by clicking, tapping, or touching the dynamic keyboard interface 122 and holding the selected media content item 144 to "copy" the content so that it can be "pasted" into the messaging application 140 through the messaging user interface 142. This copy and paste method may take advantage of the operating system of the user device 102, in one embodiment, such that the selected media content item 144 is not stored permanently onto the user device 102. In another embodiment, a searching user may search for media content through a search field on the dynamic keyboard interface 122, described further herein. In this way, media content items 104 may be shared through any messaging platform available on the user's device. Personalized information may also be captured, as mentioned above, in the personalization store 150 through the search interface module 120, for example. In at least some embodiments, a dynamic keyboard interface 122 can be implemented as a GIF keyboard, as produced by RIFFSY, INC. of San Francisco, Calif.

System Architecture

Figure 2A:
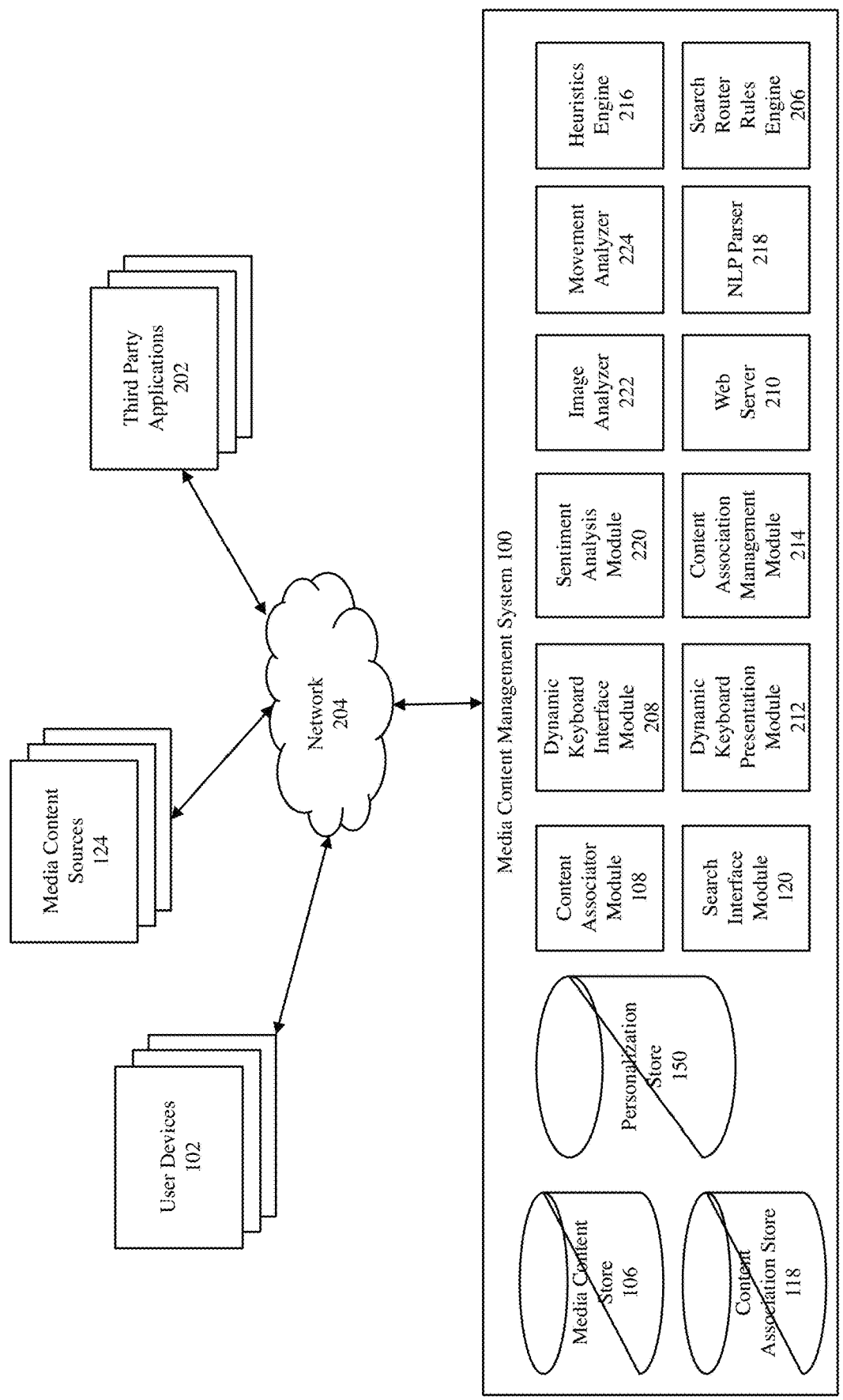
FIG. 2A is a network diagram of a system for procuring, organizing, and retrieving expressive media content in a media content management system, showing a block diagram of the media content management system, according to an embodiment.

FIG. 2A is a network diagram of a system for categorizing procured content for performing search in a media content management system, showing a block diagram of the media content management system, according to an embodiment. The system environment includes one or more user devices 102, media content sources 124, third-party applications 202, the media content management system 100, and a network 204. In alternative configurations, different and/or additional modules can be included in the system.

The user devices 102 may include one or more computing devices that can receive user input and can transmit and receive data via the network 204. In one embodiment, the user device 102 is a conventional computer system executing, for example, a Microsoft Windows-compatible operating system (OS), Apple OS X, and/or a Linux distribution. In another embodiment, the user device 102 can be a device having computer functionality, such as a personal digital assistant (PDA), mobile telephone, smart-phone, wearable device, etc. The user device 102 is configured to communicate via network 204. The user device 102 can execute an application, for example, a browser application that allows a user of the user device 102 to interact with the media content management system 100. In another embodiment, the user device 102 interacts with the media content management system 100 through an application programming interface (API) that runs on the native operating system of the user device 102, such as iOS and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Dacontent associationram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2A contains a block diagram of the media content management 100. The media content management system 100 includes a media content store 106, a content association store 118, a personalization store 150, a search interface module 120, a content associator module 108, a dynamic keyboard interface module 208, a web server 210, a dynamic keyboard presentation module 212, a content association management module 214, a sentiment analysis module 220, an image analyzer module 222, a movement analyzer 224, a natural language processing (NLP) parser 218, a heuristics engine 216, and a search router rules engine 206. In other embodiments, the media content management system 100 may include additional, fewer, or different modules for various applications. Conventional components such as network interfaces, security functions, load balancers, failover servers, management and network operations consoles, and the like are not shown so as to not obscure the details of the system.

The web server 210 links the media content management system 100 via the network 204 to one or more user devices 102; the web server 210 serves web pages, as well as other web-related content, such as Java, Flash, XML, and so forth. The web server 210 may provide the functionality of receiving and routing messages between the media content management system 100 and the user devices 102, for example, instant messages, queued messages (e.g., email), text and SMS (short message service) messages, or messages sent using any other suitable messaging technique. The user can send a request to the web server 210 to upload information, for example, images or media content are stored in the media content store 106. Additionally, the web server 210 may provide API functionality to send data directly to native user device operating systems, such as iOS, ANDROID, webOS, and RIM.

A content associator module 108 may automatically generate one or more content associations for a media content item 104 in the media content management system 100 based on the attributes of the media content item 104. For example, machine learning techniques may be used by the content associator module 108 to determine relationships between media content items 104 and content associations stored in the content association store 118. In one embodiment, the content associator module 108 may identify one or more content sources, such as movie studios, movies, television studios, television shows, actors, genres, and so forth. In another embodiment, the content associator module 108 may automatically generate a content association for a media content item 104 based on an analysis of the image frames within the media content item 104. In yet another embodiment, the content associator module 108 may use one or more computer vision techniques and other image processing methods through various third party applications 202 to analyze the image frames within the media content item 104 to automatically generate one or more content associations to be associated with the content item. In one embodiment, the content associator module 108 may utilize one or more third party applications 202, the NLP parser 218, the sentiment analysis module 220, the image analyzer 222, the movement analyzer 224 and the heuristics engine 216 to analyze and parse text included in media content items 104 as well as analyze moving image frames of the media content items 104 to automatically generate content associations and/or automatically select content associations stored in the content association store 118. In another embodiment, an NLP parser 218 may be combined with a sentiment analysis module 220 and may be relied upon to analyze images and/or audiovisual content to determine a sentiment of the media content items 104. For example, an image analyzer 222 and a movement analyzer 224 may be used to detect and/or classify a sequence of images depicting a face smiling. A heuristics engine 216 may include a rule that automatically associates a media content item 104 having a sequence of images that have been analyzed to detect a smile with a "#happy" content association from the content association store 118 as the media content item 104 is stored within the media content store 106 in the media content management system 100. Alternatively, or in addition to this analysis, an NLP parser 218 may parse text strings included in the images and determine a match to the word "AWESOME." Additionally, the NLP parser 218 may interpret the smile to mean a positive sentiment. A sentiment analysis module 220 may indicate that the word "AWESOME" is associated with a strong positive sentiment, and a heuristics engine 216 may include a rule that automatically associates the "#happy" content association (and/or other positive content associations) with media content items 104 that have a strong positive sentiment.

A search interface module 120 may manage search requests and/or search queries for media content items 104 in the media content management system 100 received from user devices 102, in an embodiment. A search query may be received at the search interface module 120 and processed by a search router rules engine 206, in one embodiment. In another embodiment, a search interface module 120 may receive a request for a collection from a user device 102 based on a content association, such as "#HAPPY," "#RUDE," "#FOMO," and so forth as a result of a selection of an animated key or a text search. The search interface module 120 may communicate the search query to the search router rules engine 206 to process the request, in an embodiment.

A content association management module 214 may manage one or more content associations associated with each media content item 104 in the media content management system 100. Content associations may be associated with media content items 104 through the content association management module 214 through various interfaces, such as user interfaces and application programming interfaces (APIs). APIs may be used to receive, access, and store data from media content sources 124, third party applications 202 (and/or websites), and user devices 102. The content association management module 214 may manage how content associations are associated with the media content items 104 through various procurement methods, in one embodiment.

A dynamic keyboard interface module 208 may manage interface communications between the media content management system 100 and user devices 102. For example, the dynamic keyboard interface 122, as illustrated in FIGS. 1A and 1B, may include a menu selection element that enables the searching user to view trending media content on the media content management system 100. "Trending" media content may include frequently viewed and/or frequently shared content by users of the media content management system 100. The dynamic keyboard interface module 208 may receive the request for trending media content and retrieve media content items 104 from the media content store 106 that have the highest number of shares in the past hour, for example. The dynamic keyboard interface module 208 may then, through the dynamic keyboard presentation module 212, provide the retrieved trending media content items to the dynamic keyboard interface 122 through the dynamic keyboard application 130, in one embodiment. The dynamic keyboard presentation module 212 may determine how the media content items are presented and in what order, for example. In one embodiment, if no media content items 104 satisfy a search query or request from a user device, the dynamic keyboard interface module 208 may, in conjunction or in coordination with the search interface module 120 and search router rules engine 206, deliver other media content items 104 that are popular or have been shared. In one embodiment, content items may be selected by the dynamic keyboard interface module 208 from third party applications 202 (or websites), such as TUMBLR, to be included in the search results or animated keys of the dynamic keyboard interface 122.

A heuristics engine 216 may include one or more heuristics rules to determine one or more outcomes. For example, the content associator module 108 may use the heuristics engine 216 to determine a ranking of candidate content associations for a media content item 104 based on the attributes of the media content item 104. Certain attributes may have various heuristic rules associated with them, such as visual movements (e.g., detected smiles may be associated with a "#HAPPY" content association), visual characteristics (e.g., blinking text may indicate an importance of the text string, or a hashtag symbol may indicate a particular content association), content sources, characters included in the media content item, and other attributes. Various heuristic rules may be generated by administrators to automatically generate content associations for content items based on attributes, in one embodiment. In another embodiment, heuristic rules may also use ranges of parameters for various attributes. For example, thirty selections of a media content item 104 for sharing by a particular user may be used in a heuristic rule to present the same media content item in response to a search query from the particular user where there are few search results. The range here may be defined as a threshold number of shares, for example.

A sentiment analysis module 220 may provide analysis of various text received by the media content management system 100 to determine whether the text exhibits positive, negative, or neutral connotations. This information may be used by various modules to efficiently translate a search query to extract the expressive intent of the searching user. For example, a dictionary of terms may be used, in multiple languages, to determine whether text may be determined to have positive, negative, or neutral connotations. The sentiment analysis module 220 may, in one embodiment, use various third party applications 202 to perform this analysis. Using the sentiment analysis module 220, the search router rules engine 206 may provide one or more collections of media content items 104 based on the connotations of the search query, for example.

Categorizing Procured Content

Figure 2B:
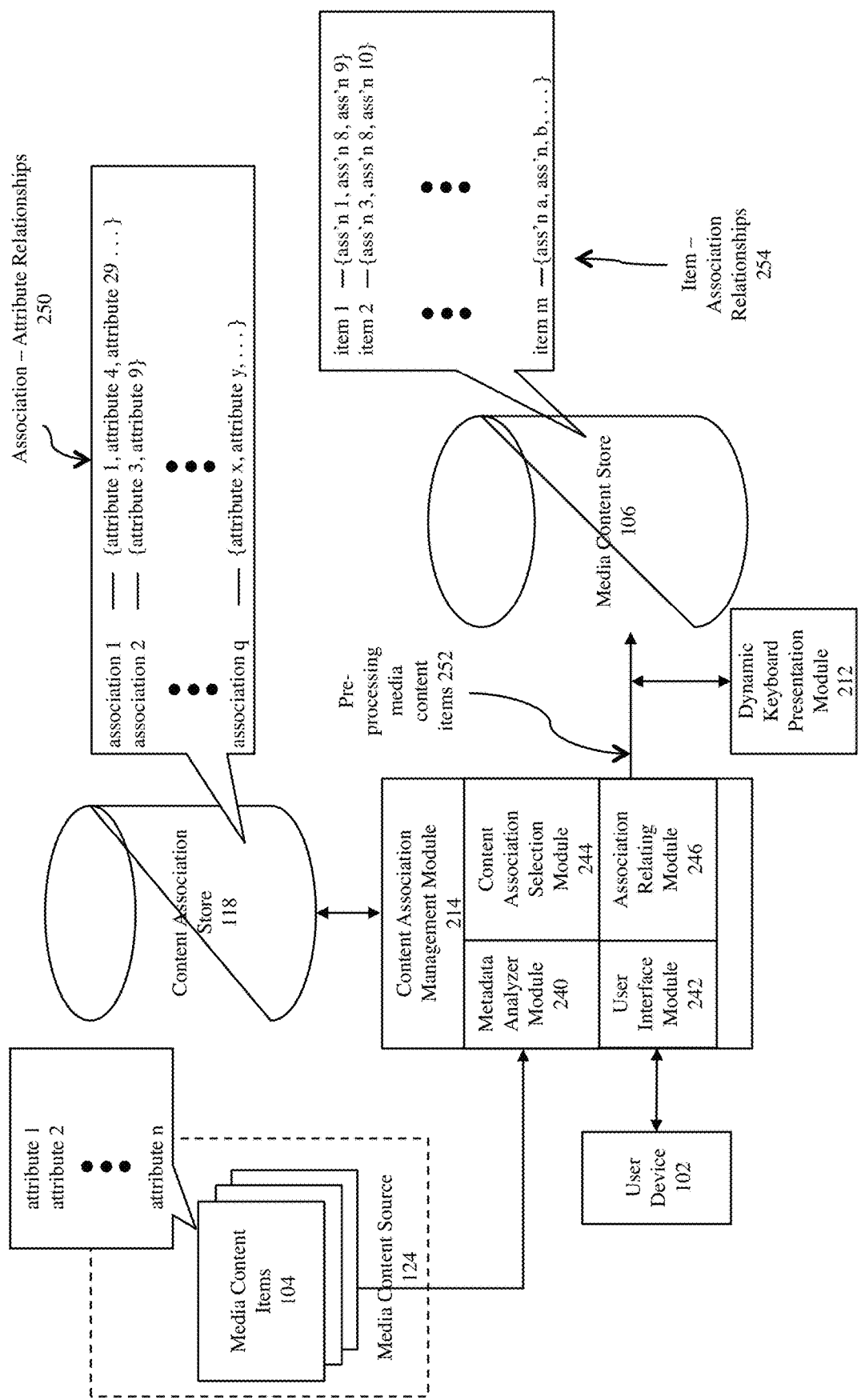
FIG. 2B is a high-level block diagram of a system for categorizing procured content for performing search in a media content management system, according to an embodiment.

FIG. 2B is a high-level block diagram of a system for categorizing procured content for performing search in a media content management system, according to an embodiment. A content association management module 214 may include a metadata analyzer module 240, a user interface module 242, a content association selection module 244, and an association relating module 246, in one embodiment.

As media content items 104 having one or more attributes are received in the media content management system 100 from a media content source 124, a metadata analyzer module 240 may generate one or more content associations based on the attributes of the media content items 104. For example, media content items 104 from the movie, "Toy Story," may be automatically content associated in the collection "Toy Story" based on a movie metadata attribute associated with the media content items 104. In one embodiment, administrators of the media content source 124 may associate one or metadata attributes to the media content items 104. Metadata attributes may be stored in various ways in the source files of the media content items 104, such as header content associations within the source files, as well as other files associated with the source files, such as XML files describing content items being procured in batches by the media content system 100.

The metadata analyzer module 240 may parse through the metadata associated with media content items 104 and automatically generate and/or select content associations from the content association store 118 based on one or more rules, in one embodiment. As illustrated in FIG. 2B, the content association store 118 may store association-attribute relationships 250, such that attributes have been associated with content associations. In this way, the metadata analyzer module 240 may automatically assign a content association to a media content item 104 based on the association-attribute relationships 250 stored in the content association store 118.

Other metadata attributes that may be analyzed by the metadata analyzer module 240 includes an Internet Protocol (IP) address of the mobile device or user device used by a searching user or curating user. An IP address may provide an indication of a geographic location of a user, including country of origin. Alternatively, a Global Position System (GPS) of a mobile device may include a current geographic location of the user. As a result, different collections or content associations may be presented to the user based on the predominant language spoken at the geographic location of the user. In another embodiment, another metadata attribute that may be analyzed by the metadata analyzer module 240 includes the one or more languages selected by the viewing user. In this way, language preference may help inform searching intent, curating intent, or both. A word in French, for example, may have a completely different meaning in Indonesian. As a result, language and country of origin may be a metadata attribute that may be determined by a metadata analyzer module 240.

A user interface module 242 may provide one or more user interfaces for a user device 102, such as a computer or mobile device, to select one or more content associations for procured media content items 104. For example, a curating user may be given the ability to assign one or more content associations from the content association store 118 to media content items 104. In this way, the content association management module 214 enables manual selection of content associations for categorizing the procured media content items 104.

A content association selection module 244 may provide one or more content associations from the content association store 118 in one or more user interfaces provided by the user interface module 242, according to an embodiment. In one embodiment the content association selection module 244 may present predicted content associations based on the content association-attribute associations 250 stored in the content association store 118 for selection and/or confirmation by a curating user operating a user device 102. For example, a media content item 104 may have a genre attribute of comedy based on pre-populated information from the media content source 124. Because the "comedy" attribute may be associated with a "#HAPPY" content association, the media content item 104 may have been assigned the "#HAPPY" content association by the metadata analyzer module 240, in one embodiment. The content association selection module 244 may present the "#HAPPY" content association along with other related content associations in a user interface provided by the user interface module 242 for a curating user to assign or revoke content associations associated with the associated content item 104. The association-attribute associations 250 stored in the content association store 118 may include content associations that are related to other content associations, in one embodiment. For example, a "#HAPPY" content association may be related to a "LOL" and a "LMAO" content association because both LOL and LMAO include a "laughing" interpretation. As a result, other content associations may be presented for selection by a curating user, in one embodiment.

As part of the procurement process, media content items may be pre-processed 252 before being stored in the media content store 106. This enables the media content items 104 to be retrieved quickly and rendered seamlessly in the dynamic keyboard interface 122 on a user device 102. Pre-processing of media content items 252 may include reducing pixel count, modifying resolution definition, and other file size reduction techniques. The dynamic keyboard presentation module 212 may be used to perform this pre-processing of media content items 252, in one embodiment. Beneficially, pre-processing of media content items 252 enables a dynamic keyboard interface 122, presented to a user on a user device 102b, to render at least two renderings of at least two media content items in animation and to display them concurrently in the dynamic keyboard interface 122.

An association relating module 246 may relate content associations to media content items 104 in the media content store 106. Content associations may be associated to content items automatically by a metadata analyzer module 240 (or other modules in the media content management system 100) or the content associations may be associated as a result of a selection of content associations received through a user interface provided by the user interface module 242. As illustrated in FIG. 2B, item-association relationships 254 are stored in the media content store 106. Each content item may have a content identifier and each content association may have a content association identifier such that the item-association relationships 254 may be stored in the media content store 106. As illustrated in FIG. 2B, a content item ("item") may be related to one or more associations ("ass'n"), and the item-association relationships 254 are stored in the media content store 106, for example.

Composite Content Creation

Figure 2C:
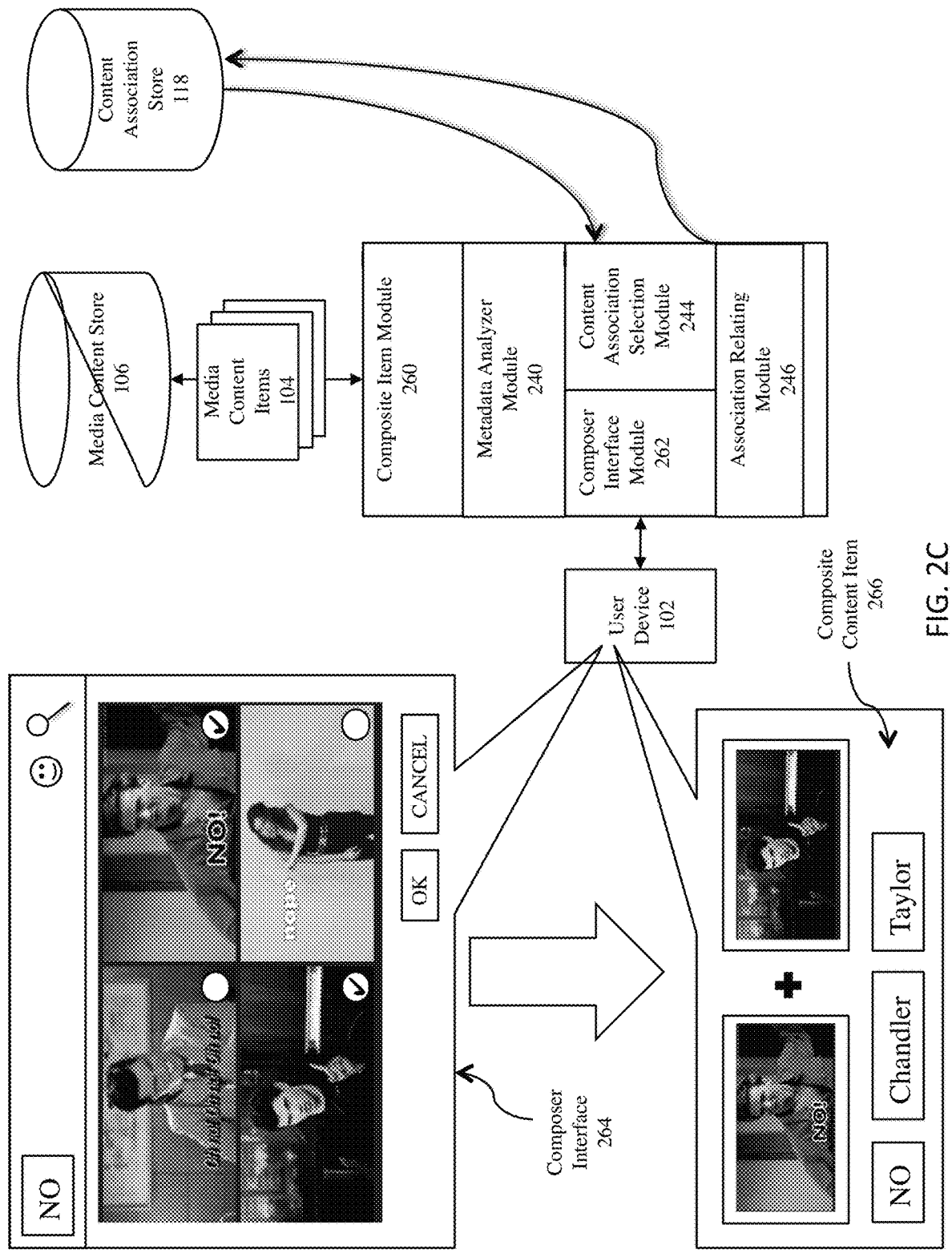
FIG. 2C is a high-level block diagram of a system for composing a composite content item in a media content management system, according to an embodiment.

FIG. 2C is a high-level block diagram of a system for composing a composite content item in a media content management system, according to an embodiment. A composer interface 264 may be provided on a user device 102 that enables a viewing user to search media content items 104 and select two or more content items to generate a composite content item. As illustrated, two content items have been selected in the composer interface 264 to create a composite content item 266 having the combined attributes of the two selected content items. For example, a viewing user may search for "No" through a search interface, described in more detail later. Several content items 104 may be retrieved that meet the search term, "No." A first selected content item may have been associated with content associations of "No" and "Chandler" while a second selected content item may have been associated with content associations of "No" and "Taylor." As a result, the composite content item 266 may include the content associations "No,"

"Chandler," and "Taylor." The composite content item 266 may be received by a composer interface module 262 and stored by the composite item module 260 as a media content item 104 in the media content store 106. As further illustrated in FIG. 2C, a composite item module 260 may operate in conjunction with, or include, a metadata analyzer module 240, a content association selection module 244, and an association relating module 246 that operate similarly as described above, in addition to a composer interface module 262.

In at least some embodiments, a composite content item 266 may be associated with an expressive statement that conveys a different meaning than the individual content items included in the composite content item 266. Returning to the example above, a first content item 104 with the character "Chandler" expressing the statement, "No," may convey a particular meaning to most users of the media content management system 100. A curating user of the media content management system 100 may associate other content associations with that particular content item 104, such as "#cool" and "FRIENDS." The second content item 104 depicting a celebrity, TAYLOR LAUTNER, may evoke a separate and different meaning from the first content item 104 depicting the character "CHANDLER" from the television show, FRIENDS. The second content item 104 may be content associated, automatically or manually, with a content association of "cool" and/or "famous," for example, in addition to the shared content association of "No." As a result, the combination of the two media content items presents information different than each of the media content items presented separately. In one embodiment, the expressive statement presented by the composite content item 266 may be a simple conglomeration of the content associations associated with the individual content items included in the composite content item 266. In another embodiment, an expressive statement that is different from the content associations included in the individual content items may be extracted or otherwise interpreted from the composite content item 266. This expressive statement, as stored by the associated content associations associated with the composite content item 266, will be used in correlating a searching user's intent to relevant content items, as described herein.

Figure 3A:
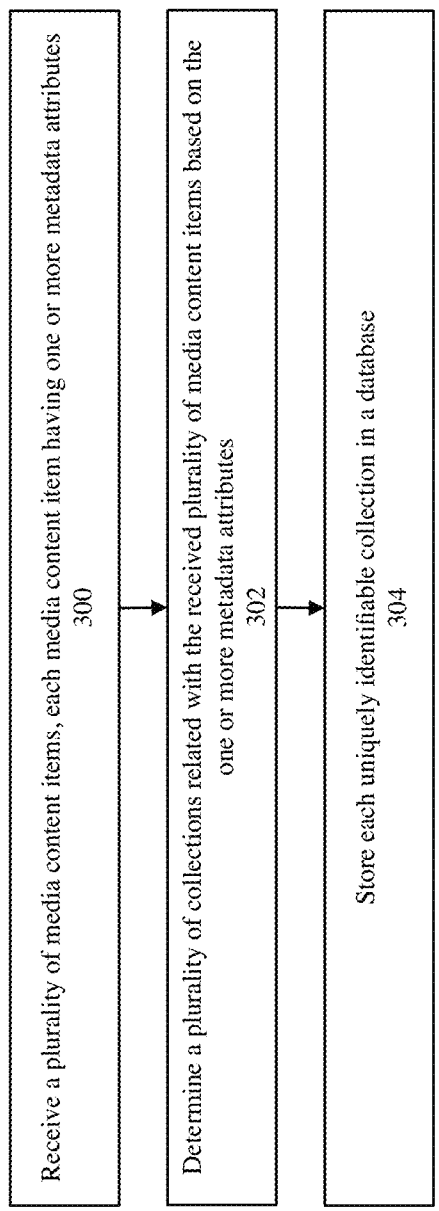

FIGS. 3A-E are example flowcharts of a process for categorizing procured content in a media content management system, according to an embodiment. FIG. 3A illustrates a process for categorizing procured content in the media content management system 100. Media content items are received 300, and each media content item has one or more metadata attributes. Collections, or sets of media content items organized by content associations, are determined 302 to be related with the received media content items based on the one or more metadata attributes. Each uniquely identifiable collection is then stored 304 in a database in the media content management system 100. Collections may be uniquely identifiable based on content associations and content association identifiers, in one embodiment.

Figure 3B:
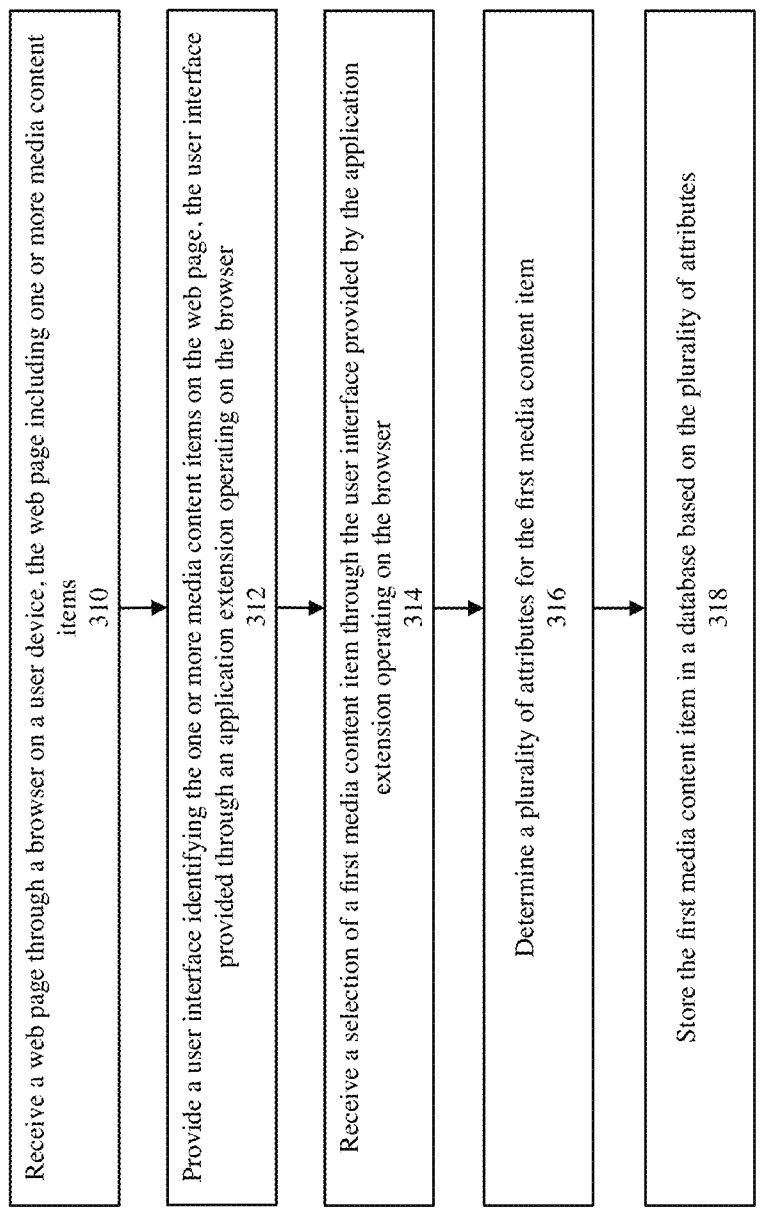

FIG. 3B illustrates an example flowchart of a process for categorizing procured content through a user device, in one embodiment. A web page is received 310 through a browser on a user device. The web page may include one or more media content items. A user interface identifying the one or more media content items on the web page may be provided 312. The user interface may be provided 312 through an application extension operating on the browser. For example, a media content management system 100 may enable users to download an application extension onto their devices that enable the application extension to be linked to the browser on the user device such that a user interface may be provided 312 on the user device.

A selection of a first media content item may be received 314 through the user interface provided by the application extension operating on the browser. The selection may be a user selection through the user interface, such as a click, a touch on a touchscreen, or a gesture on a wearable device, for example. A multitude of attributes may then be determined 316 for the first media content item. As mentioned about, various modules of the media content system 100 may be used to determine 316 attributes of the first media content item. The first media content item may then be stored 318 in a database based on the plurality of attributes. This may include associating the first media content item to be included in one or more collections based on the determined attributes.

FIG. 3C illustrates a process for categorizing procured content based on a context associated with the content. A database including a multitude of content associations may be maintained 320. Content associations may be curated by administrators or curating users of the media content management system 100. For example, a pictorial representation of happiness may be an emoji of a smiley face, in one embodiment. This smiley face emoji may be associated with a content association of "#HAPPY," in one embodiment. In addition, an attribute of smiling or laughing may be curated to be associated with the content association of "#HAPPY" in the content association store 118, in an embodiment. In this way, content associations are maintained 320 in a database.

A content item having one or more visual characteristics and one or more attributes may be received 322 by the media content management system 100. At least one of the one or more visual characteristics and the one or more attributes may be analyzed 324 to determine a context associated with the content item. As mentioned above, a visual characteristic, such as a smile, may be analyzed and determined such that the context of the content may be a happy context. In other embodiment, other attributes, such as a content source or genre of the content item, as identified in metadata attributes, may be analyzed 324 to determine the context of the content item. A content association may then be selected 326 from the maintained database of content associations, where the content association is selected 326 based on the determined context of the content item. The content item is then stored 328 in a database based on the selected content association. In one embodiment, the database is the same maintained database of content associations. In another embodiment, the database where the content item is stored 328 is in a separate content store, such as the media content store 106.

Figure 3D:
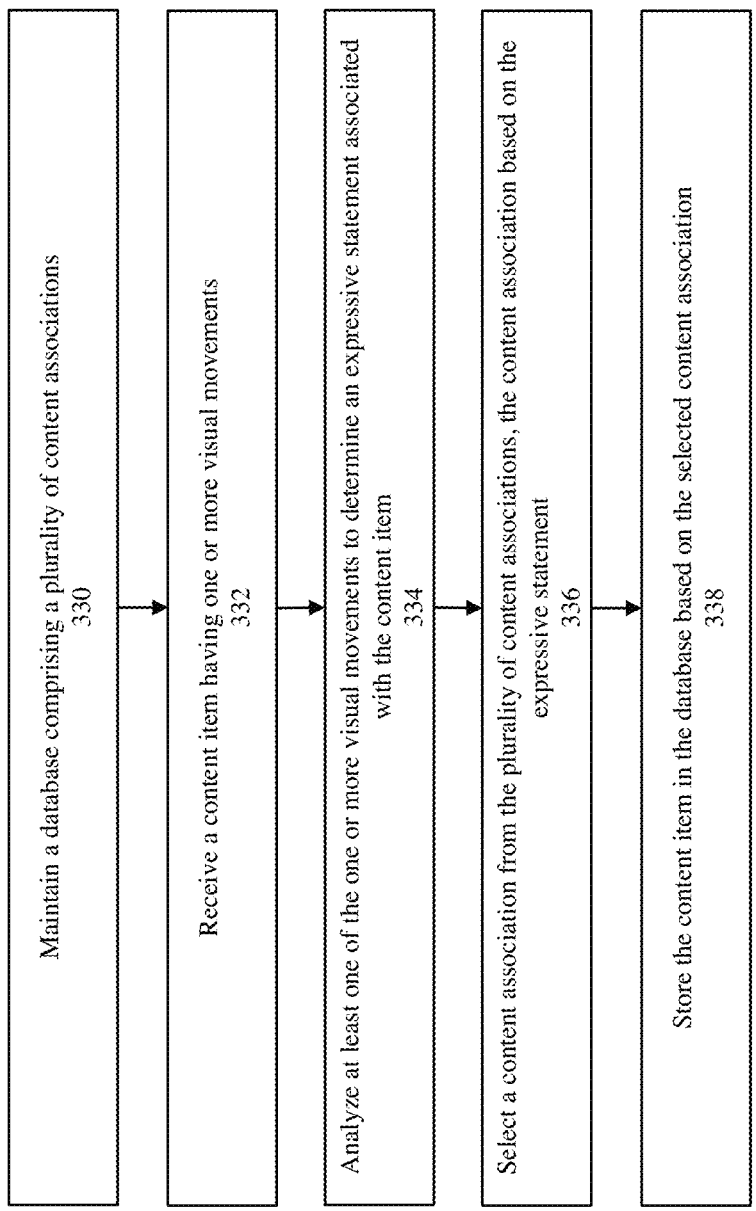

FIG. 3D illustrates a flowchart of a process for categorizing procured content based on an expressive statement associated with the content. A database including a multitude of content associations may be maintained 330. A content item may be received 332 where the content item includes one or more visual movements. The one or more visual movements may then be analyzed 334 to determine an expressive statement associated with the content item. Here, the one or more visual movements may include a smile and computer vision techniques may be used to analyze 334 the content and the visual movements to determine the smile. A heuristics engine 216 may be used to determine that visual movements indicating a smile may correlate with an expressive statement that the content item is about happiness, based on a heuristic rule.

Once an expressive statement is determined through analyzing 334 at least one of the one or more visual movements, a content association is selected 336 based on the expressive statement. In one embodiment, an expressive statement is an attribute associated with content associations in the content association store 118, stored as content association-attribute associations 250 as described above and illustrated in FIG. 2B. In other embodiments, an expressive statement may be stored as a content association in the content association store 118. For example, an expressive statement in the example above may be "happiness" such that the content association associated with the "happiness" expression is the "#HAPPY" content association. In other embodiments the expression "happiness" may be stored as its own "happiness" content association and related, or otherwise associated with the "#HAPPY" content association. Thus, a content association may be selected 336 based on the expressive statement. The content item may then be stored 338 in the database based on the selected content association. In one embodiment, the content item may be stored 338 in a separate content store, such as the media content store 106. In another embodiment, the content item may be stored 338 in the content association store 118.

Figure 3E:
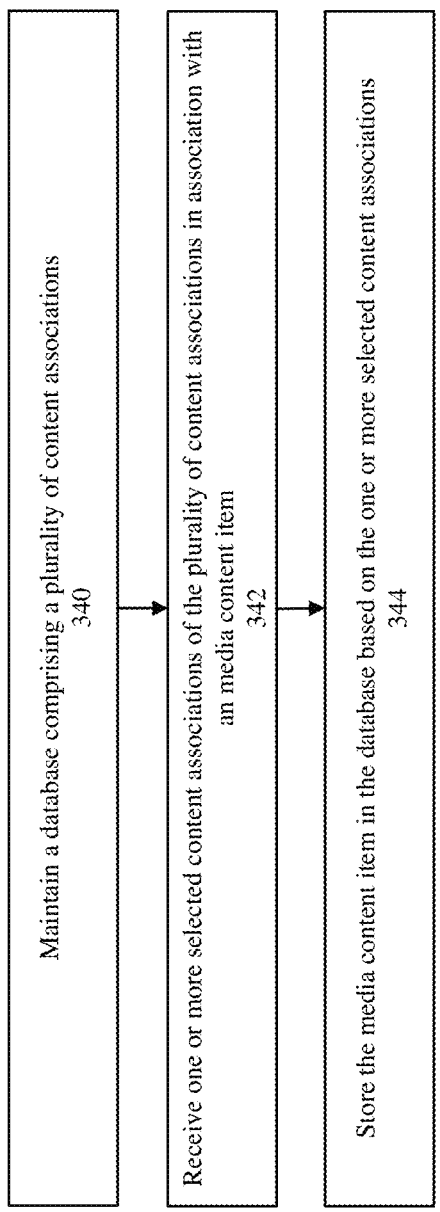

FIG. 3E illustrates a process for categorizing procured content in the media content management system, in one embodiment. A database including content associations may be maintained 340. One or more selected content associations may be received 342 from the content associations in association with a media content item. For example, the one or more selected content associations may be received 342 through a user interface provided to a curating user of the media content management system 100 on a user device 102. The one or more selected content associations may be manually selected by the curating user or may include automatically selected content associations based on analysis of the media content item by one or more modules of the media content management system 100, as described herein. The media content item may then be stored 344 in the database based on the one or more selected content associations.

Automatically Categorizing Procured Content

Figure 4:
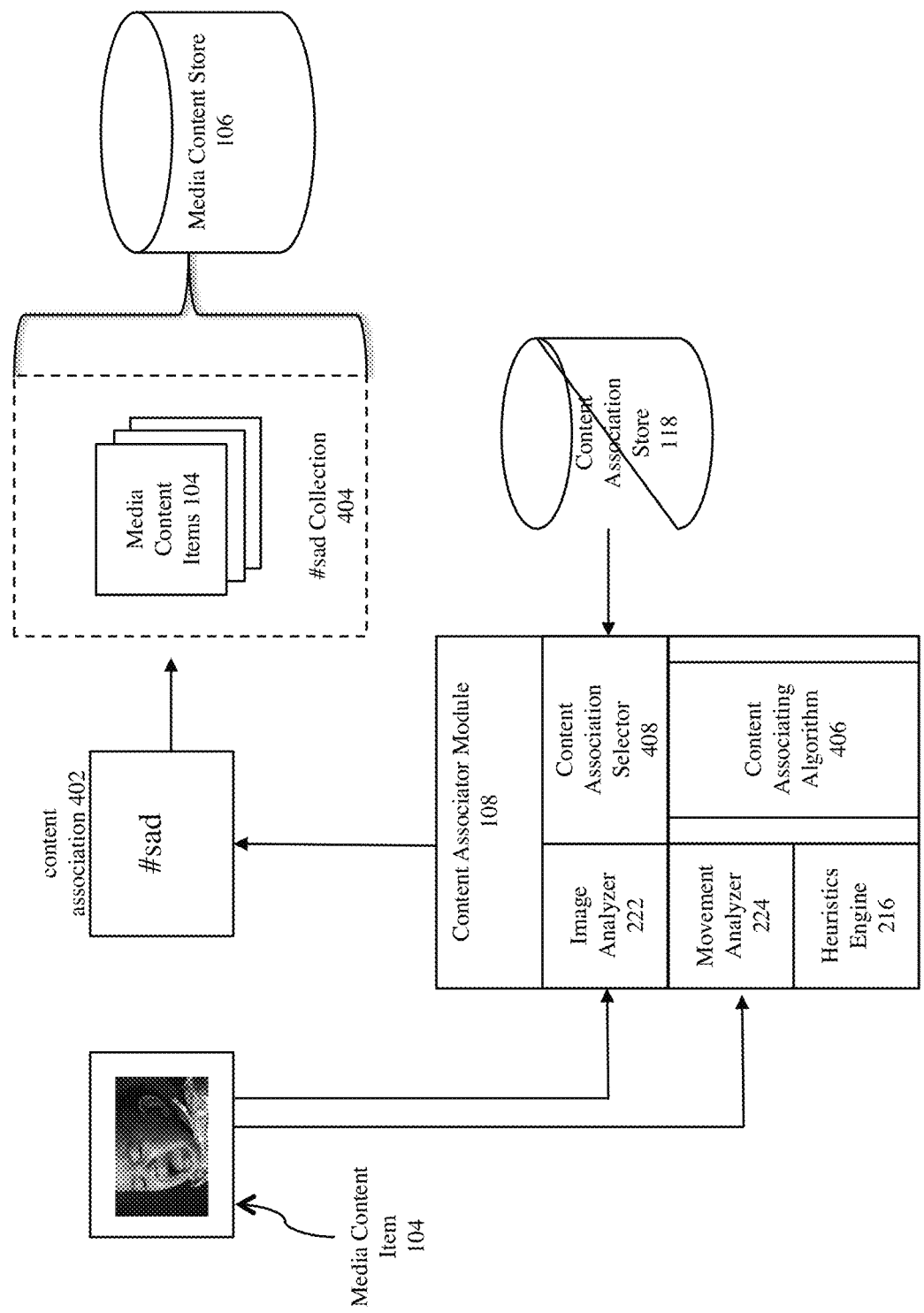
FIG. 4 is a high-level block diagram of a system for categorizing procured content in a media content management system, according to some examples.

FIG. 4 is a high-level block diagram of a system for categorizing procured content in a media content management system, according to some examples. A content associator module 108 may include a content associating algorithm 406 for automatically selecting a content association 402 for a media content item 104. The content associator module 108 may further include a content association selector 408 for selecting the content association 402 from the content association store 118. The content associator module 108 may operate in conjunction with or include an image analyzer 222, a movement analyzer 224, and a heuristics engine 216 to aide in automatically selecting a content association 402 for a media content item 104.

An image analyzer 222 may include computer vision techniques that recognize facial features, such as a face, eyes, a mouth smiling, a mouth frowning, and so forth. An image analyzer 222 may further include other computer vision techniques and/or pattern recognition algorithms to create baseline training sets for recognizing these facial characteristics. Similarly, a movement analyzer 224 may include computer vision techniques and/or pattern recognition algorithms, as well as machine learning and Bayesian inference techniques to recognize crying, laughing, falling, and other actions that may be modeled in similar ways. A movement analyzer 224 may also include eye-tracking functionality to identify a location of eyes within a set of images or an animated image. The eye-tracking functionality of the movement analyzer 224 may be used in conjunction with one or more other modules in the media content management system 100 to generate a new media content item 104, such as rendering a pair of sunglasses onto the animated set of images over the detected eyes within the images, for example. Other modules may be used to add text to media content items 104, such as the phrase "deal with it" to create and/or generate new media content items 104. A heuristics engine 216, as described earlier, may use various rules to arrive at conclusions based on received data. For example, as illustrated in FIG. 4, a media content item 104 may include a GIF of a baby crying, for example. An image analyzer 222 may analyze the frames of the GIF of the media content item 104 and determine facial characteristics such as a pair of eyes squinting, a mouth open in a frown-like position, and eyebrows raised. A movement analyzer 224 may identify that the media content item 104 includes a baby crying based on baseline models of babies crying and other machine learning techniques.

As a result, the content associator module 108 may select one or more content associations from a content association store 118, through a content association selector 408. The content associating algorithm 406 may include one or more heuristic rules from a heuristics engine 216 to automatically generate a content association for a media content item 104. In this example, a "#sad" content association 402 has been selected for the media content item 104. As described earlier, content associations may be associated with other content associations, such as a crying content association may be associated with a "#sad" content association 402. In this way, the media content item 104 of a baby crying may be included in the "#sad" collection 404 based on the automatically generated content association and stored in the media content store 106.

Figure 5A:
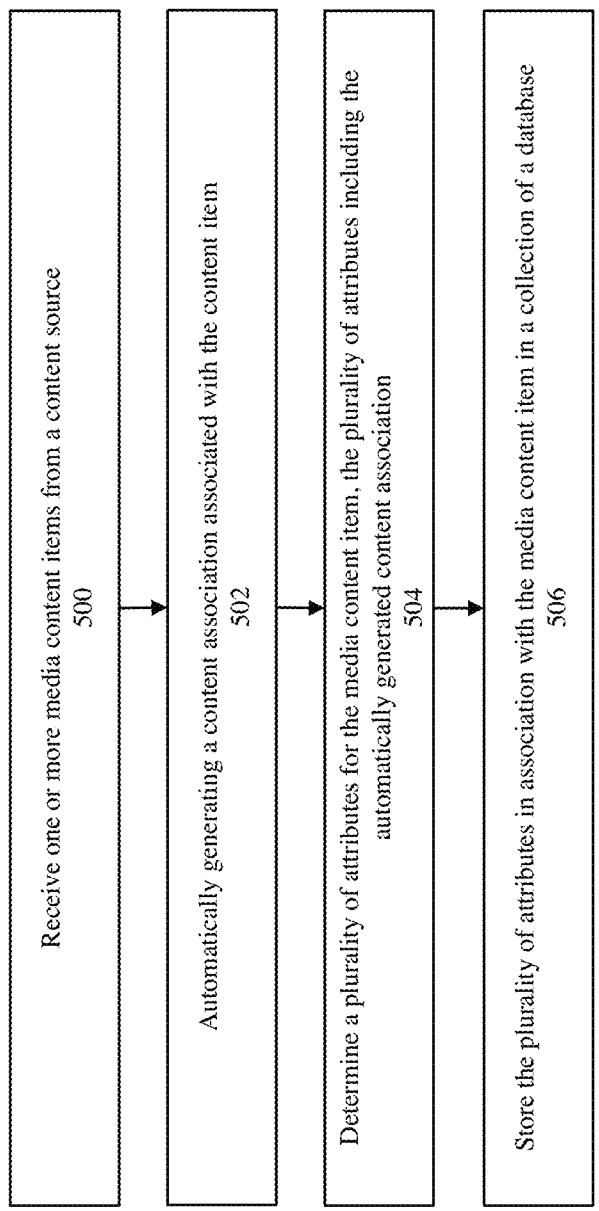
FIGS. 5A-B are example flowcharts of a process for categorizing procured content in a media content management system, according to some examples.
Figure 5B:
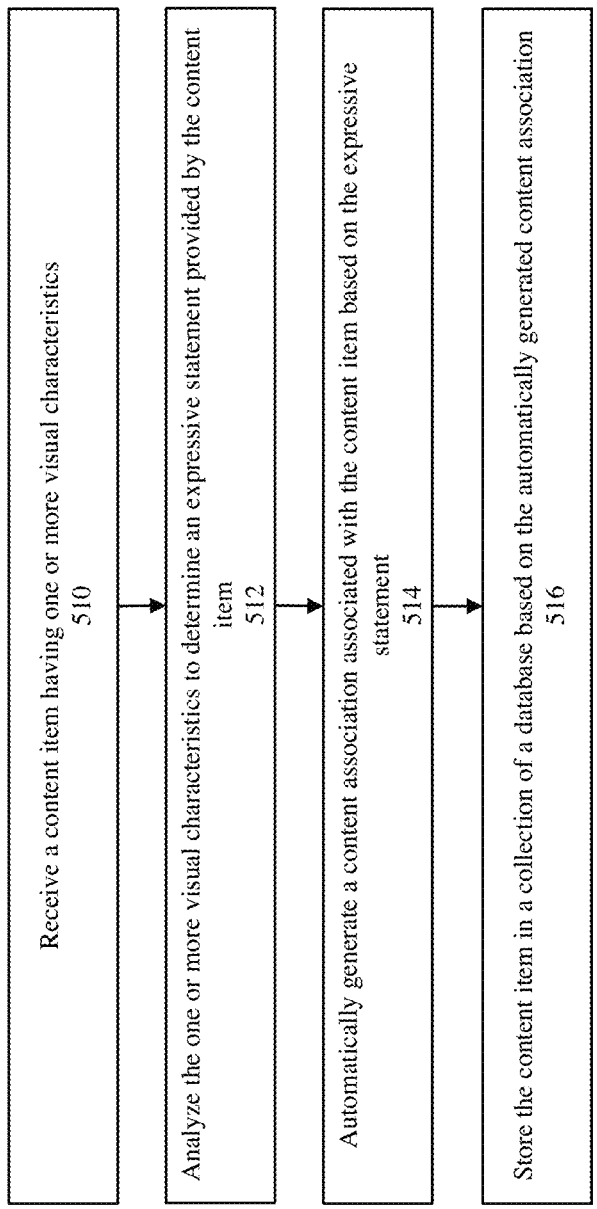

FIGS. 5A-B are example flowcharts of a process for categorizing procured content in a media content management system, according to some examples. As illustrated in FIG. 5A, one or more media content items may be received 500 from a content source. For example, a partner or a content owner may send media content items to be received 500 by a media content management system 100. A content association may be automatically generated 502 in associated with the content item. As described above, a content association may be selected from a content association store 118 and automatically generated 502, or selected. A multitude of attributes may be determined 504 for the media content item, including the automatically generated content association. Attributes may be determined 504, such as metadata attributes including a content source, a website from where the content item originated, dimensions of the content item, genre of movie or television show, characters, as well as text strings included in the content item. The attributes may then be stored 506 in association with the media content item in a collection of a database.

FIG. 5B further illustrates a flowchart of categorizing procured content in a media content management system, according to an embodiment. A content item having one or more visual characteristics is received 510. The one or more visual characteristics are analyzed 512 to determine an expressive statement provided by the content item. As described above, an image analyzer 222 and/or a movement analyzer 224 may analyze 512 the visual characteristics of the content item. An expressive statement is determined based on the analysis 512, such as an emotion or emotional state. Actions such as crying and falling may be mapped to a sad or unhappy emotional state, according to various heuristic rules in a heuristics engine 216. Other expressive statements may include other emotions and reactions. Expressive statements may further include discoverable content content associations, such as content associations representing phrases, sayings, idioms, movie quotes, and/or other expressions.

Discoverable content content associations may also include slang, including Internet slang, which may include such shorthand as "LOL," "FML," "LMAO," "NSFW," "YOLO," "FOMO," and so forth. Other discoverable content content associations may include initials of various television shows, such as "AGT" for a television show called "America's Got Talent." Discoverable content associations may be generated by content owners and/or content sources, in one embodiment, to develop a brand and/or viral messaging. In other embodiments, discoverable content associations, such as the Internet slang mentioned above, may be bid on by competing advertisers and/or partners such that sponsored content items may appear higher in search results, for example. In yet other embodiments, a partner may publish a stand-alone application that utilizes a media content management system 100 through application programming interfaces used to access the search router rules engine 206 and/or other modules described herein. For example, a stand alone application for NBC UNIVERSAL may specifically present media content items 104 from movies and television shows produced and owned by NBC UNIVERSAL, but that application may use one or more application programming interfaces to present a dynamic keyboard interface 122. In a further embodiment, a media content management system 100 may boost visibility of content associations based on paid advertising, partnerships, sponsored ads, and so forth.

Searching Procured Content

Figure 6:
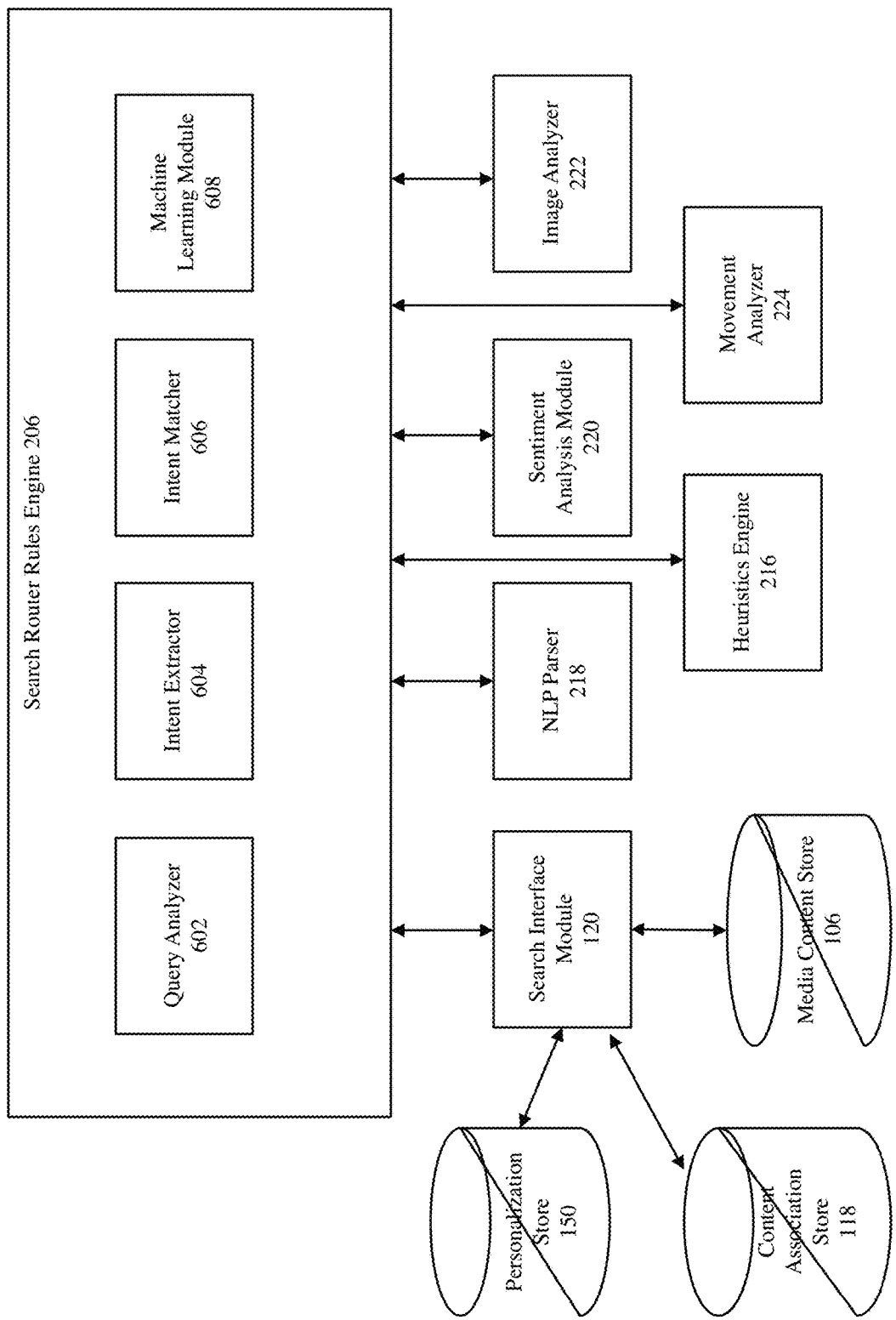
FIG. 6 is a high-level block diagram of a system for performing search to implement animated inputs in a dynamic interface, according to some examples.

FIG. 6 is a high-level block diagram of a system for performing search to implement animated inputs in a dynamic interface, according to some examples. A search router rules engine 206 may include a query analyzer 602, an intent extractor 604, an intent matcher 606, and a machine learning module 608. A query analyzer 602 may breakdown received text and/or picture into overlapping windows, in one embodiment. For example, a searching user may enter the search term "happy birthday" as a query. The query analyzer 602 may breakdown the query into words and partial words that overlap, such as "ha," "happy," "birth," "birthday," "happy birth," and "happy birthday." The query analyzer 602 may provide the words and partial words to the search interface module 120 for searching in the media content store 106 based on the words and partial words on the content associations of the associated media content items, in one embodiment.

In another embodiment, the query analyzer 602 may provide the words and partial words to the intent extractor 604. For example, the intent extractor 604 may have previously mapped or extracted intent from the query "happy birthday" to include an intent to celebrate a birthday. Thus, the term "happy birthday" may specifically be mapped only to content items having birthday elements, such as a cake, candles, the text string "happy birthday," a party, a person blowing out candles, and the like. The intent extractor 604 may further provide the words and partial words to a natural language processing (NLP) parser 218 to derive meaning and/or intent from the search terms. An NLP parser 218 may be particularly useful, in one embodiment, where a search term is unrecognized. For example, if the search term were "happy dia de los muertos" and the terms "dia de los muertos," Spanish for "day of the dead," were not included in a dictionary or corpus of learned terms, the intent extractor 604 may extract the intent of the searching user wishing to celebrate something happy based on the word "happy" being included in the search query. If, on the other hand, "muertos" is included in a dictionary or text strings included as metadata attributes of content items, then the NLP parser 218 may be relied upon to present content items associated with both the "happy" and "muertos" content associations.

An intent matcher 606 may, in one embodiment, be used in the search router rules engine 206 to match an intent of a searching user to one or more content associations in a content association store 118. Returning to the previous example, the term "happy" included in the search query "happy dia de los muertos" may cause the search query to be matched by the intent matcher 606 to a "#happy" content association for further queries. The term "muertos" may be matched to a "dead" content association and a "Halloween" content association, in one embodiment. Because "dia de los muertos" is not directly related to Halloween, but is actually a Mexican holiday occurring on November 1, some content items may not be presented. An intent matcher 606 may adjust the matches, in one embodiment, between search phrases and content associations, in one embodiment. The matches may be stored in the content association store 118, in one embodiment.

In another embodiment, the intent matcher 606 may, in conjunction with a machine learning module 608, analyze user feedback, such as selecting content items having both a "Halloween" attribute and a "skull" attribute when those items are presented in search results in response to the "happy dia de los muertos" search query.

As a result, the intent matcher 606 may generate a new match between the search phrase "happy dia de los muertos" and content items having both the "Halloween" and "skull" content associations. In one embodiment, the intent matcher 606 may determine a likelihood score of intent match based on probabilistic methods and/or machine learning for each match. This score may be stored in the content association store 118 for each intent match. These scores may be further based on statistical inference algorithms as provided by the NLP parser 218 and machine learning module 608.

A machine learning module 608 may use various machine learning methods, such as supervised and unsupervised learning methods, Bayesian knowledge base, Bayesian network, nearest neighbor, random walk, and other methods to determine various outcomes based on received training data and received user feedback (based on whether viewing users selected/shared content items presented in a search result set). For example, sometimes a random content item is presented along with the content items having a certain attribute, such as the "#happy" content association. Other times, the same content item may be presented randomly among search results for a different content association, such as "dog." The randomly presented content item may not be associated with either the "#happy" content association or the "dog" content association, but searching and/or viewing users may frequently select and share the randomly presented content item. As a result, a machine learning module 608 may determine that the randomly presented content item is selected 80% of the time overall, 70% of the time when presented with content associated as "#happy," and 60% of the time when presented with content associated as "dog." The machine learning module 608 may be used to further automate the process and create a heuristic rule to automatically present the content item when a search query includes both terms "#happy" and "dog," as well as when a search query includes one of the terms. In one embodiment, a machine learning module 608 may associate, or relate, a content association to a content item based on the content item being selected among search results having a common attribute over a threshold percentage of time, such as 50%. Correlations such as these may also require administrator approval through a user interface, in accordance with at least one embodiment.

A search router rules engine 206 may further include rules for processing search queries to optimize processing time and to include search results even where no direct match exists in the media content management system 100. For example, the search router rules engine 206 may operate in conjunction with a sentiment analysis module 220, an image analyzer 222, and/or a movement analyzer 224 to analyze content items in the media content store 106 that do not have associated attributes. A sentiment analysis module 220 may be used to process words, partial words, and search queries to determine whether the intent includes positive, negative, or neutral connotations. An image analyzer 222 may be similarly used to process received images received as search queries to extract an intent of the searching user. For example, if the image is a photo captured by a mobile device directly sent as a query, the photo may be analyzed by the image analyzer 222 to detect visual characteristics, such as facial expressions and activities occurring in the photo. Further, a movement analyzer 224 may be used to detect actions, behaviors, and patterns of movement, such as laughing, crying, falling, shaking hands, first bumping, chest thumping, eye rolling, hair flipping, and so forth.

Rules may be included in the search router rules engine 206 to associate identified behaviors, actions, activities, and/or facial expressions to one or more expressive statements that are stored as content associations in the content association store 118. These rules may be heuristic rules generated by a heuristics engine 216, in one embodiment.

FIGS. 7A-D are example flowcharts of a process for performing search to implement animated inputs in a dynamic interface, according to some examples. Media content items may be maintained 700 in a media content system, where each media content item is associated with an expressive intent metadata content association. As described above, an expressive intent metadata content association may be generated based on analysis of the content item, such as by an image analyzer 222, movement analyzer 224, sentiment analysis module 220, and so forth. An expressive intent metadata content association may be associated with a content item maintained 700 in a media content system based on statistical inferences using the NLP parser 218 and machine learning module 608, in one embodiment.

A search query may be received 702 from a user interface on a user device. The search query may include a pictorial representation of an expression. An expression may include one or more words that describe an expressive intent, for example. An expression may be less than five words, in one embodiment. In another embodiment, an expression may be a standardized list of expressions used within the media content management system 100. In yet another embodiment, a pictorial representation of an expression may include an emoji. Emoji are ideograms or smileys originally used in Japanese electronic messages and webpages. Emoji may include ASCII emoticons, in one embodiment. Emoji may represent facial expressions, common objects, places, types of weather, animals, and so forth. In one embodiment, a set of emoji may have a standardized set of meanings that may be used in the media content management system by the intent extractor 604 and/or intent matcher 606. In another embodiment, an ASCII emoticon, such as a ':(' sad face, may be an expression. In a further embodiment, the ASCII emoticon ':(' sad face may be mapped to a "sad" expression or "sad" expressive intent metadata content association.

A candidate set of media content items may be determined 704 from the maintained media content items based on the expression received in the search query matching one or more expressive intent metadata content associations associated with media content items in the candidate set. Metadata content associations, or content associations generally, may be stored in the content association store 118, in one embodiment. An expression extracted from the search query, by an intent extractor 604, may be matched by an intent matcher 606, for example, to one of the content associations in the content association store 118. In one embodiment, a pictorial representation of an expression, such as a sad face emoticon ':(' may be weighted more heavily than other terms in the search query. For example, if the search query received 702 included the phrase "working :(" the sad face emoticon be parsed by the query analyzer 602 and the sadness expression may be extracted by the intent extractor 604. In determining 704 the candidate set of media content items based on the expression matching one or more expressive intent metadata content associations, media content items may be selected based on likelihood of the searching user sharing the content item, in one embodiment. The candidate set may be determined 704 based on the match score of the intent matcher 606, in a further embodiment. In yet another embodiment, the candidate set may be determined 704 based on a number of matching rules included in the search router rules engine 206.

The candidate set of media content items are then provided 706 to the user device to display in the user interface in response to the search query. In one embodiment, a randomly selected content item may be included in the candidate set. In another embodiment, a popular or highly shared content item may be included in the candidate set. In a further embodiment, a content item may be included in the candidate set based on one or more statistical inferences from other search queries. The candidate set of media content items may be provided 706 as animated keys or animated inputs, presented to the viewing user in animation, in the user interface in response to the search query, in an embodiment.

Figure 7A:
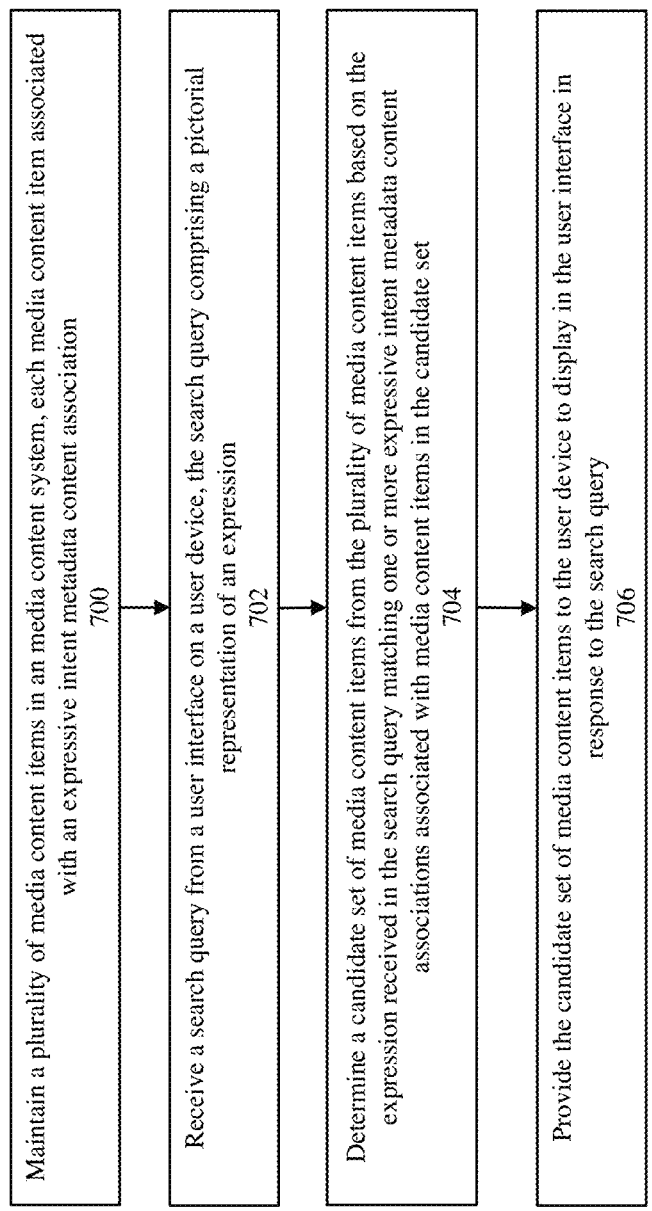
FIGS. 7A-D are example flowcharts of a process for performing search to implement animated inputs in a dynamic interface, according to some examples.
Figure 7B:
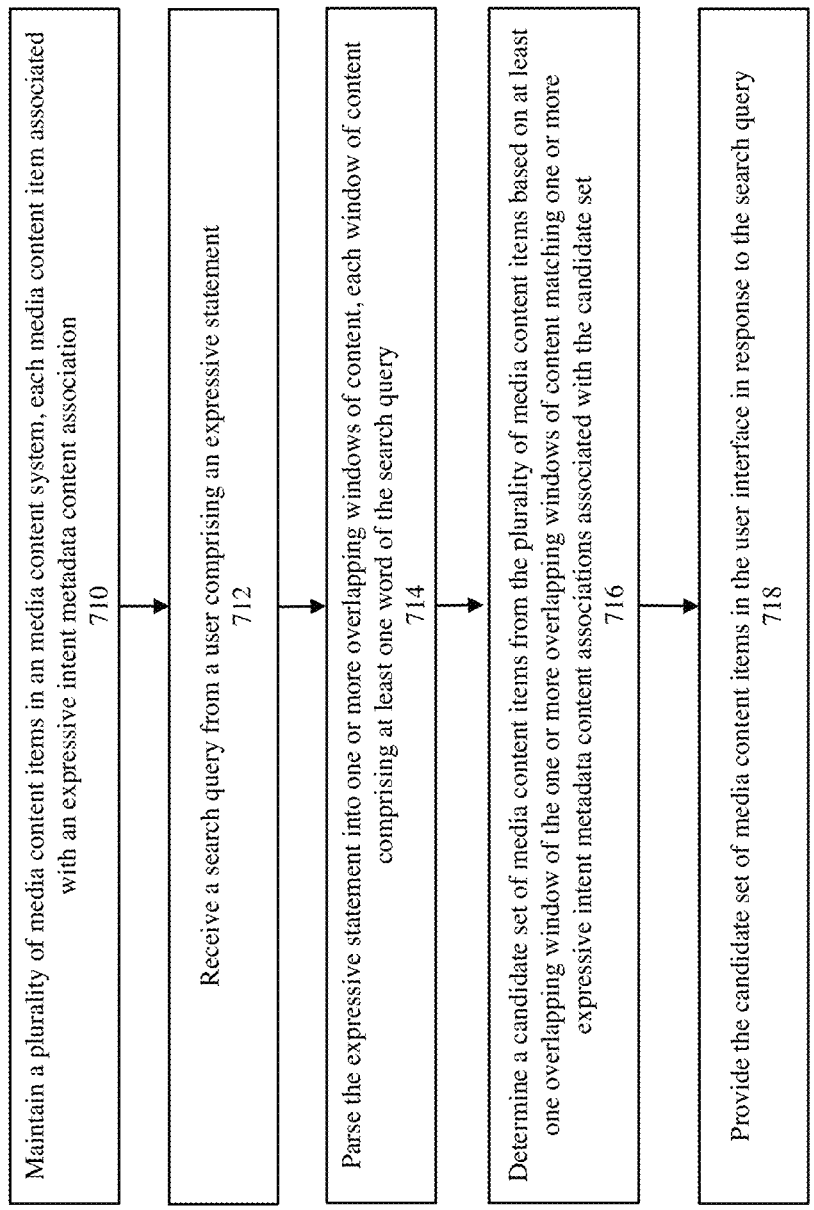

FIG. 7B illustrates an example of a process for performing search to implement animated inputs in a dynamic interface, according to an embodiment. Media content items are maintained 710 in a media content system, where each media content item is associated with an expressive intent metadata content association. As mentioned and described above, an expressive intent metadata content association may be manually selected by curating users of the media content management system 100 or may be automatically generated or automatically selected by a content associator module 108. Further, an expressive intent metadata content association may be assigned by a search router rules engine 206 based on a correlation and/or machine learning methods, as described above.

A search query may be received 712 from a user, where the search query includes an expressive statement. The expressive statement may include one or more words, for example. The expressive statement may also include pictorial representations of expressions, such as emoticons and emoji. The expressive statement may then be parsed 714 into one or more overlapping windows of content, where each window includes at least one word of the search query. Here, a word may include a portion of a word, such as "ha" of the word "happy." A candidate set of media content items may be determined 716 from the media content items maintained 710 in the media content system based on at least one overlapping window of the one or more overlapping windows of content matching one or more expressive intent metadata content associations associated with the candidate set. The candidate set of media content items may be determined 716 by the search router rules engine 206, as described above. The candidate set of media content items are then provided 718 in the user interface in response to the search query.

Figure 7C:
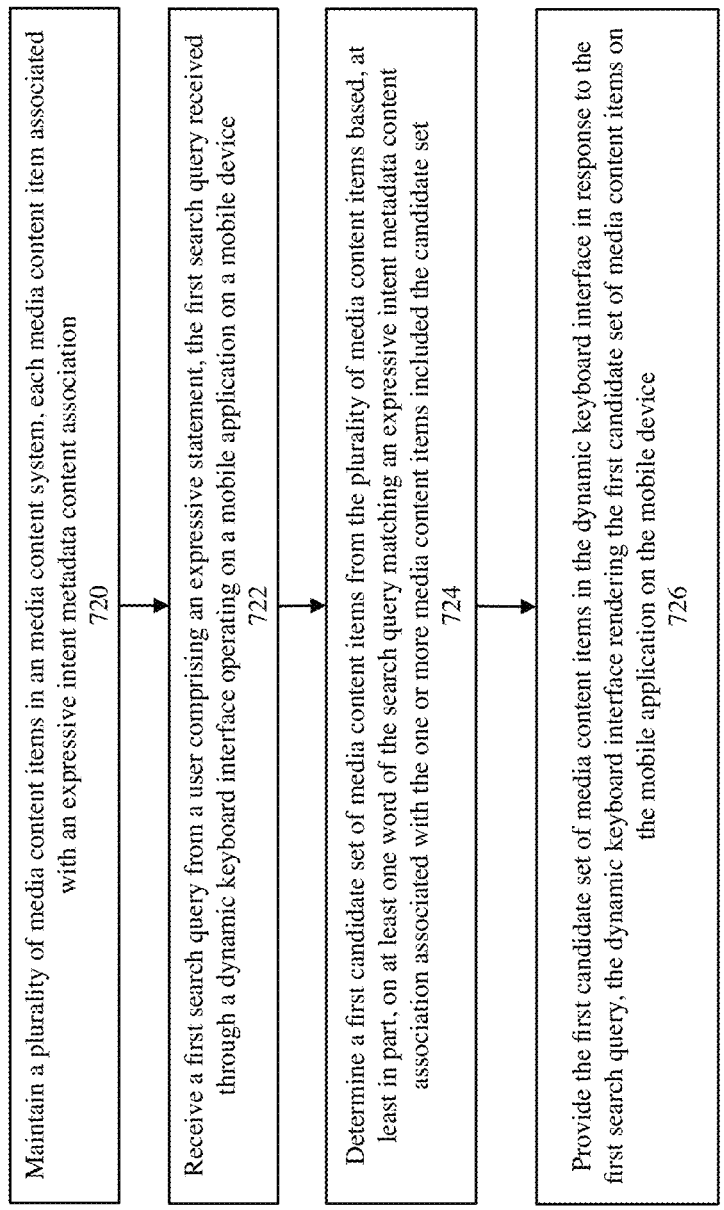

FIG. 7C illustrates another example of a process for performing search to implement animated inputs in a dynamic interface, according to an embodiment. Media content items are maintained 720 in a media content system, where each media content item is associated with an expressive intent metadata content association. A first search query is received 722 from a user. The first search query includes an expressive statement and is received 722 through a dynamic keyboard interface operating on a mobile application on a mobile device. In one embodiment, the dynamic keyboard interface may operate on a native application on the mobile device, such as a texting or other messaging platform, such as IMESSAGE and EMAIL. In another embodiment, the dynamic keyboard interface may operate on a third party application on the mobile device, such as a messaging application for a social networking system, such as TWITTER and FACEBOOK. In a further embodiment, the dynamic keyboard interface may operate on a web browser or any text field where a third party keyboard may be used instead of the mobile device's standard keyboard. In yet another embodiment, the dynamic keyboard interface may be provided on a web page. The mobile device, in that embodiment, may be a laptop computer, for example. In other embodiments, third party applications may incorporate the dynamic keyboard interface in their applications, such as on messaging applications for social networking systems and web interfaces for social networking systems.

A first candidate set of media content items may be determined 724 from the media content items in the media content system based, at least in part, on at least one word of the search query matching an expressive intent metadata content association associated with the one or more media content items included in the candidate set. The first candidate set of media content items are then provided 726 in the dynamic keyboard interface in response to the first search query. The dynamic keyboard interface may render the first candidate set of media content items on the mobile application on the mobile device concurrently and in animation. This rendering may be enabled by the pre-processing performed on the media content items in the media content store 106, as described above.

Figure 7D:
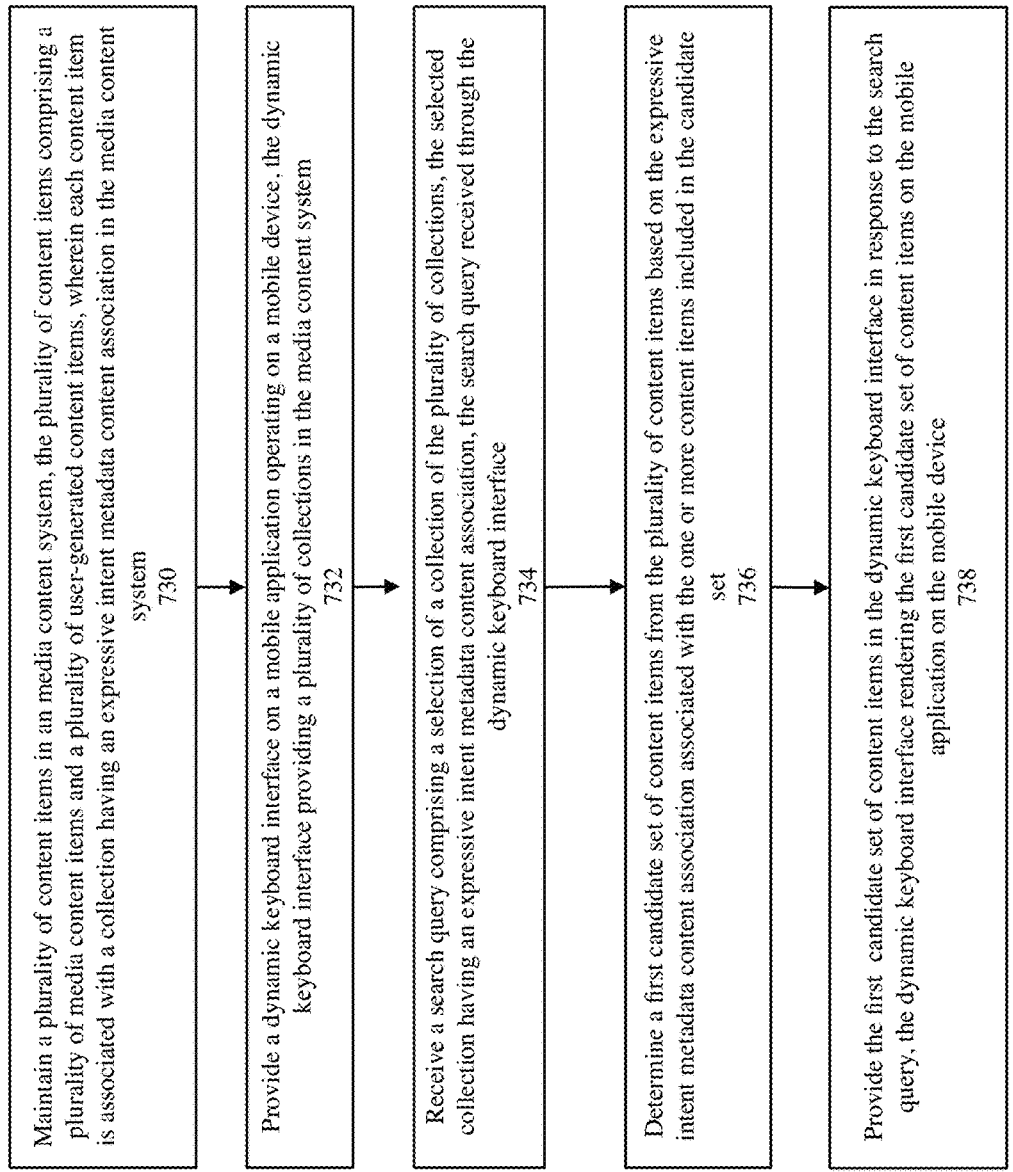

FIG. 7D illustrates yet another example of a process for performing search to implement animated inputs in a dynamic interface, according to an embodiment. A multitude of content items in a media content system are maintained 730, including a multitude of media content items and a multitude of user-generated content items, where each content item is associated with a collection having an expressive intent metadata content association in the media content system. User-generated content items may be uploaded to the media content management system 100, in one embodiment. In another embodiment, user-generated content items may include composite content items generated through a composer interface as illustrated and described in relation to FIG. 2C.

A dynamic keyboard interface may be provided 732 on a mobile application operating on a mobile device, where the dynamic keyboard interface provides a multitude of collections in the media content system. As mentioned above, collections may be defined by content associations, such that a collection includes content items that share at least one content association, such as "#happy." In one embodiment, a collection may further include one or more content items that, through statistical inferences and machine learning, have been associated with one or more content associations shared by the other content items in the collection. The dynamic keyboard interface may present each collection in an animated key or animated input in the dynamic interface. The animated keys may depict the first media content item included in the collection, in one embodiment. The animated keys may be provided 732 in animation, in one embodiment.

A search query including a selection of a collection of the multitude of collections may be received 734, where the selected collection is associated with an expressive intent metadata content association and where the search query is received 734 through the dynamic keyboard interface. A first candidate set of content items is determined 736 from the multitude of content items based on the expressive intent metadata content association associated with the one or more content items included in the candidate set. The first candidate set of content items is then provided 738 in the dynamic keyboard interface in response to the search query, where the dynamic keyboard interface renders the first candidate set of content items on the mobile application on the mobile device.

Figure 8A:
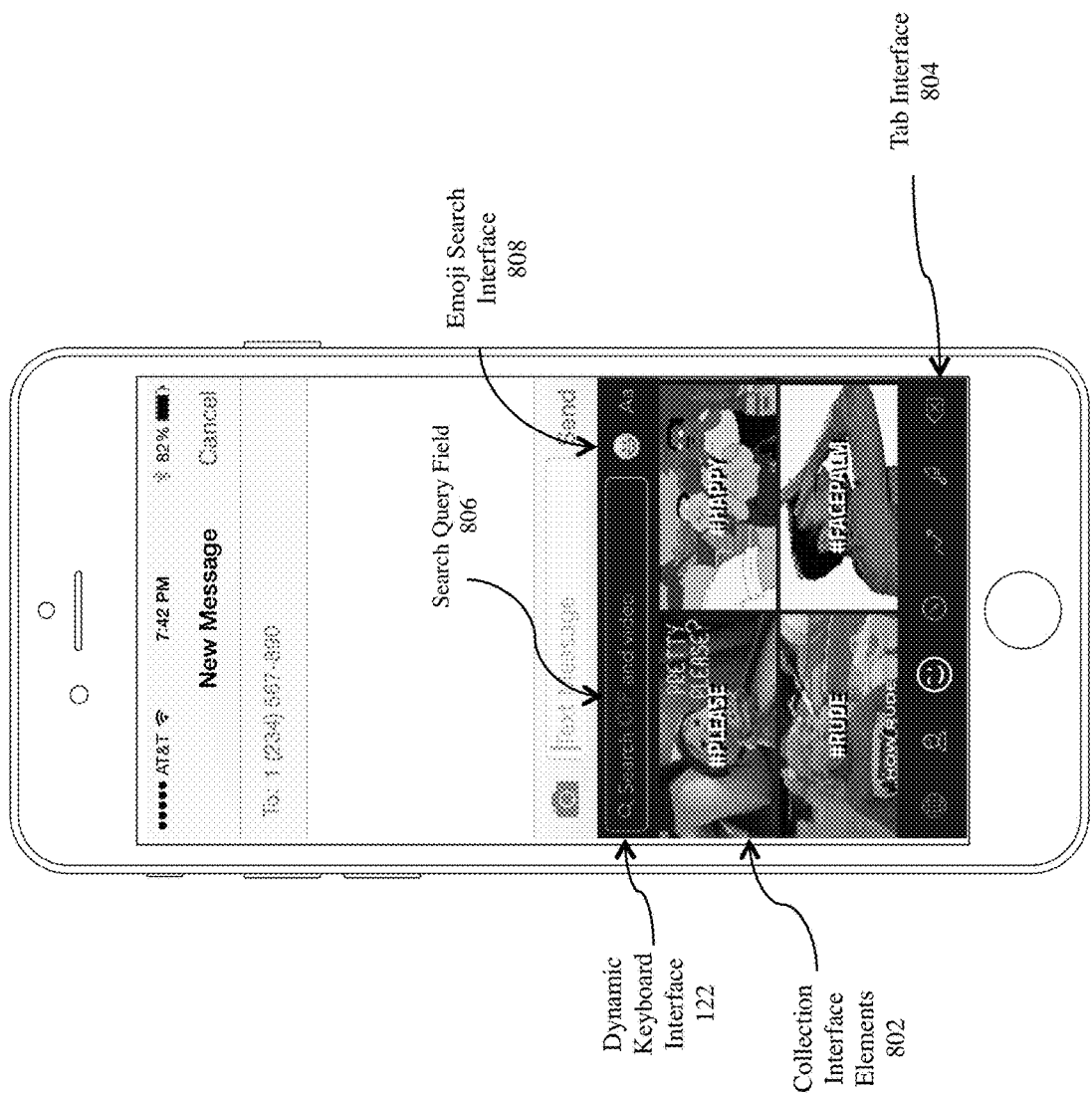

FIGS. 8A-I are example screenshots of a dynamic keyboard interface provided to interact with content in a media content management system, according to some examples. FIG. 8A illustrates an example screenshot of a dynamic keyboard interface 122 as provided on a mobile device through a native mobile application for texting, specifically the IMESSAGE platform through APPLE IOS. Collection interface elements 802 are provided in the dynamic keyboard interface 122, including a "#PLEASE" collection, a "#RUDE" collection, a "#HAPPY" collection, and a "#FACEPALM" collection. As a user selects one of the collection interface elements 802 in the dynamic keyboard interface 122, media content items 104 associated with the selected collection labeled by a content association may be rendered in the dynamic keyboard interface 122. Although a hashtag ('#') precedes the content associations of the collection, hashtags are not needed. Each of the collection interface elements 802 presented in the dynamic keyboard interface 122 include a media content item that is presented in animation concurrently, giving the viewing user a preview of the animations available in the collections. Because the collections represented by the collection interface elements 802 include media content items are rendered and presented in animation concurrently, a user may quickly browse through various collections represented by the collection interface elements 802. A tab interface 804 is also included in the dynamic keyboard interface 122. The tab interface 804 provides a navigation menu of the features and options available on the dynamic keyboard interface 122. As illustrated in FIG. 8A, an icon on the tab interface 804 is highlighted because that menu tab is currently selected. Icons included in the tab interface 804 may be animated as well. A search query field 806 is also included in the dynamic keyboard interface 122. The search query field 806 enables the viewing user to perform a search on the media content management system 100 using text strings, in one embodiment. Though not illustrated, the search query field 806 may, in other embodiments, receive images captured from the viewing user's mobile device as well as images stored on the viewing user's mobile device. The dynamic keyboard interface 122 also includes an emoji search interface 808 for searching the media content management system 100 using pictorial representations of expressions, or emoji.

Figure 8B:
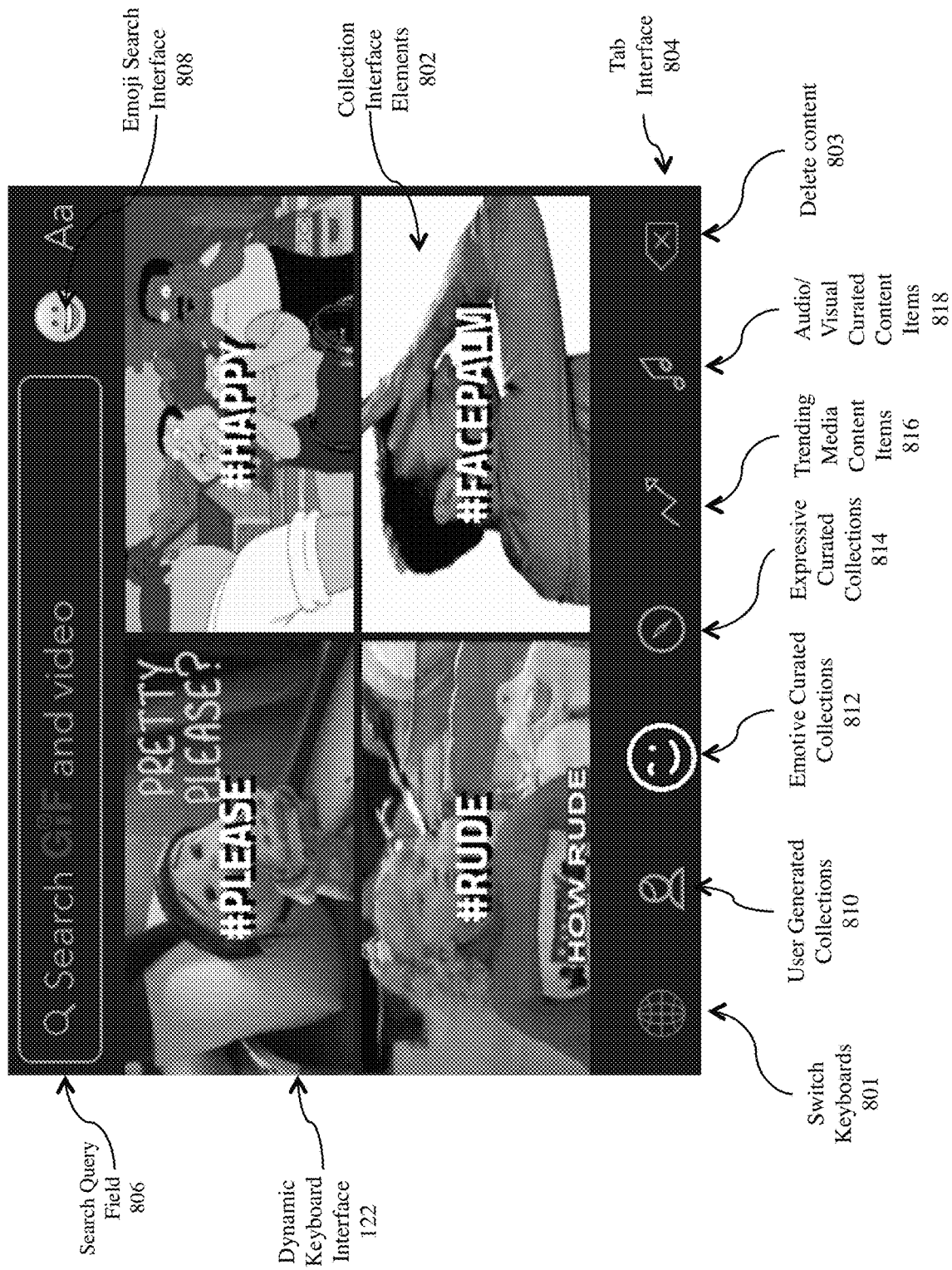

FIG. 8B illustrates the dynamic keyboard interface 122 in further detail. The tab interface 804 may include an icon that navigates to user generated collections 810, an icon that navigates to emotive curated collections 812, an icon that navigates to expressive curated collections 814, an icon that navigates to trending media content items 816, and an icon that navigates to audio/visual curated content items 818, in one embodiment. As further illustrated in FIG. 8B, the tab interface 804 may include other icons for the user to interact with the mobile application on the mobile device, including an icon to switch keyboards 801 and an icon to delete content 803 entered onto the mobile application.

Figure 8C:
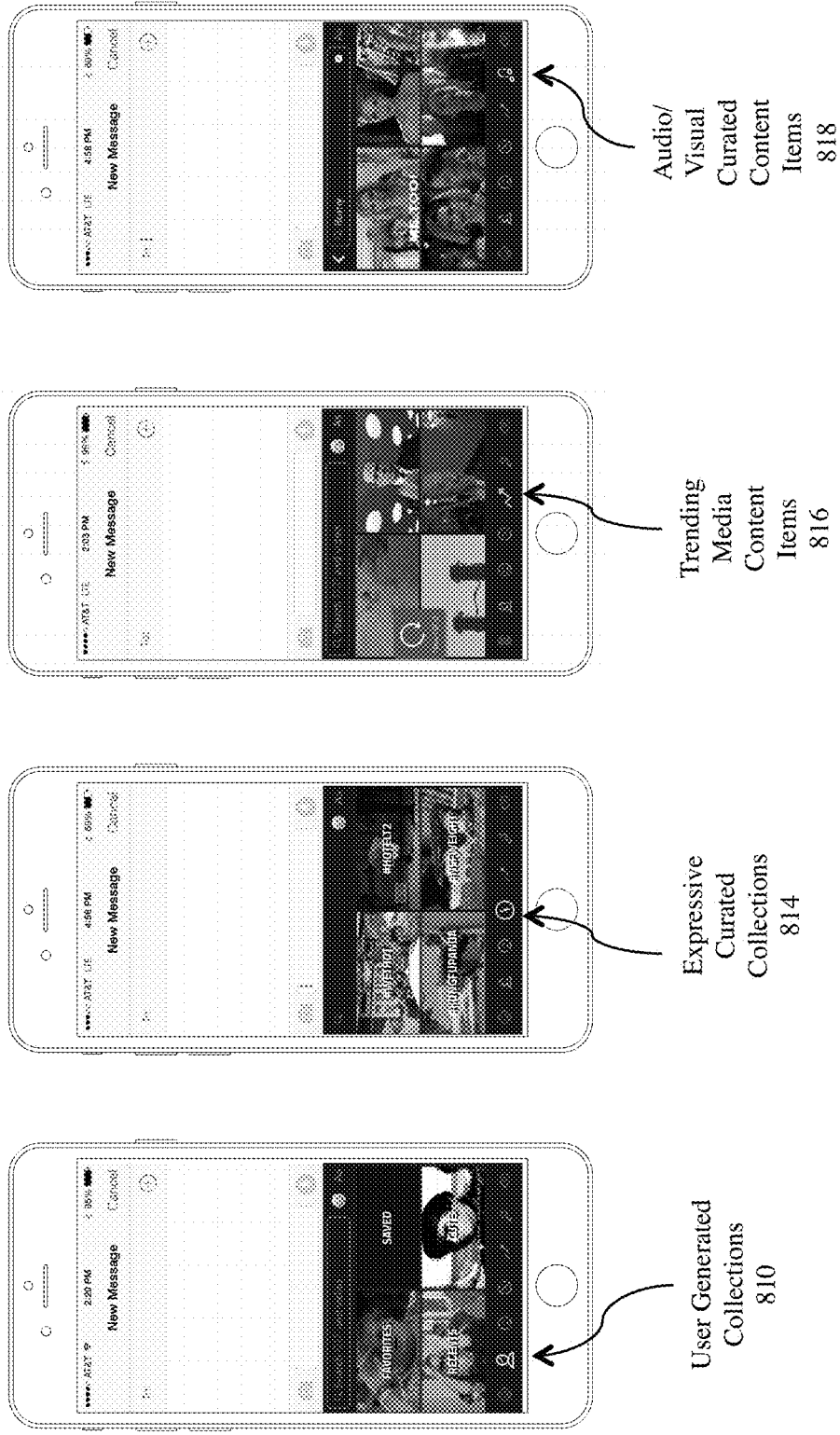

FIG. 8C illustrates example screenshots of the dynamic keyboard interface 122 in further detail for each icon of the tab interface 804 when selected. User generated collections 810 may include collections that have been procured by users through a share extension application, as described above with respect to FIG. 1A. For example, a user may, through a web browser, browse to a web page including one or more media content items and launch a share extension application to capture one or more of the media content items and save them into a user generated collection 810. As illustrated in FIG. 8C, user generated collections 810 may include favorites, recent, saved, and "cute." In this example, the recent collection may include the most recently shared content items by the user using the media content management system 100 and/or the dynamic keyboard interface 122. The favorites, saved, and "cute" collections may be user-curated collections that include content items manually content associated or associated with the collections through either the share extension application or the dynamic keyboard interface, in one embodiment.

FIG. 8D illustrates an emoji selection interface 820 accessed after selecting the emoji search interface 808 as illustrated in FIG. 8A. The emoji selection interface 820 includes emojis that have been matched to content items in the media content management system 100 in one embodiment. For example, the emoji selection interface 820 includes five menu screens with each menu screen including three rows of seven selectable emojis. An emoji may represent an expression, an object, a saying, a place, an action, and so on. As illustrated in FIG. 8D, the first row of emoji includes a pictorial representation of surprise, depicting a smiley making an :-o expression and hands on the face. The remaining emoji on the row include a hand, a party celebration depiction, a smiley that is sick as indicated by a face mask, a birthday cake, an emoji with arms crossed in a "no" or "X" position, and a first indicating a first bump action. As mentioned above, emoji may be tied with specific expressions or expressive intents and these interpretations may be standardized in one embodiment. In an embodiment, each emoji may be associated with at least one content association stored in the content association store 118.

Figure 8E:
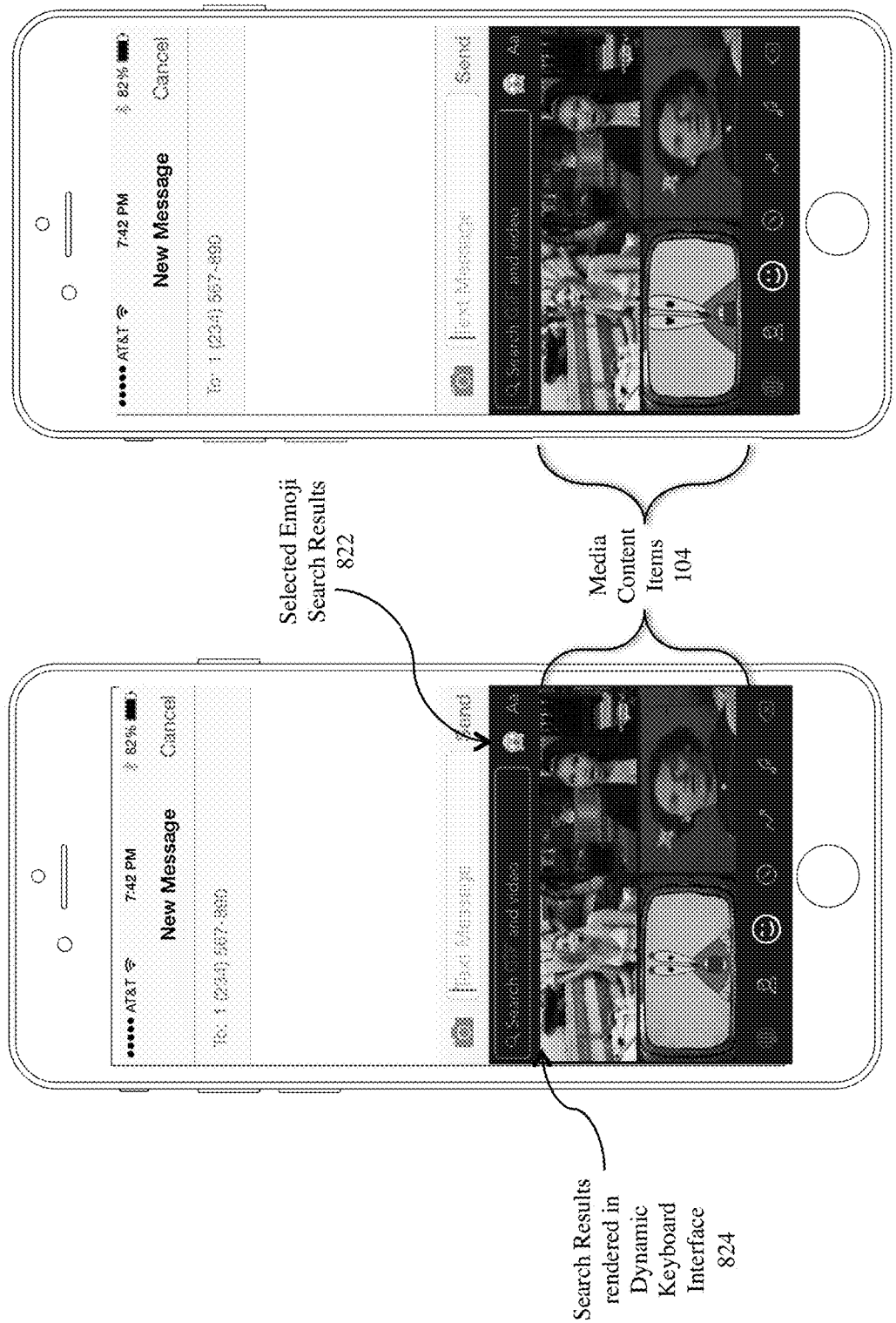
Figure 8F:
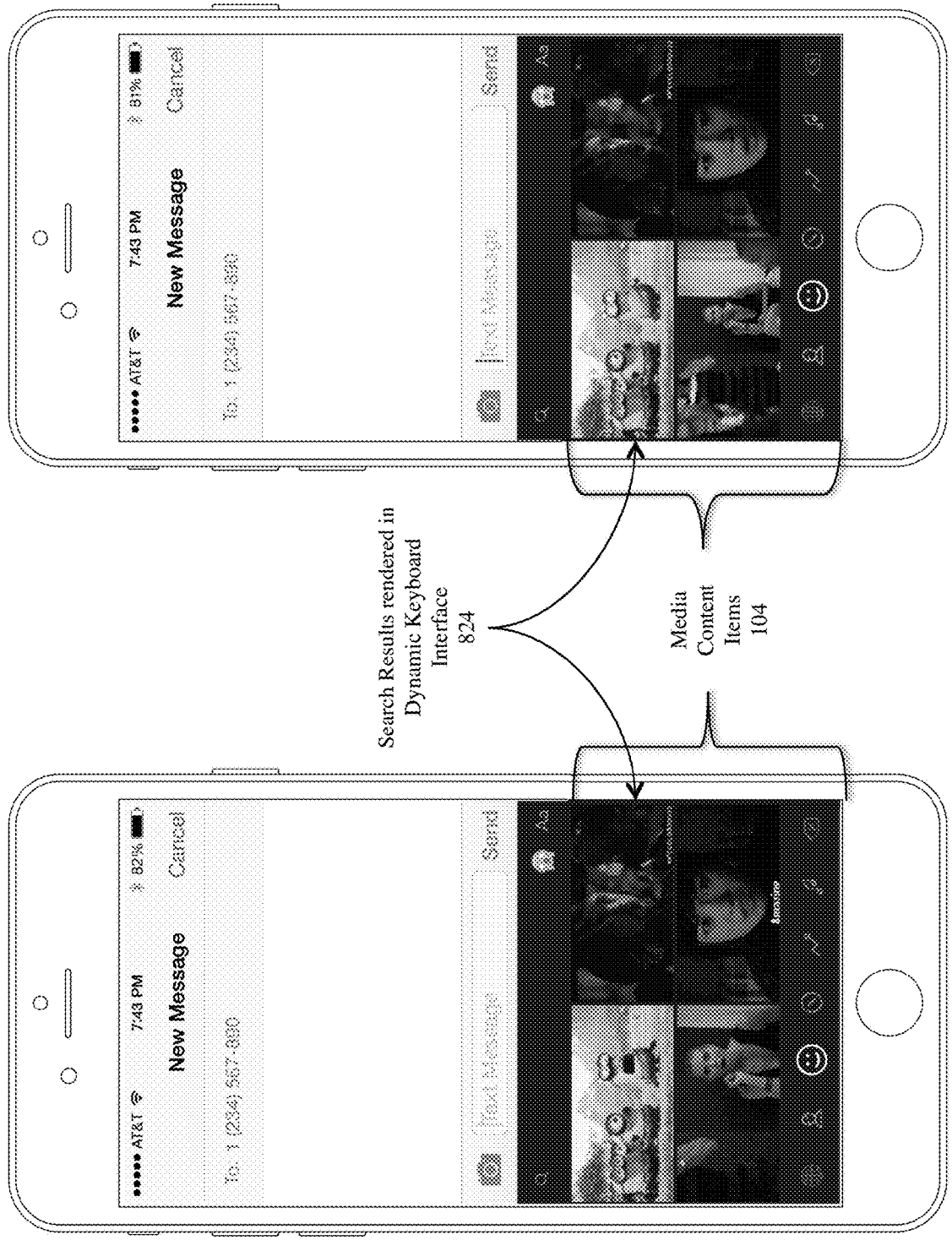

FIGS. 8E and 8F are example screenshots of search results based on a selection of an emoji in the emoji selection interface 820. In this example, the first emoji on the first row illustrated in FIG. 8D, the pictorial representation of an expression of surprise or "OMG," was selected. FIG. 8E illustrates search results 824 rendered in the dynamic keyboard interface. As illustrated in the side-by-side comparisons, the media content items 104 retrieved from the media content management system 100 are rendered in the dynamic keyboard interface concurrently in animation. The selected emoji 822 that is associated with the search results is also displayed within the dynamic keyboard interface 122. FIG. 8F illustrates additional search results 824 rendered in the dynamic keyboard interface. As in FIG. 8E, the media content items 104 are presented concurrently in animation in FIG. 8F.

Figure 8G:
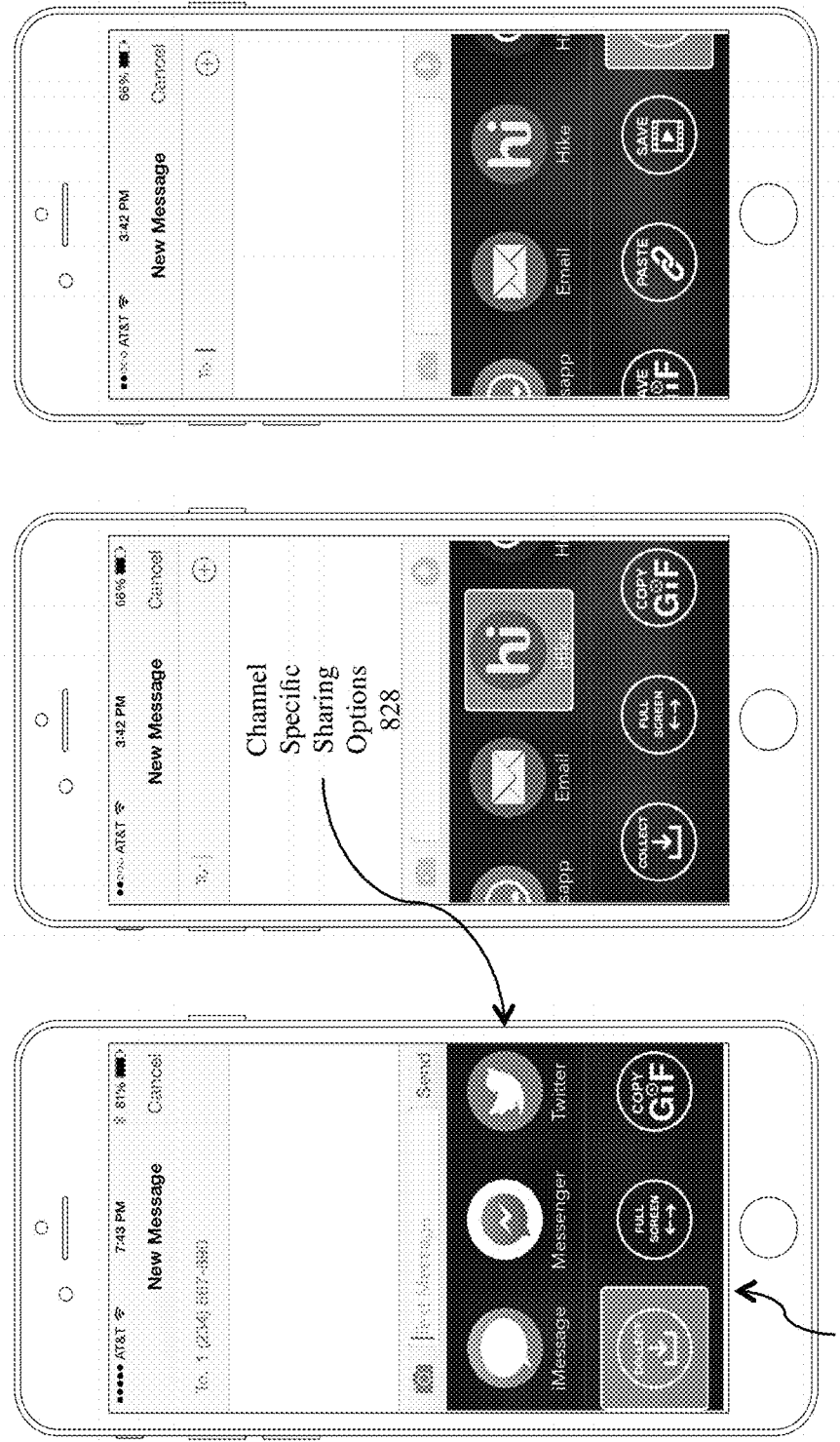
Figure 8H:
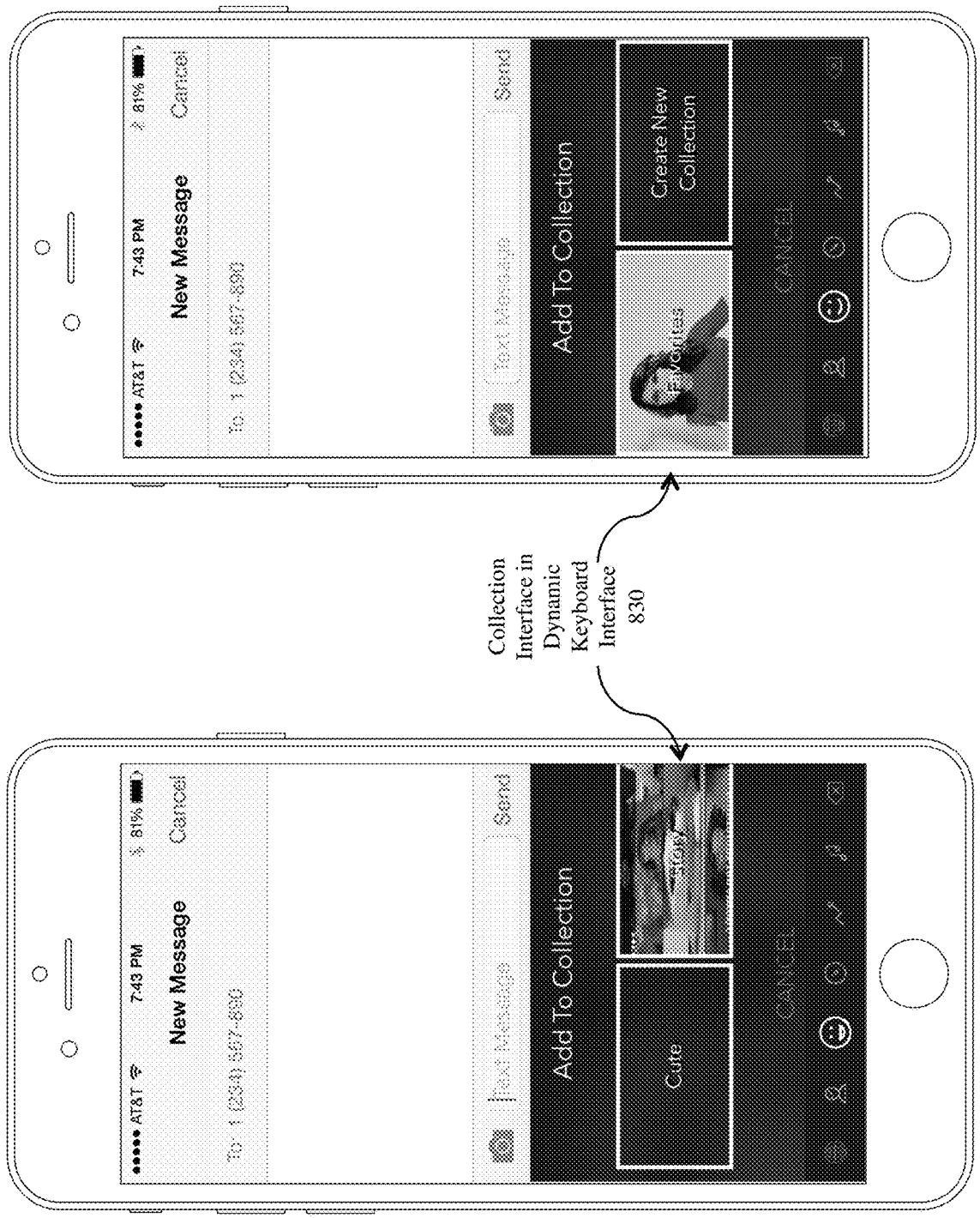
Figure 8I:

FIGS. 8G-I are example screenshots of a process of saving a content item into a user-generated collection in the media content management system 100, according to an embodiment. FIG. 8G illustrates a control menu 826 in the dynamic keyboard interface, in one embodiment. The control menu 826 may be accessed after holding and selecting a media content 104 presented in the dynamic keyboard interface 122. For example, holding and selecting a media content item 104 illustrated in FIG. 8F, such as the MINIONS media content item illustrated in the first row and first column of the dynamic interface, may cause the control menu 826 of FIG. 8G to appear. As illustrated, various functions may be provided by the control menu 826, including an option to collect the content item in a user-generated collection. Other functions or features of the control menu 826 may include viewing a full screen version of the selected content item, copying the selected content item to a clipboard, pasting a link to the content item, saving the content item onto the mobile device (as a video, as a GIF, or other content format), and sharing the selected content item in various messaging platforms, such as IMESSAGE, FACEBOOK MESSENGER, TWITTER, EMAIL, FACEBOOK, GOOGLE HANGOUTS, WHATSAPP, HIPCHAT, SLACK, and HIKE. Other channel specific sharing options 828 may be included, as illustrated the additional screenshots in FIG. 8G. Navigating across the various options 828 and functions of the control menu 826 may be accomplished by holding and dragging the finger on a touchscreen interface across the menu from left to right. In other embodiments, a scrolling or mouse-click holding interaction may be used instead of dragging a finger across the touchscreen. Other gestures may be used. If there are additional options 828 or features to the right or left, the screen will scroll left or right, in an embodiment, as illustrated in the second and third screenshots in FIG. 8G.

FIG. 8H illustrates a collection interface 830 in a dynamic keyboard interface. In this example, the viewing user has selected to collect the media content item 104, such as the selected MINION media content item illustrated in FIG. 8F, and collect the item in a user-generated collection. The collection interface 830 illustrates two screens each having user-generated collections, such as "Cute," "Story," "Favorites," and an option to create a new collection. In one embodiment, if the viewing user selected the option to create a new collection, a new content association would be generated for the new user generated collection 810. In an embodiment, user generated collections 810 may be stored on the user's mobile device. In other embodiments, user generated collections 810 may be stored on the media content management system 100 and may be discoverable by other users. In a further embodiment, a user generated collection 810 may be set as private or public. In yet another embodiment, a user generated collection 810 may be set as collaborative, such that other users may edit and add to the collaborative collection. FIG. 8I illustrates a confirmation screen 832 in the dynamic keyboard interface, showing that the content item has been added to the "Favorites" collection.

Figure 9A:
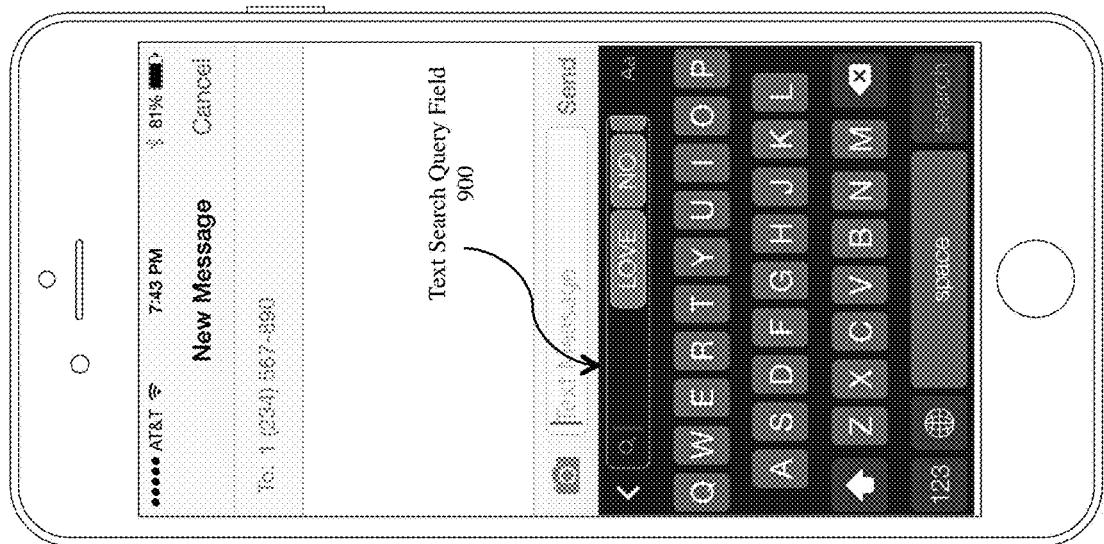
Figure 9B:
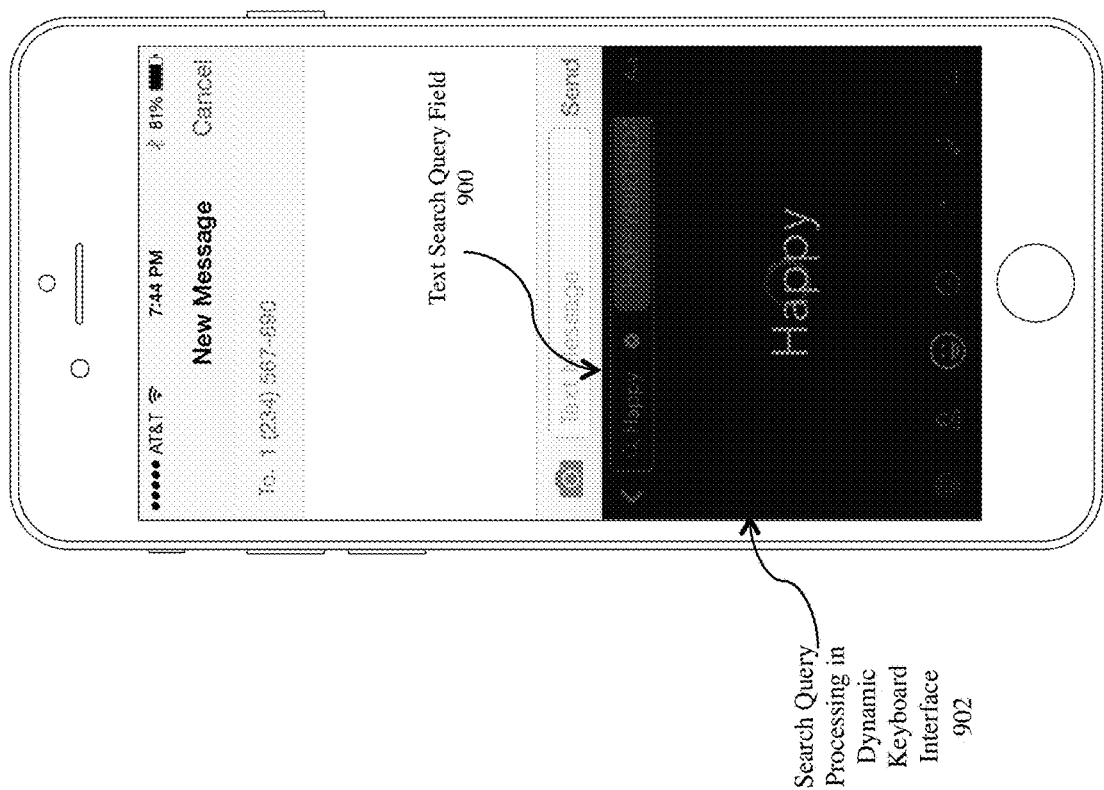

FIGS. 9A-E are example screenshots of a dynamic keyboard interface provided to perform search in a media content management system, according to some examples. FIG. 9 illustrates a text search query field 900. A text keyboard appears to enable a searching user to enter or input a text string to search for content items in the media content management system 100. As described above, a text string may be parsed into words and partial words and a search router rules engine 206 may identify one or more content associations that match the search terms. In this example, the word "Happy" is entered into the text search query field 900, as shown in FIG. 9B. A search query processing screen 902 is provided in the dynamic keyboard interface to indicate to the user that the search is being processed.

Figure 9C:
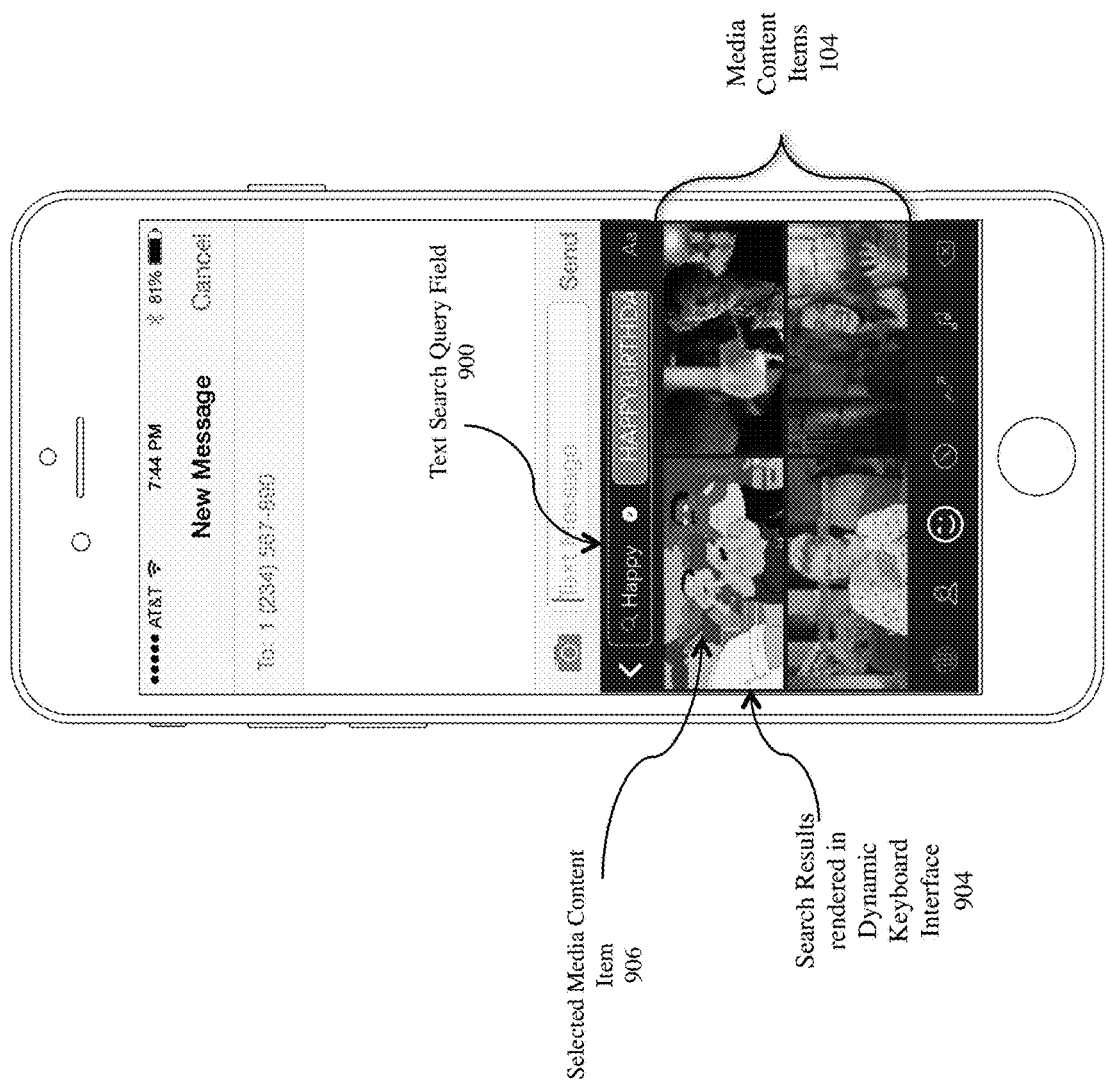

FIG. 9C illustrates media content items 104 matching the search term "Happy" in the media content management system 100, in one embodiment. Search results 904 are rendered in the dynamic keyboard interface concurrently and in animation. A search may take mere seconds (or less) because the search router rules engine 206 may quickly identify relevant content items, as described above. Further, the search results 904 may be rendered and presented in animation in the dynamic keyboard interface 122 as animated keys or animated inputs in the dynamic interface because the media content items 104 have been preprocessed such that their file sizes are greatly reduced.

Figure 9D:
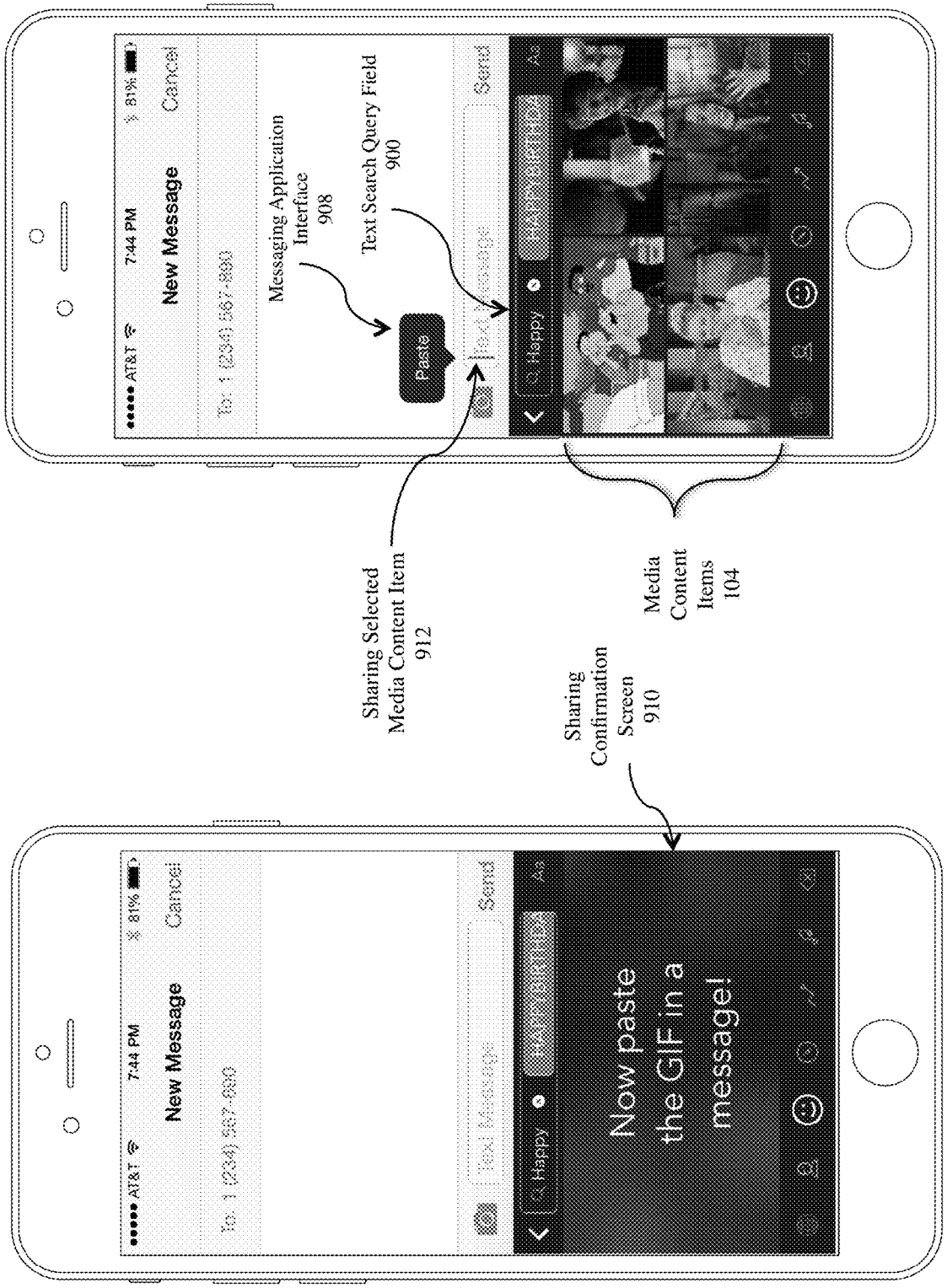

To further the example, a searching user may select a media content item to share within the application on the mobile device. Here, the selected media content item 906 is the first media content item from the television show FAMILY GUY. The media content item may be selected by tapping or selecting the animated key or animated input. In one embodiment, if the key is held for longer than a threshold amount of time, the control menu 826 of FIG. 8G will appear. After selecting the media content item, a sharing confirmation screen 910 is displayed, as illustrated in FIG. 9D. At this point, the selected media content item 906 has been copied to a clipboard or to a mobile operating system temporary storage. As illustrated in FIG. 9D, the selected media content item may be shared 912 in a messaging application interface 908. Here, the messaging application interface 908 enables the user to paste the selected media content item 906 directly into the IMESSAGE application, via the text message field.

As further illustrated in FIG. 9E, after selecting the option to paste the selected media content item 906, the shared selected media content item 914 is displayed within the text message field or IMESSAGE application. In this way, a user of the media content management system 100 may search for a media content item that conveys a particular expression, such as happy, and select and share the item within a matter of seconds through any messaging application on a mobile device. In other embodiments, content items may be shared through other types of applications, such as social networking applications and other communication applications, operating on various devices, including wearable devices, laptop computers, gesture controlled devices, gaming consoles, televisions, and so forth.

Figure 9F:
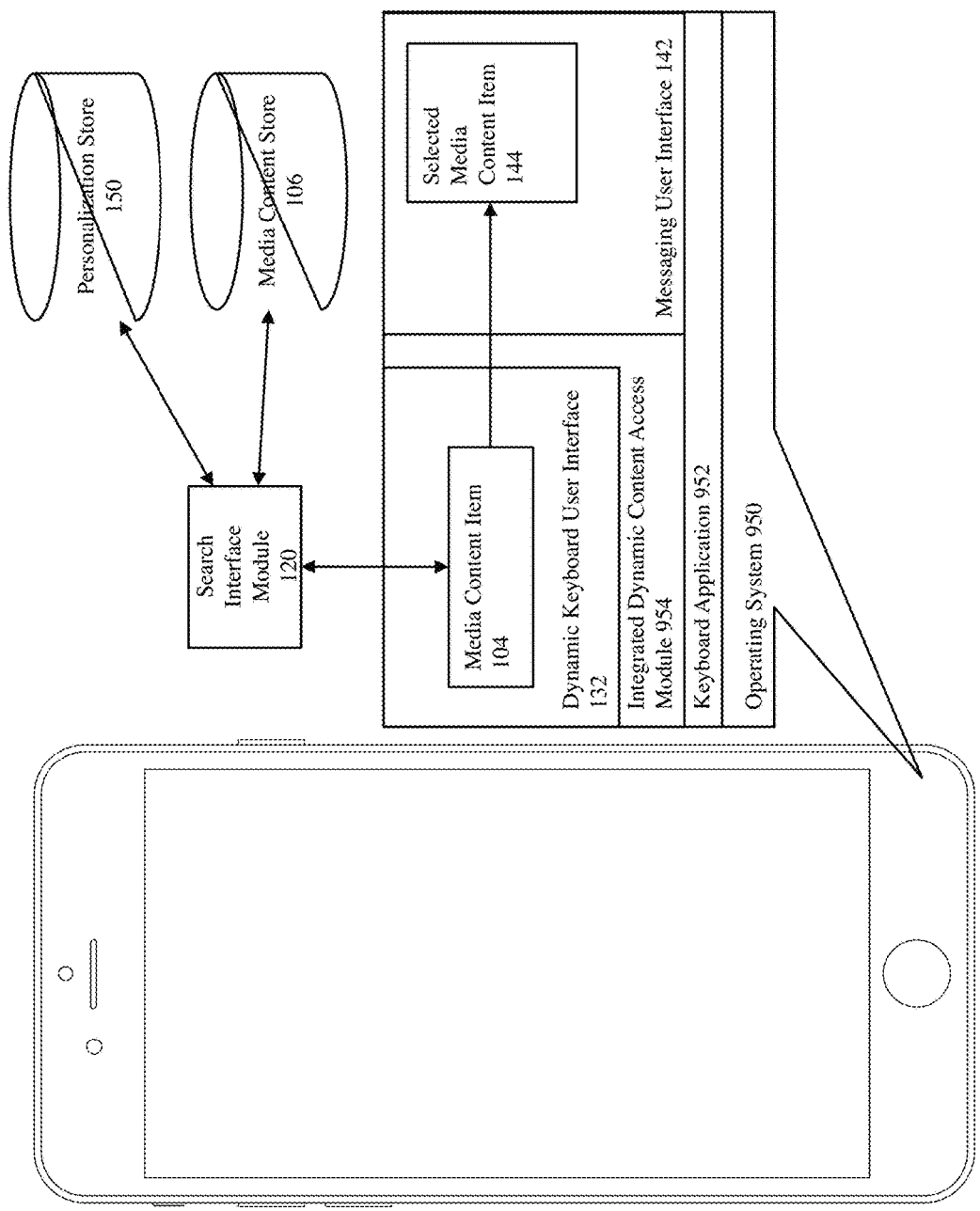
FIG. 9F a high-level block functional diagram depicting an integration of a dynamic content interface, according to an embodiment.

FIG. 9F a high-level block functional diagram depicting an integration of a dynamic content interface, according to an embodiment. An operating system 950 may include one or more keyboard applications 952. In one embodiment, an operating system 950 may include various input methods for textual input as embodied in a keyboard application 952. An example keyboard application 952 may be standardized across multiple types of devices that use the operating system 950. For example, ANDROID is a type of operating system 950 that may operate on various types of devices manufactured by different vendors. An integrated dynamic content access module 954 may be included in a keyboard application 952, in one embodiment, to enable disparate devices to access a dynamic keyboard user interface 132, as described above with respect to FIG. 1B. In one embodiment, the integrated dynamic content access module 954 may employ standard accessibility functions, such as functionality to view a key on the keyboard application 952 in a larger font, or other various accessibility functions.

Accessibility functions may be standardized by an operating system 950, such that standard accessibility functions are provided by one or more application programming interfaces, services, and/or computer code provided by administrators of the operating system 950 for use by application developers in making their applications more accessible to users with disabilities. An example of standardized accessibility functions may be "Building Accessibility Services," an article for ANDROID, an open platform developed and maintained by GOOGLE, INC. and the OPEN HANDSET ALLIANCE. Using one or more standard accessibility functions from the operating system 950 and/or keyboard application 952, the integrated dynamic content access module 954 may provide access to the dynamic keyboard user interface 132 described above. This access to the dynamic keyboard user interface 132 beneficially provides the user with a shortcut to the dynamic keyboard to search, select, and insert a media content item while within a messaging application. In this way, the user may quickly access the dynamic keyboard through the use of one or more standard accessibility functions, including, but not limited to, a dedicated button that hovers as an overlay over a messaging application, custom views and focus-based navigation, utilizing one or more standard accessibility functions. Access to the dynamic keyboard interface 132 may be achieved by implementing various access points, or user interface elements either embodied on a standard user interface, such as a keyboard or touch screen, as well as methods of triggering access to a dynamic keyboard user interface 132, such as a keyword trigger, a key trigger, and so forth. Access points may utilize various APIs, function calls, or other software functions provided by the keyboard application 952, the operating system 950 (such as APIs for accessibility services and software development kits (SDKs)), and/or the integrated dynamic content access module 954.

In one embodiment, the integrated dynamic content access module 954 may include functionality to render a dedicated access point within the keyboard application 952 and/or the operating system 950. For example, an access point may include a button and/or key on a standard keyboard application 952. Another example of an access point may include a trigger, such as a '#' key or a keyword that includes ".gif" or a '#' symbol. As a further example of an access point, an overlay button may be rendered in various messaging applications as part of a messaging user interface 142. The overlay button, when selected, may provide the dynamic keyboard user interface 132 as an overlay interface, as a popup overlay interface, or other type of user interface in the messaging user interface 142. For example, a popup overlay interface may provide a user experience that renders the dynamic keyboard user interface 132 over the messaging user interface 142. The popup overlay interface may then be closed by the user and focus may be returned to the messaging user interface 142 seamlessly.

Figure 9G:
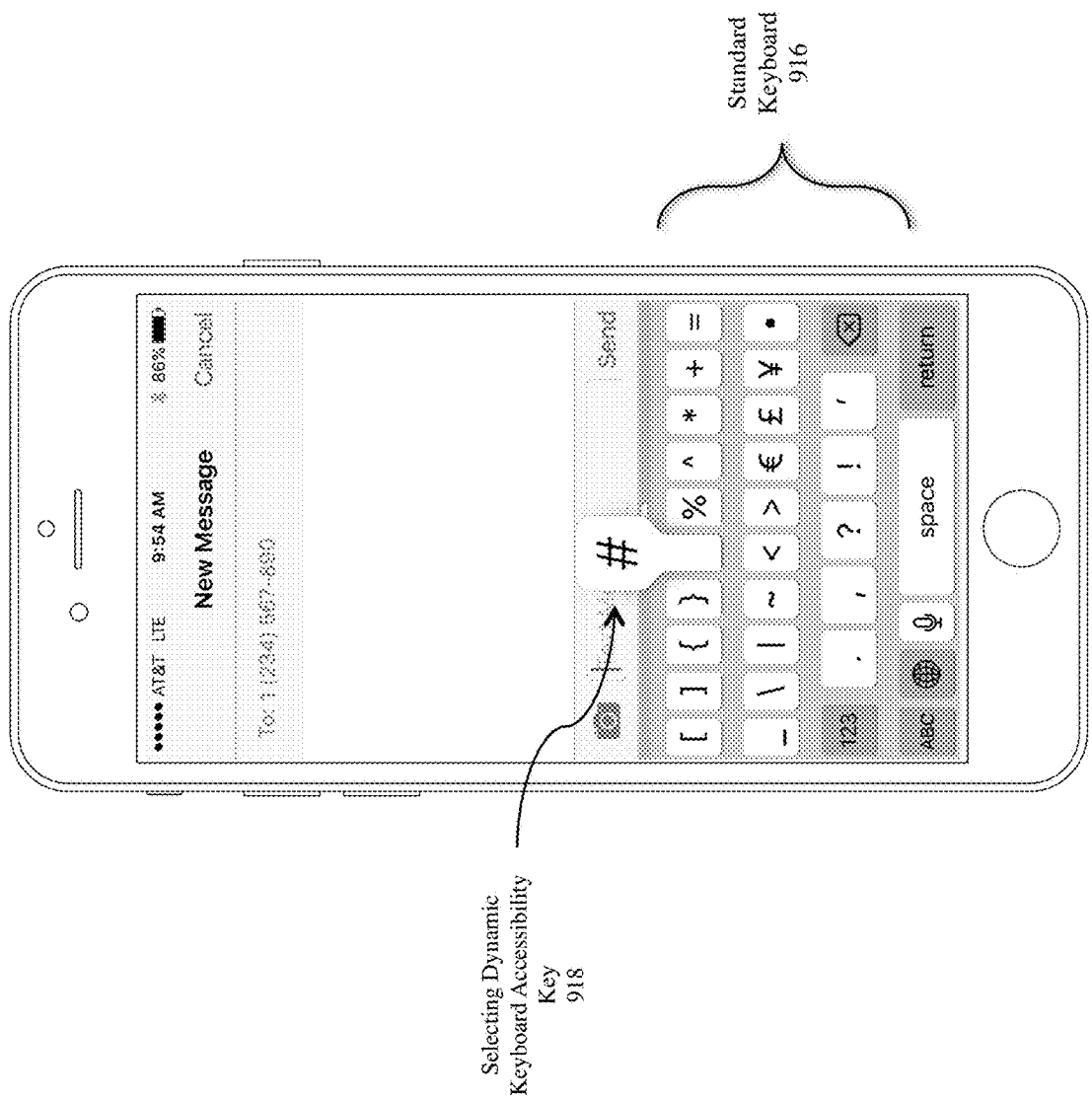

FIGS. 9G-L are example screenshots of accessing a dynamic content interface provided to perform search operations in a media content management system, according to some examples. FIG. 9G illustrates a standard keyboard 916 in which a key has been selected 918. Here, the '#' key is being selected 918 to access a dynamic content interface, such as a dynamic keyboard. In one embodiment, the accessibility functions of the operating system, such as ANDROID, may be used to detect a keyword trigger "#" and identify the recipient of the message. For example, the purported recipient in FIG. 9G is "1(234)567-890." The selected media content item is then inserted directly into the conversation, such that the viewing user does not need to interact with a contact book. The integrated dynamic content access module 954, as described above, may include functionality to receive messaging recipient information, such as contact information and/or other identifying information, such that a selected media content item may be quickly inserted into a conversation without a need to "copy and paste" the selected media content item, in one embodiment. This greatly improves the user experience by reducing the number of user interactions with the dynamic content interface. As illustrated in FIG. 9H, a dynamic content interface 920 may be presented within the messaging application such that media content items 104 may be selected and inserted into the conversation. Presentation of the dynamic content interface 920 may be through various types of interfaces, including but not limited to an overlay interface, a popup overlay interface, a carousel interface, and the like.

Figure 9I:
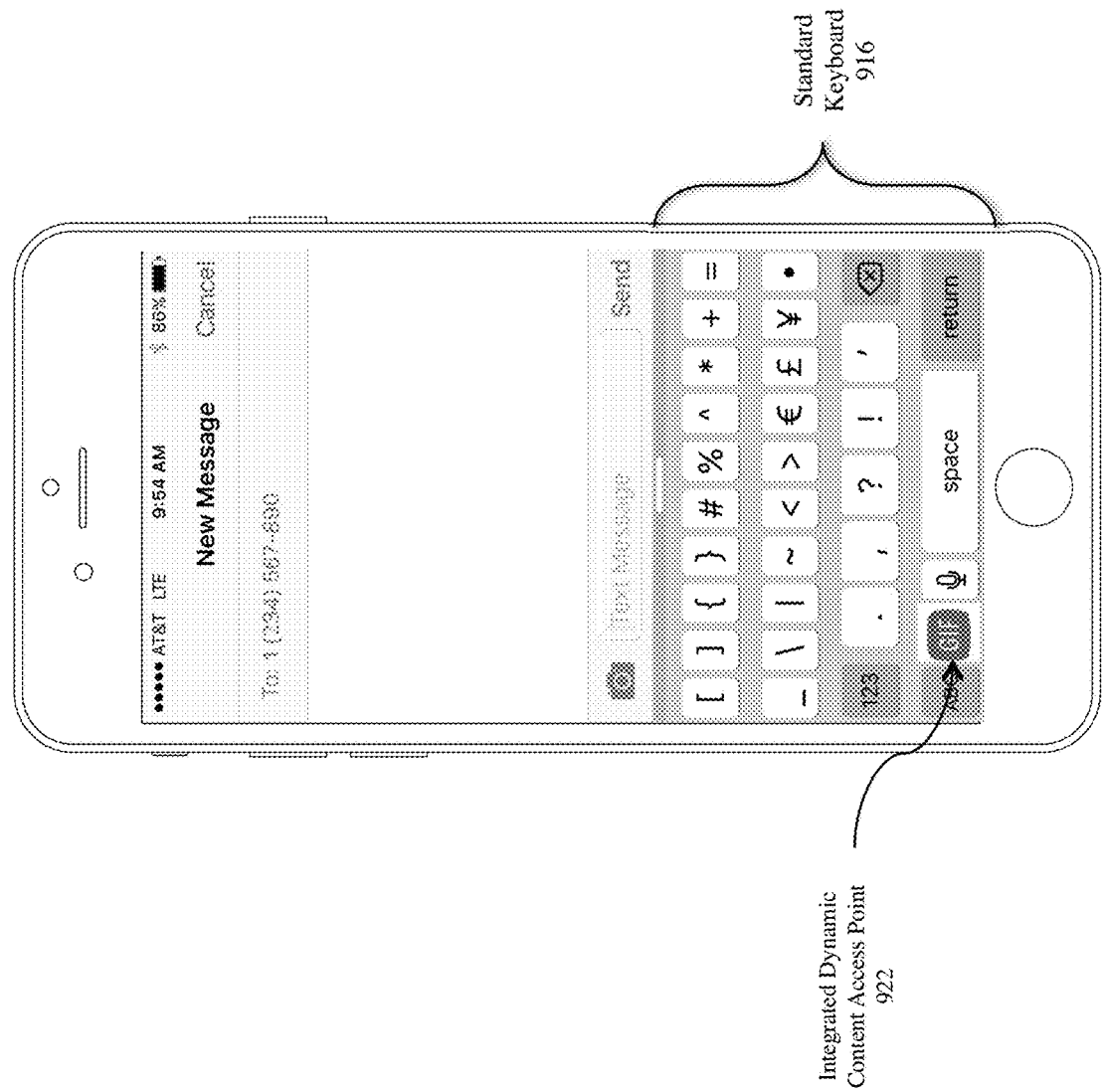
Figure 9J:
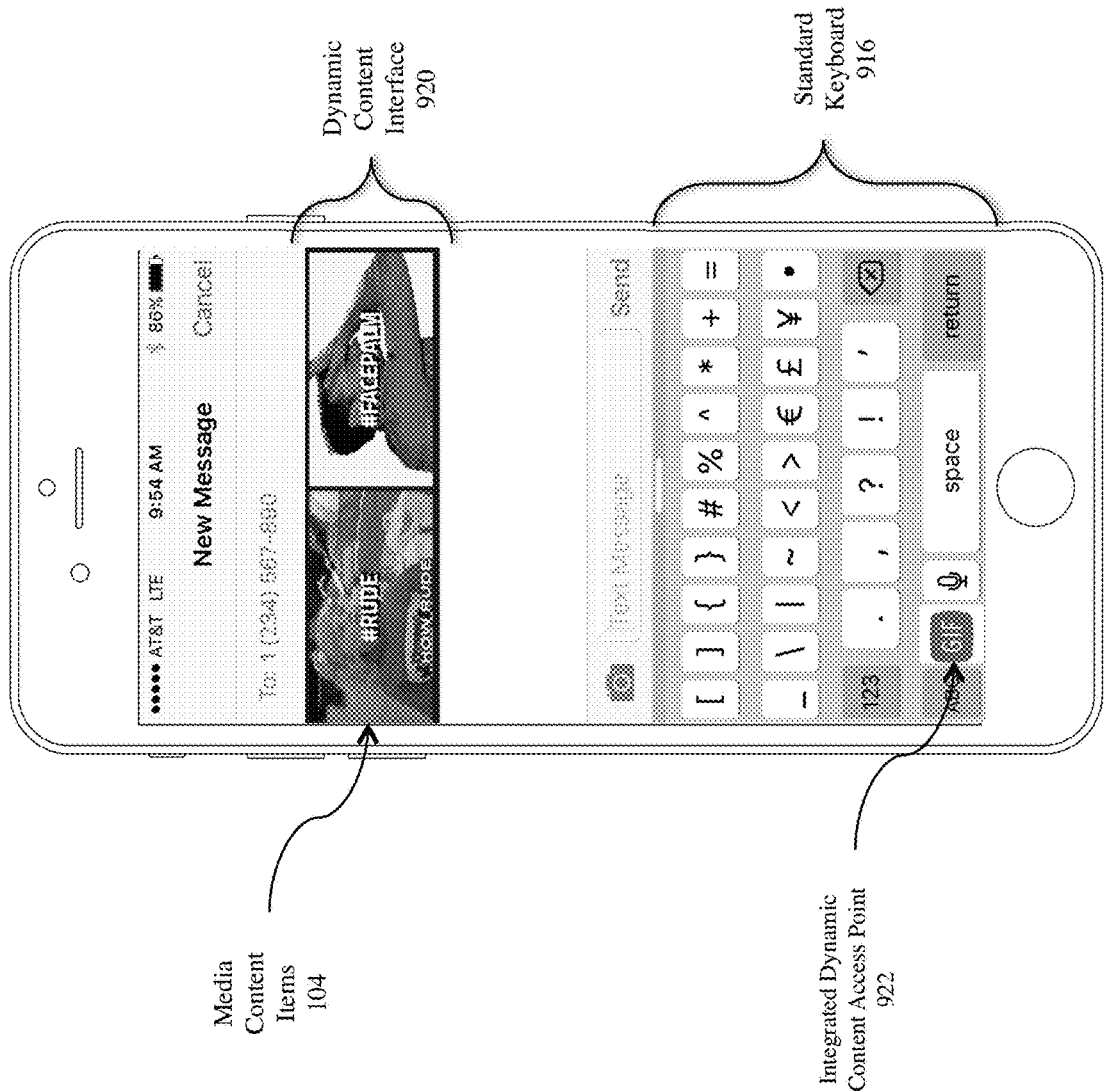

In a further embodiment, FIG. 9I illustrates an example screenshot of a standard keyboard 916 that includes an integrated dynamic content access point 922. For example, a "GIF" button may be an example of an access point included in the standard keyboard 916 to provide access to a dynamic content interface, such as a dynamic keyboard or other interface. As illustrated in FIG. 9J, a dynamic content interface 920 is provided within the messaging application after a viewing user selects the integrated dynamic content access point 922, or "GIF" button. By selecting the GIF button, media content items 104 may be rendered and selected for insertion into the conversation. In one embodiment, the media content items 104 are rendered in animation. In another embodiment, a viewing user may interact with the dynamic content interface 920 by swiping to the left or to the right, or otherwise selecting to scroll through the presented media content items 104. For example, the dynamic content interface 920 may be rendered in a carousel interface such that media content items 104 may be scrolled or swiped from left to right. In a further embodiment, the carousel interface may be selectable such that categories are presented to provide additional collections media content items 104. Once a category is selected, such as "#RUDE" or "#FACEPALM," media content items 104 organized under the selected category may be presented within the dynamic content interface 920 as the carousel interface.

Figure 9K:
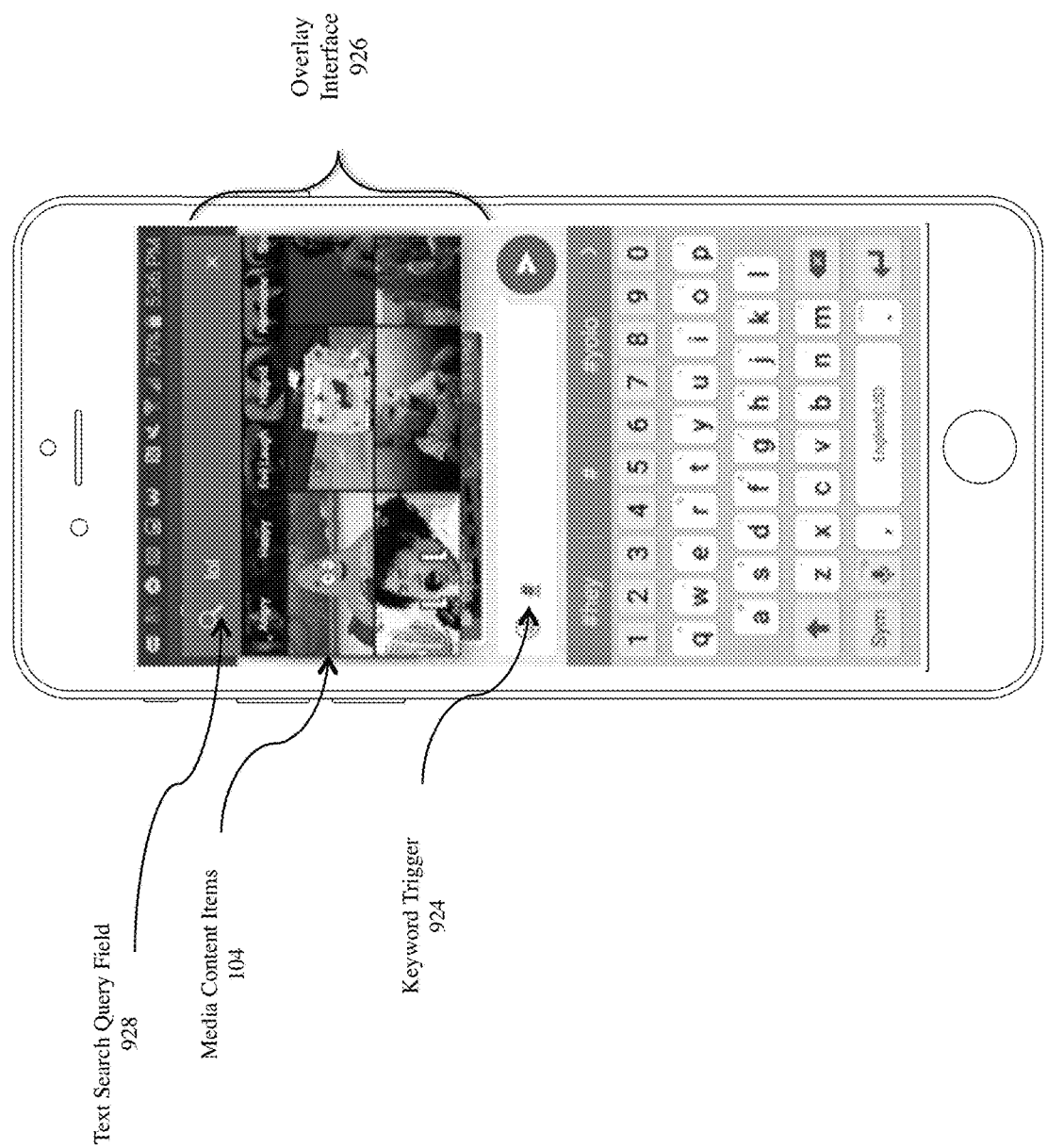

FIG. 9K illustrates a further example of integrating a dynamic content interface in various messaging applications. Here, a keyword trigger 924 is selected and inputted into a message input field, such as a "#" as shown in FIG. 9K. The keyword trigger 924 may be any word, such as "GIF" or ".gif" or "#" as non-limiting examples. After a keyword trigger 924 is inputted into the messaging application, an overlay interface 926 may be provided within the messaging application. The overlay interface 926 may include a text search query field 928 and media content items 104, similar to the dynamic keyboard interface described above.

Figure 9L:
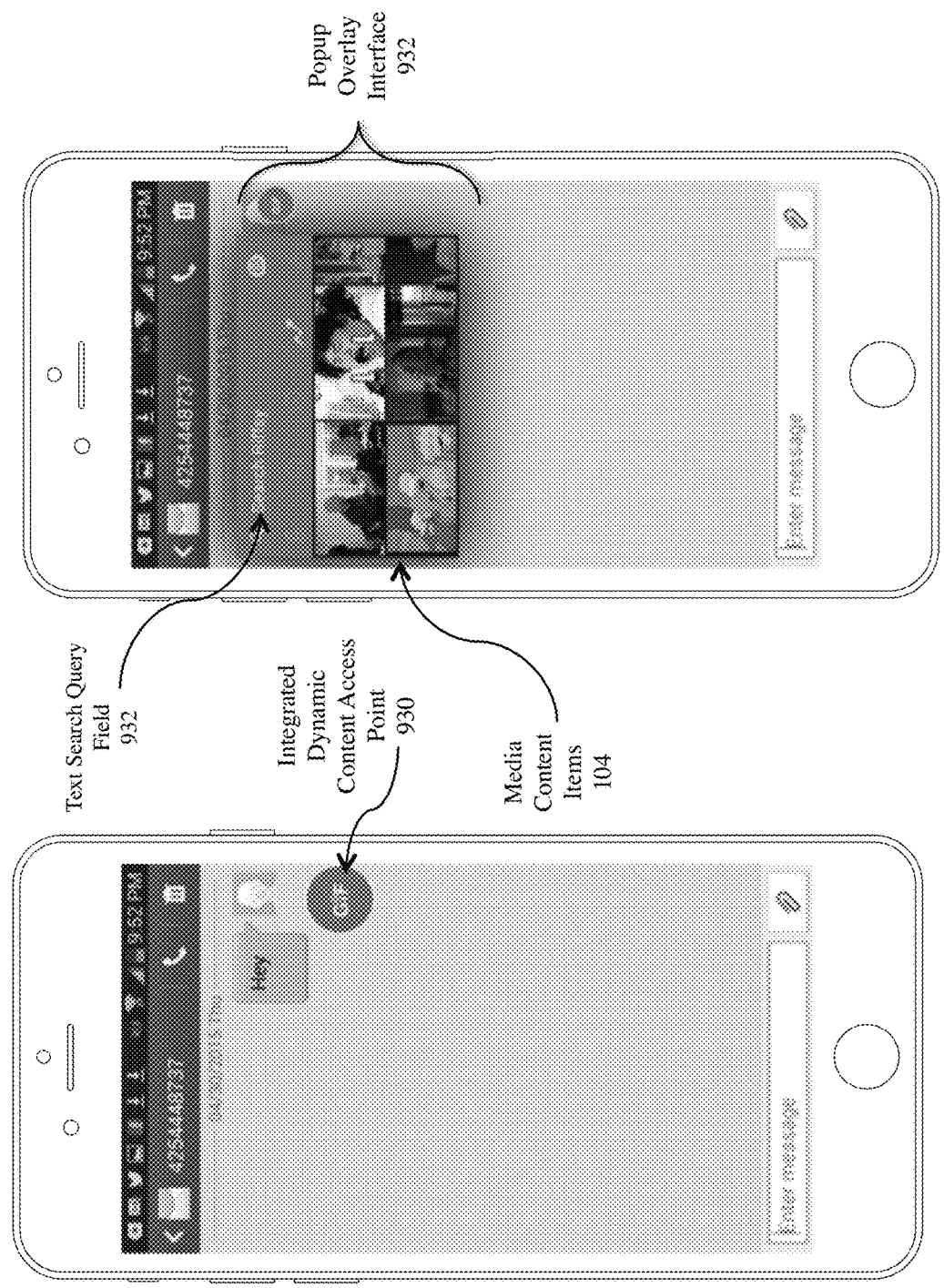

Another example of an integrated dynamic content access point is illustrated in FIG. 9L, showing a first screenshot of a typical messaging conversation in a messaging application, such as text, MMS, SMS, IMESSAGE, KIK, WHATSAPP, HIKE, LINE, FACEBOOK MESSENGER, TWITTER, INSTAGRAM, and so forth. Within the messaging application, an integrated dynamic content access point 930 is illustrated as a GIF button, as a non-limiting example. Once the GIF button is selected, a popup overlay interface 932 is rendered within the messaging application, providing a text search query field 932 and media content items 104, similar to the dynamic keyboard interface described above. By implementing the integrated dynamic content access point 930 within the operating system, various applications may provide access to the media content management system 100 through a dynamic content interface, such as a dynamic keyboard interface.

After selecting the selected media content item 104, the selected media content item 104 may be inserted within the text message field or IMESSAGE application. In this way, a user of the media content management system 100 may search for a media content item that conveys a particular expression, such as happy, and select and share the item within a matter of seconds through any messaging application on a mobile device. In other embodiments, content items may be shared through other types of applications, such as social networking applications and other communication applications, operating on various devices, including wearable devices, laptop computers, gesture controlled devices, gaming consoles, televisions, and so forth.

Example Interpretations of Pictorial Expressions

Pictorial representations of expressions may be matched to expressive intents that are searched among content associations in the media content management system 100 to perform searches. The following represents a list, not exhaustive, of example interpretations of pictorial expressions and how various modules may analyze media content items to extract the expressive intent metadata. One or more visual movements may be analyzed to determine an expressive statement provided by the content item. This analysis may include determining that the one or more visual movements comprises a fall and determining that the expressive statement comprises an expression of sadness.

The analysis may alternatively include determining that the one or more visual movements comprises a smile and determining that the expressive statement comprises an expression of happiness. In another embodiment, the analysis may include determining that the one or more visual movements or characteristics comprises a first bump and determining that the expressive statement comprises an expression of camaraderie.

Content items may further include one or more visual movements that includes applause, and one or more of the aforementioned modules may determine that the expressive statement comprises an expression of congratulations. The analysis may optionally include determining that the one or more visual movements comprises crying and determining that the expressive statement comprises an expression of sadness. Similarly, the analysis may alternatively include determining that the one or more visual movements comprises a thumbs up and determining that the expressive statement comprises an expression of congratulations. Moreover, the analysis may alternatively include determining that the one or more visual movements comprises a pair of glasses being worn on a face and determining that the expressive statement comprises an expression of cool.

Figure 10:
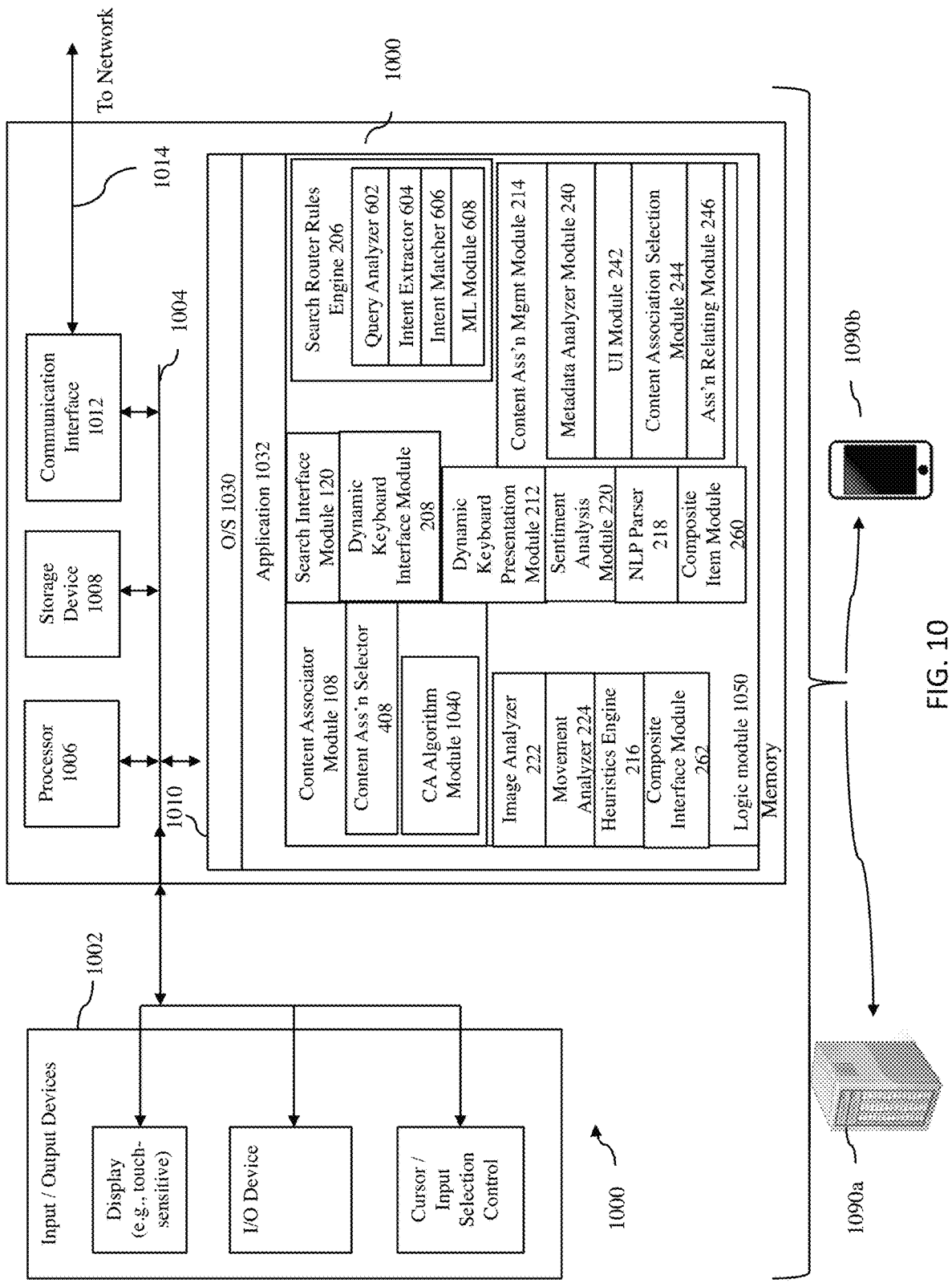
FIG. 10 illustrates an exemplary computing platform disposed in a device configured to procure, organize, and/or retrieve expressive media content of in accordance with various embodiments.

FIG. 10 illustrates an exemplary computing platform disposed in a device configured to categorize procured content for performing search in a media content management system 100 in accordance with various embodiments. In some examples, computing platform 1000 may be used to implement computer programs, applications, methods, processes, algorithms, or other software to perform the above-described techniques.

In some cases, computing platform can be disposed in wearable device or implement, a mobile computing device 1090b, or any other device, such as a computing device 1090a.

Computing platform 1000 includes a bus 1004 or other communication mechanism for communicating information, which interconnects subsystems and devices, such as processor 1006, system memory 1010 (e.g., RAM, etc.), storage device 1008 (e.g., ROM, etc.), a communication interface 1012 (e.g., an Ethernet or wireless controller, a Bluetooth controller, etc.) to facilitate communications via a port on communication link 1014 to communicate, for example, with a computing device, including mobile computing and/or communication devices with processors. Processor 1006 can be implemented with one or more central processing units ("CPUs"), such as those manufactured by Intel® Corporation, or one or more virtual processors, as well as any combination of CPUs and virtual processors. Computing platform 1000 exchanges data representing inputs and outputs via input-and-output devices 1002, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 1000 performs specific operations by processor 1006 executing one or more sequences of one or more instructions stored in system memory 1010, and computing platform 1000 can be implemented in a client-server arrangement, peer-to-peer arrangement, or as any mobile computing device, including smart phones and the like. Such instructions or data may be read into system memory 1010 from another computer readable medium, such as storage device 1008. In some examples, hard-wired circuitry may be used in place of or in combination with software instructions for implementation. Instructions may be embedded in software or firmware. The term "computer readable medium" refers to any tangible medium that participates in providing instructions to processor 1006 for execution. Such a medium may take many forms, including but not limited to, non-volatile media and volatile media. Non-volatile media includes, for example, optical or magnetic disks and the like. Volatile media includes dynamic memory, such as system memory 1010.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1004 for transmitting a computer data signal.

In some examples, execution of the sequences of instructions may be performed by computing platform 1000. According to some examples, computing platform 1000 can be coupled by communication link 1014 (e.g., a wired network, such as LAN, PSTN, or any wireless network, including WiFi of various standards and protocols, Blue Tooth®, Zig-Bee, etc.) to any other processor to perform the sequence of instructions in coordination with (or asynchronous to) one another. Computing platform 1000 may transmit and receive messages, data, and instructions, including program code (e.g., application code) through communication link 1014 and communication interface 1012. Received program code may be executed by processor 1006 as it is received, and/or stored in memory 1010 or other non-volatile storage for later execution.

In the example shown, system memory 1010 can include various modules that include executable instructions to implement functionalities described herein. System memory 1010 may include an operating system ("O/S") 1030, as well as an application 1032 and/or logic module 1050. In the example shown, system memory 1010 includes a content associator module 108 including a content association ("ass'n") selector module 408 and a content associating ("CA") algorithm module 1040. The system memory 1010 may also include an image analyzer 222, a movement analyzer 224, a heuristics engine 216, a search interface module 120, a dynamic keyboard interface module 208, a dynamic keyboard presentation module 212, a sentiment analysis module 220, a natural language processing (NLP) parser 218, a search router rules engine 206 including a query analyzer 602, an intent extractor 604, an intent matcher 606, and a machine learning (ML) module 608, a content association ("ass'n") management ("mgmt.") module 214 including a metadata analyzer module 240, a user interface module 242, a content association selection module 244, and an association ("ass'n") relating module 246. The system memory 1010 may further include a composite item module 260 and a composer interface module 262. One or more of the modules included in memory 1010 can be configured to provide or consume outputs to implement one or more functions described herein.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, a media content management system or one or more of its components, or any process or device described herein, can be in communication (e.g., wired or wirelessly) with a mobile device, such as a mobile phone or computing device, or can be disposed therein.

In some cases, a mobile device, or any networked computing device (not shown) in communication with an action alert controller or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, a dynamic keyboard presentation module 212 or any of its one or more components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, a media content management system, including one or more components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer-implemented method comprising:
identifying, by one or more computing devices, an operating system of a user device, the operating system including a keyboard application configured to provide a keyboard interface in a user interface across one or more applications executed by the user device;
detecting, by the one or more computing devices, a user input requesting display of a dynamic keyboard interface; and
providing, by the one or more computing devices, a dynamic interface access module configured to provide, across the one or more applications executed by the user device and in response to the user input requesting display of the dynamic keyboard interface, a dynamic keyboard interface as a popup overlay interface in the user interface and displayed concurrently with the keyboard interface, the keyboard interface comprising a plurality of alphabetic keys, the popup overlay interface comprising a search query field and a plurality of different animated media content items displayed concurrently, wherein each of the plurality of different animated media content items comprises a respective series of images rendered in animation.

2. The computer-implemented method of claim 1, wherein the dynamic interface access module is configured to provide access to the dynamic keyboard interface via one or more standard accessibility functions of the operating system.

3. The computer-implemented method of claim 1, wherein the dynamic interface access module is configured to provide a shortcut to the dynamic keyboard interface.

4. The computer-implemented method of claim 1, wherein the user input requesting display of the dynamic keyboard interface is directed to one or more of a button or a key within the user interface.

5. The computer-implemented method of claim 1, wherein the user input requesting display of the dynamic keyboard interface comprises one or more of a key or a keyword.

6. The computer-implemented method of claim 1, wherein the dynamic interface access module is configured to cause the user device to render the dynamic keyboard interface over an interface of one or more of the one or more applications.

7. The computer-implemented method of claim 1, wherein the dynamic keyboard interface is configured to enable:
searching for an animated media content item of the plurality of different animated media content items;
selecting the animated media content item; and
inserting the animated media content item into an interface of an application of the one or more applications.

8. The computer-implemented method of claim 7, wherein the dynamic keyboard interface is configured to enable inserting the animated media content item into the interface of the application without pasting the animated media content item into the interface of the application.

9. The computer-implemented method of claim 1, wherein:
the one or more applications comprise a messaging application; and
the dynamic keyboard interface is configured to:
receive, from the messaging application, recipient information; and
insert, based at least in part on the recipient information, an animated media content item of the plurality of different animated media content items into an interface of the messaging application.

10. The computer-implemented method of claim 1, wherein the dynamic keyboard interface is configured such that a user can one or more of scroll or swipe through the plurality of different animated media content items.

11. A system comprising:
one or more processors; and
a memory storing instructions that when executed by the one or more processors cause the system to perform operations comprising:
detecting a user input requesting display of a dynamic keyboard interface;
providing, to a user device having an operating system including a keyboard application configured to provide a keyboard interface in a user interface of the user device across one or more applications executed by the user device, a dynamic interface access module configured to provide, in response to the user input requesting display of the dynamic keyboard interface and within the user interface and across the one or more applications executed by the user device, a dynamic keyboard interface as a popup overlay interface displayed concurrently in the user interface with the keyboard interface, the keyboard interface comprising a plurality of alphabetic keys, the popup overlay interface comprising a plurality of different animated media content items displayed concurrently, wherein each of the plurality of different animated media content items comprises a respective series of images rendered in animation with respective content association labels overlaid over each of the plurality of different animated media content items, wherein each content association label describes a respective collection of animated images available for display.

12. The system of claim 11, wherein the dynamic interface access module is configured to provide access to the dynamic keyboard interface via one or more standard accessibility functions of the operating system.

13. The system of claim 11, wherein the user input requesting display of the dynamic keyboard interface is directed to one or more of a button or a key within the user interface.

14. The system of claim 11, wherein the user input requesting display of the dynamic keyboard interface comprises one or more of a key or a keyword.

15. The system of claim 11, wherein the dynamic keyboard interface is configured to enable:
searching for an animated media content item of the plurality of different animated media content items;
selecting the animated media content item; and
inserting the animated media content item into an interface of an application of the one or more applications.

16. The system of claim 11, wherein:
the one or more applications comprise a messaging application; and
the dynamic keyboard interface is configured to:
receive, from the messaging application, recipient information; and insert, based at least in part on the recipient information, an animated media content item of the plurality of different animated media content items into an interface of the messaging application.

17. One or more non-transitory computer-readable media comprising instructions that when executed by one or more computing devices cause the one or more computing devices to perform operations comprising:

detecting, by the one or more computing devices, a user input requesting display of a dynamic keyboard interface;

providing, in response to the user input requesting display of the dynamic keyboard interface and within a user interface, a dynamic keyboard interface as a popup overlay interface in the user interface and displayed concurrently with a keyboard interface displayed by the keyboard application in the user interface, the keyboard interface comprising a plurality of alphabetic keys, the popup overlay interface comprising a plurality of different animated media content items displayed concurrently, wherein each of the plurality of different animated media content items comprises a respective series of images rendered in animation with respective content association labels overlaid over each of the plurality of different animated media content items, wherein each content association label describes a respective collection of animated images available for display.

18. The computer-implemented method of claim 1, further comprising:

detecting, by the one or more computing devices, a user input selecting one of the plurality of different animated media content items that are displayed concurrently; and responsive to detecting the user input directed to the one of the plurality of different animated media content items, displaying, by the one or more computing devices, the respective collection of animated images described by the respective content association label that is overlaid over the selected animated media content items.

* * * * *